United States Patent
Floyd et al.

(10) Patent No.: US 9,668,595 B2
(45) Date of Patent: *Jun. 6, 2017

(54) REMOVABLE WALL DECORATION KITS, SYSTEMS AND METHODS

(71) Applicant: 3M INNOVATIVE PROPERTIES COMPANY, St. Paul, MN (US)

(72) Inventors: Thomas W. Floyd, St. Paul, MN (US); Jacob P. Vanderheyden, St. Paul, MN (US); Nicolas A. Echeverri, Woodbury, MN (US); Craig D. Thompson, Inver Grove Heights, MN (US); Sean C. McGreevy, Emeryville, CA (US); Judd D. Olson, Deephaven, MN (US); Joseph A. Hoffman, Minneapolis, MN (US); Nathan E. Marks, Rosemount, MN (US); Stephan A. Hawthorne, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 186 days.

This patent is subject to a terminal disclaimer.

(21) Appl. No.: 14/293,885

(22) Filed: Jun. 2, 2014

(65) Prior Publication Data

US 2014/0353455 A1    Dec. 4, 2014

Related U.S. Application Data

(60) Provisional application No. 61/830,367, filed on Jun. 3, 2013, provisional application No. 61/948,946, filed
(Continued)

(51) Int. Cl.
*A47G 1/17* (2006.01)
*A47G 1/16* (2006.01)
(Continued)

(52) U.S. Cl.
CPC .......... *A47G 1/175* (2013.01); *A44B 18/0019* (2013.01); *A47G 1/0638* (2013.01);
(Continued)

(58) Field of Classification Search
CPC   E04G 1/16; E04G 1/17; E04G 1/1646; E04G 1/0638; E04G 2001/0672;
(Continued)

(56) References Cited

U.S. PATENT DOCUMENTS 1,610,423 A    12/1926   Cawley
3,885,336 A *   5/1975   Olsen ...................... A47G 1/06
                                                        40/711
(Continued)

FOREIGN PATENT DOCUMENTS

JP    S52-061498 U    5/1977
JP    S53-164400 U    12/1978
WO    WO 96/16580     6/1996

OTHER PUBLICATIONS

PCT International Search Report for PCT/US2014/040550 mailed on Sep. 24, 2014, 3 pages.

*Primary Examiner* — Michael Safavi

(57) ABSTRACT

Systems and kits for decorating walls include a plurality of décor assemblies and a plurality of complementary fastening structures. The décor assemblies include a décor element and a releasable fastening structure providing first fastening elements. The complementary fastening structure includes a base, a pressure sensitive adhesive disposed on the base, and second fastening elements. The first fastening elements are releasably mateable with the second fastening elements to define a releasable fastening system. During use, a complementary fastening structure is releasably applied to a wall, and is connected to and supports one of the décor assemblies via the releasable fastening system. The releasable fastening
(Continued)

system can comprise low profile hooks and loops, exhibiting relatively low holding power.

20 Claims, 49 Drawing Sheets

Related U.S. Application Data on Mar. 6, 2014, provisional application No. 61/988,020, filed on May 2, 2014.

(51) Int. Cl.
    *A44B 18/00* (2006.01)
    *A47G 1/06* (2006.01)
(52) U.S. Cl.
    CPC ............ *A47G 1/1646* (2013.01); *A47G 1/17* (2013.01); *A47G 1/0616* (2013.01); *A47G 2001/0672* (2013.01); *Y10T 29/4997* (2015.01); *Y10T 428/24008* (2015.01); *Y10T 428/24017* (2015.01)
(58) Field of Classification Search
    CPC .......... A47G 1/16; A47G 1/17; A47G 1/1646; A47G 1/0638; A47G 2001/0672; A47G 1/175; F16B 5/07; A44B 18/0019
    USPC ......................................................... 24/306
    See application file for complete search history.

(56) References Cited

U.S. PATENT DOCUMENTS

| | | | |
|---|---|---|---|
| 3,952,435 A | 4/1976 | Olsen | |
| 3,979,846 A | 9/1976 | Euzarraga | |
| 4,040,593 A | 8/1977 | Wiley | |
| 4,143,496 A * | 3/1979 | Destito ................ | E04F 13/088 273/282.1 |
| 4,437,639 A | 3/1984 | Stein | |
| 4,561,200 A | 12/1985 | Hehn | |
| D282,825 S | 3/1986 | Kostios | |
| 4,605,292 A * | 8/1986 | McIntosh ................ | A47G 1/00 248/205.3 |
| 4,741,119 A | 5/1988 | Baryla | |
| 4,875,259 A | 10/1989 | Appeldorn | |
| 4,892,284 A | 1/1990 | Kelrick | |
| 4,900,604 A | 2/1990 | Martinez et al. | |
| 4,979,323 A | 12/1990 | Wenkman et al. | |
| 5,069,411 A | 12/1991 | Murphy | |
| 5,075,991 A | 12/1991 | Wenkman et al. | |
| 5,077,870 A | 1/1992 | Melbye | |
| 5,133,526 A | 7/1992 | Olmsted | |
| 5,201,101 A | 4/1993 | Rouser | |
| 5,255,885 A | 10/1993 | Iversen | |
| 5,256,231 A | 10/1993 | Gorman | |
| D340,810 S | 11/1993 | Wenkman | |
| 5,342,014 A | 8/1994 | Wilson | |
| 5,360,270 A | 11/1994 | Appeldorn | |
| 5,523,129 A | 6/1996 | McGeehan-Hatch | |
| 5,542,641 A * | 8/1996 | Donovan ............ | A47G 1/1646 248/262 |
| D377,451 S | 1/1997 | Gumowitz et al. | |
| 5,605,729 A * | 2/1997 | Mody ................ | A44B 18/0069 156/66 |
| 5,614,281 A * | 3/1997 | Jackson ............. | A44B 18/0011 24/450 |
| 5,616,394 A | 4/1997 | Gorman et al. | |
| D380,962 S | 7/1997 | Trigger | |
| 5,743,507 A | 4/1998 | Rushing | |
| 5,845,375 A | 12/1998 | Miller et al. | |
| 5,878,987 A | 3/1999 | Hayde | |
| 5,931,439 A | 8/1999 | Lemire | |
| 5,947,438 A | 9/1999 | Lemire | |
| 5,997,981 A * | 12/1999 | McCormack ...... | A44B 18/0011 24/306 |
| 6,032,915 A | 3/2000 | Brindisi | |
| 6,086,973 A | 7/2000 | Hazes | |
| 6,241,210 B1 | 6/2001 | Brindisi | |
| 6,408,795 B1 | 6/2002 | Goodger | |
| D463,741 S | 10/2002 | Green | |
| 6,527,244 B1 | 3/2003 | Kamenstein et al. | |
| D475,620 S | 6/2003 | Chen et al. | |
| 6,666,425 B1 | 12/2003 | Ferguson | |
| 6,692,807 B2 * | 2/2004 | Bries .......................... | C09J 7/02 24/306 |
| D489,599 S | 5/2004 | Lam | |
| 6,820,853 B1 | 11/2004 | DuBarry | |
| 6,832,445 B2 | 12/2004 | Pitzen | |
| 6,972,141 B1 | 12/2005 | Bries et al. | |
| D519,375 S | 4/2006 | Brooks | |
| 7,303,805 B2 | 12/2007 | Seth | |
| D571,146 S | 6/2008 | Sanfillippo et al. | |
| 7,516,524 B2 | 4/2009 | Provost et al. | |
| 7,762,517 B1 | 7/2010 | Leseman | |
| 7,913,967 B1 | 3/2011 | Aleo | |
| 8,397,411 B2 | 3/2013 | Russo | |
| 2002/0142155 A1 | 10/2002 | Steinberg | |
| 2004/0131815 A1* | 7/2004 | Maggio .................... | A47G 1/17 428/40.1 |
| 2004/0221540 A1 | 11/2004 | Simons | |
| 2005/0136214 A1* | 6/2005 | Most .................. | A44B 18/0053 428/100 |
| 2005/0139739 A1* | 6/2005 | Hamerski ............... | F16B 2/005 248/206.5 |
| 2005/0269232 A1 | 12/2005 | Eisenbraun | |
| 2006/0214080 A1 | 9/2006 | De Keratry | |
| 2007/0065618 A1 | 3/2007 | Fischer | |
| 2007/0075211 A1 | 4/2007 | Potter | |
| 2007/0084100 A1* | 4/2007 | DeLong ................ | A47G 1/065 40/776 |
| 2007/0204500 A1* | 9/2007 | Splittgerber ............. | A47G 1/06 40/781 |
| 2009/0068632 A1 | 3/2009 | Thompson | |
| 2009/0139127 A1 | 6/2009 | Southard | |
| 2010/0096532 A1 | 4/2010 | Grev | |
| 2010/0108837 A1 | 5/2010 | Felton | |
| 2010/0116964 A1 | 5/2010 | Aleo | |
| 2011/0042542 A1 | 2/2011 | Russo et al. | |
| 2011/0049325 A1 | 3/2011 | Johnson et al. | |
| 2011/0159234 A1* | 6/2011 | Pai ...................... | A47G 1/1606 428/100 |
| 2011/0163215 A1 | 7/2011 | Walters | |
| 2012/0074275 A1* | 3/2012 | Chang .................... | A47G 1/17 248/205.2 |
| 2012/0233898 A1 | 9/2012 | Horne | |
| 2013/0008013 A1 | 1/2013 | Chang | |
| 2014/0353455 A1 | 12/2014 | Floyd | |

* cited by examiner

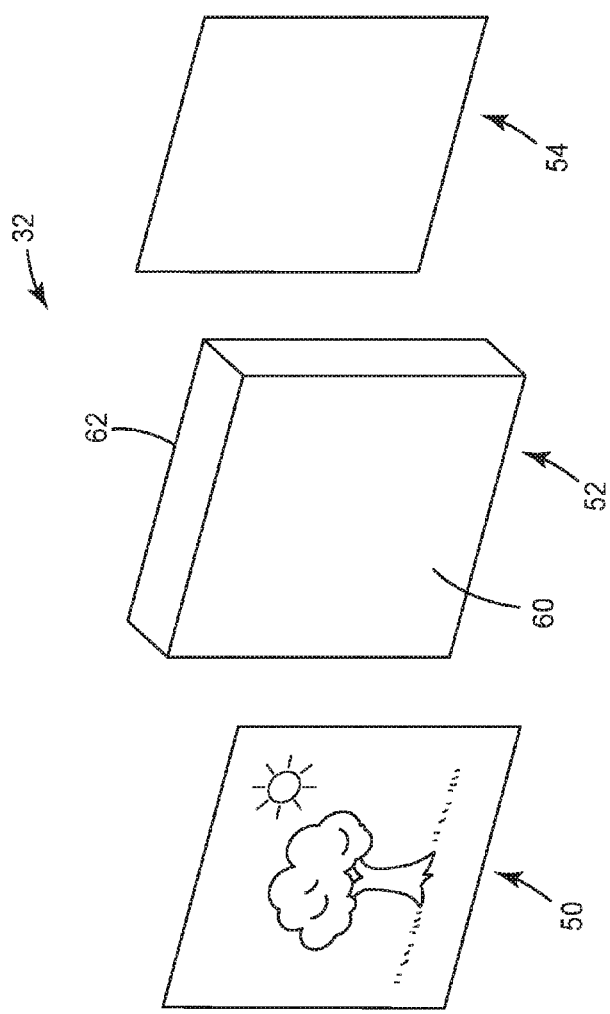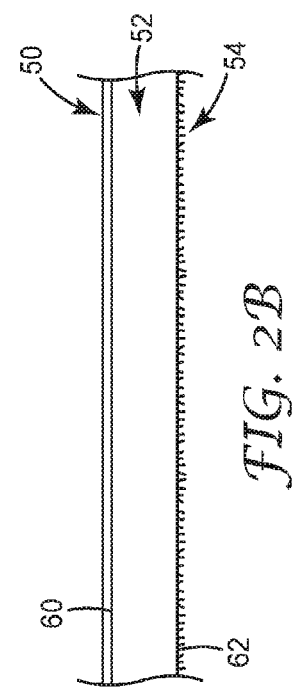

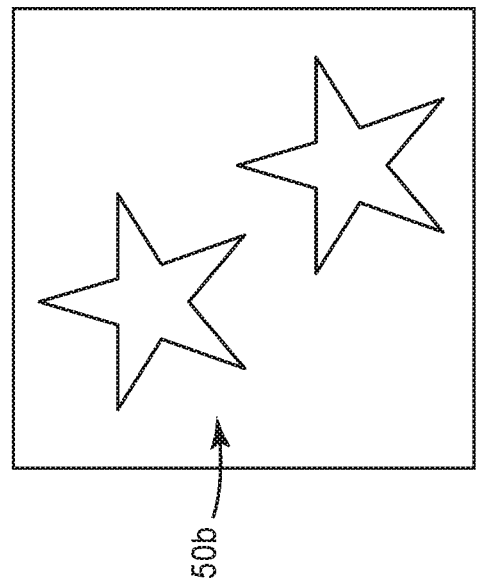
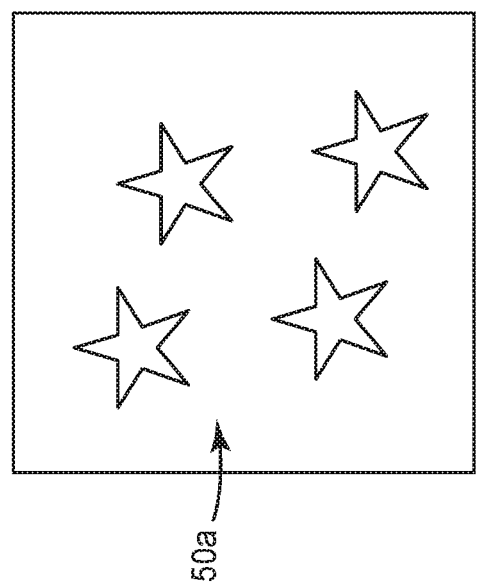

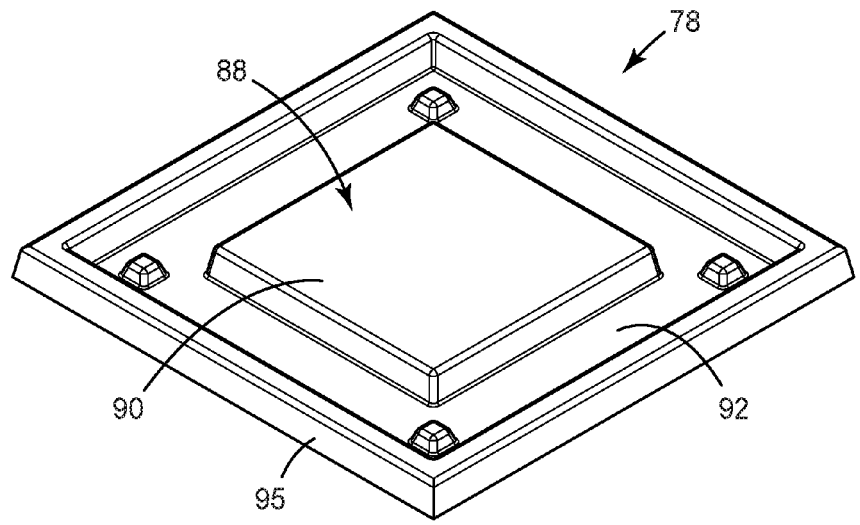
FIG. 7A
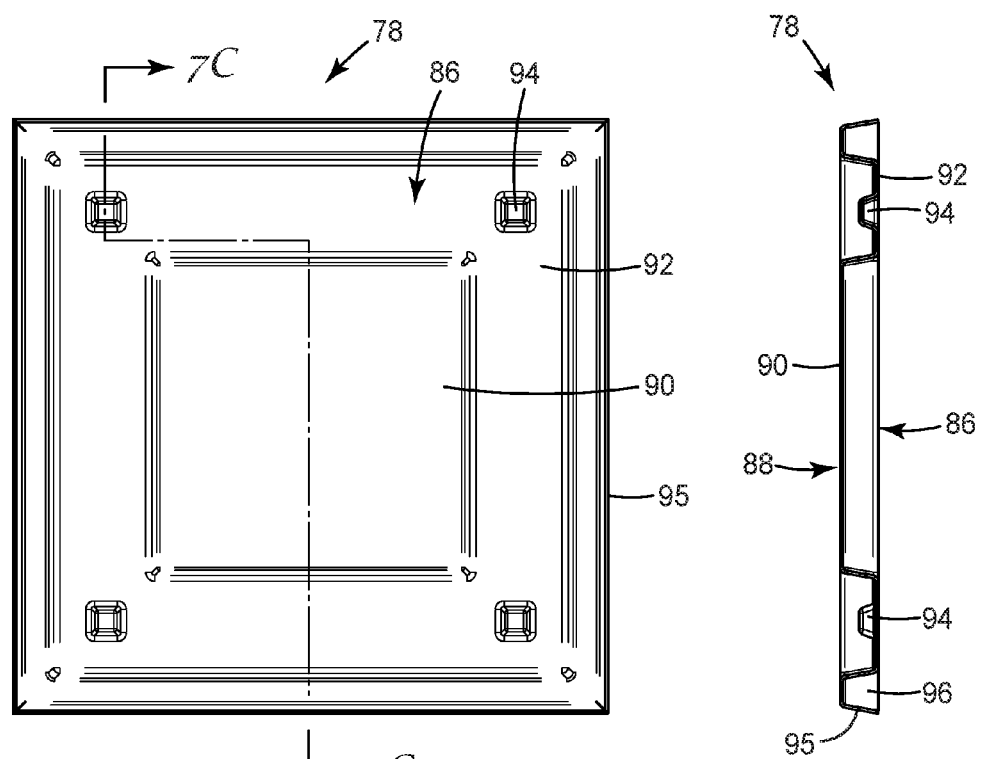
FIG. 7B
FIG. 7C

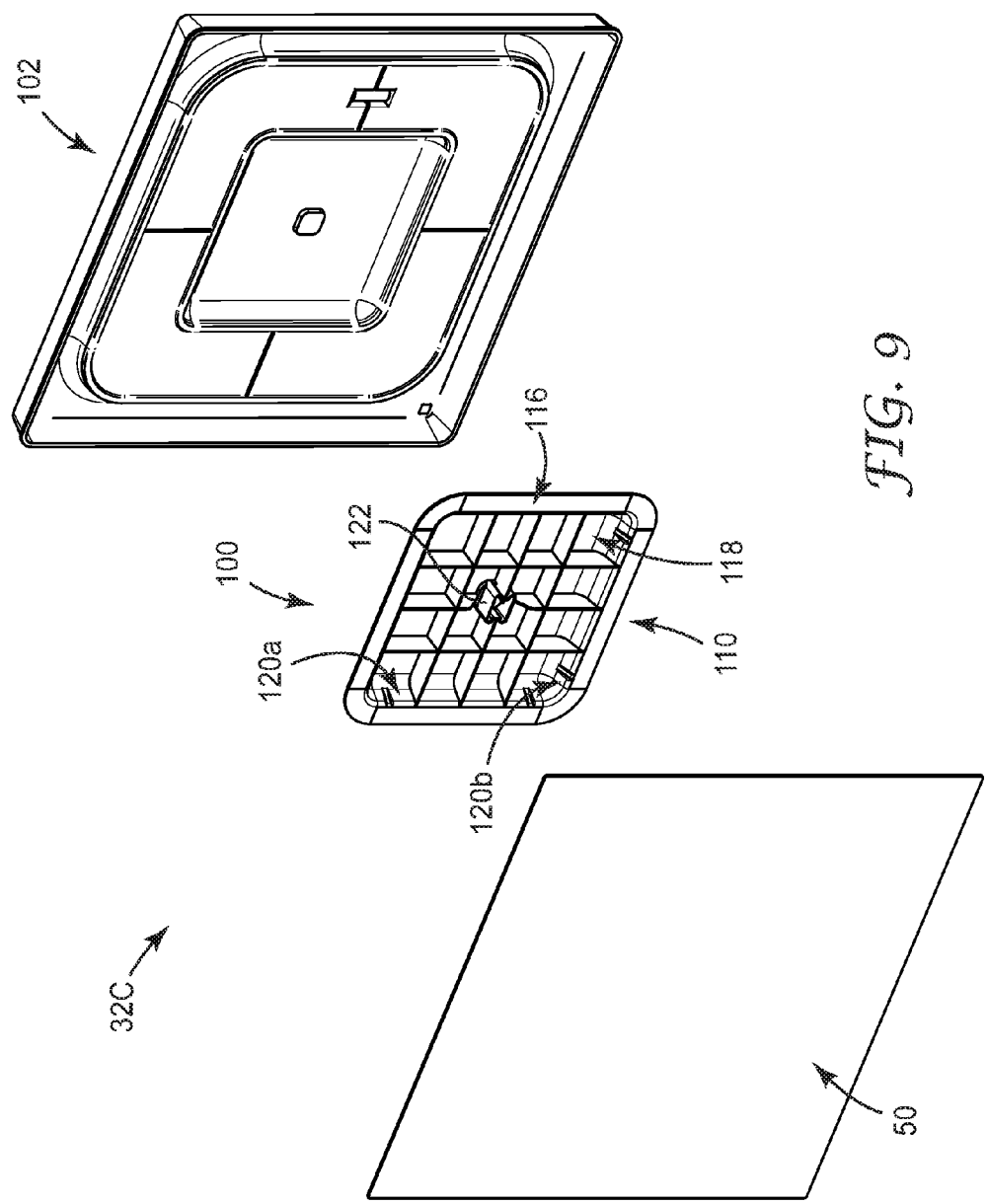

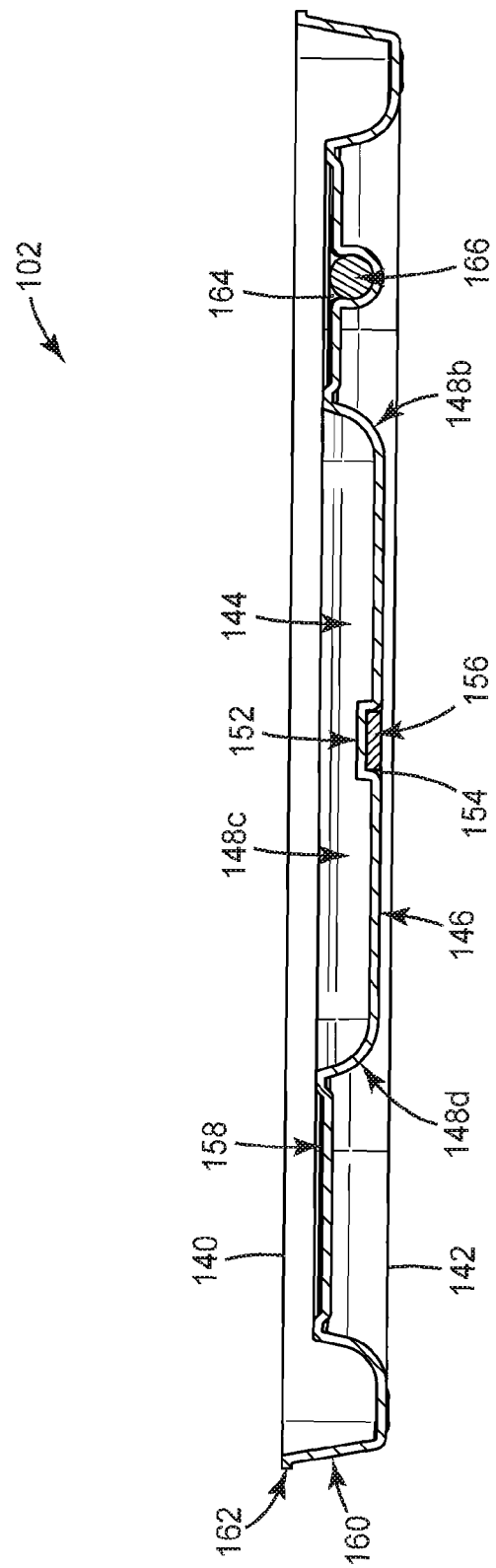

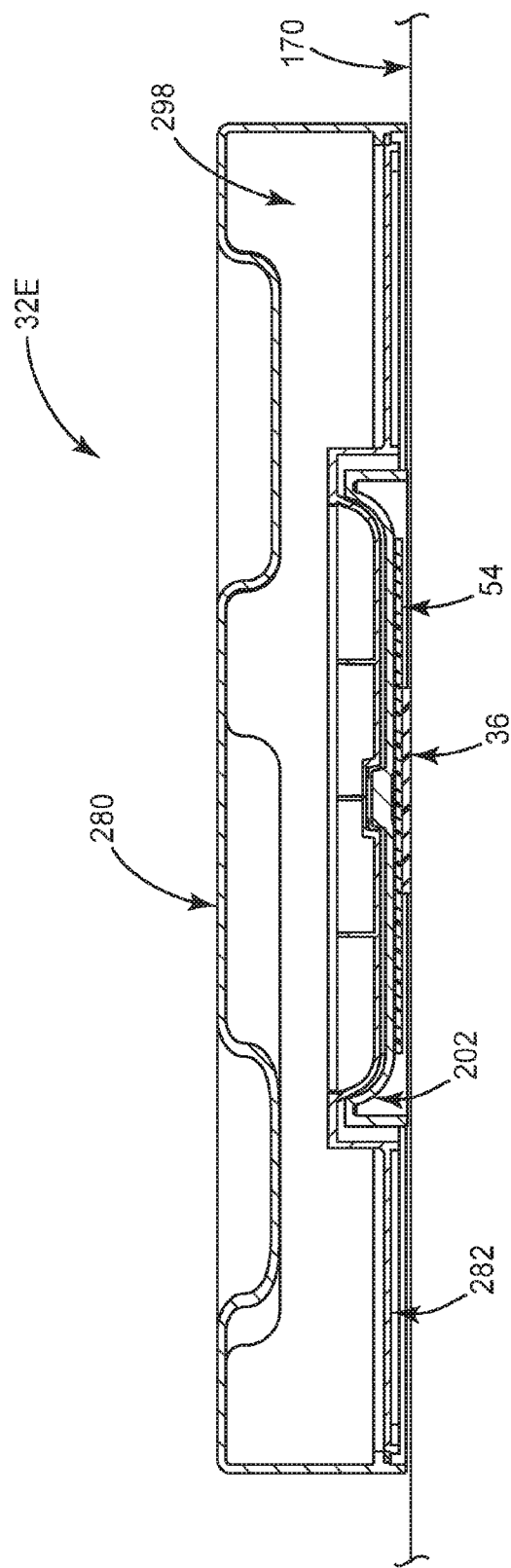

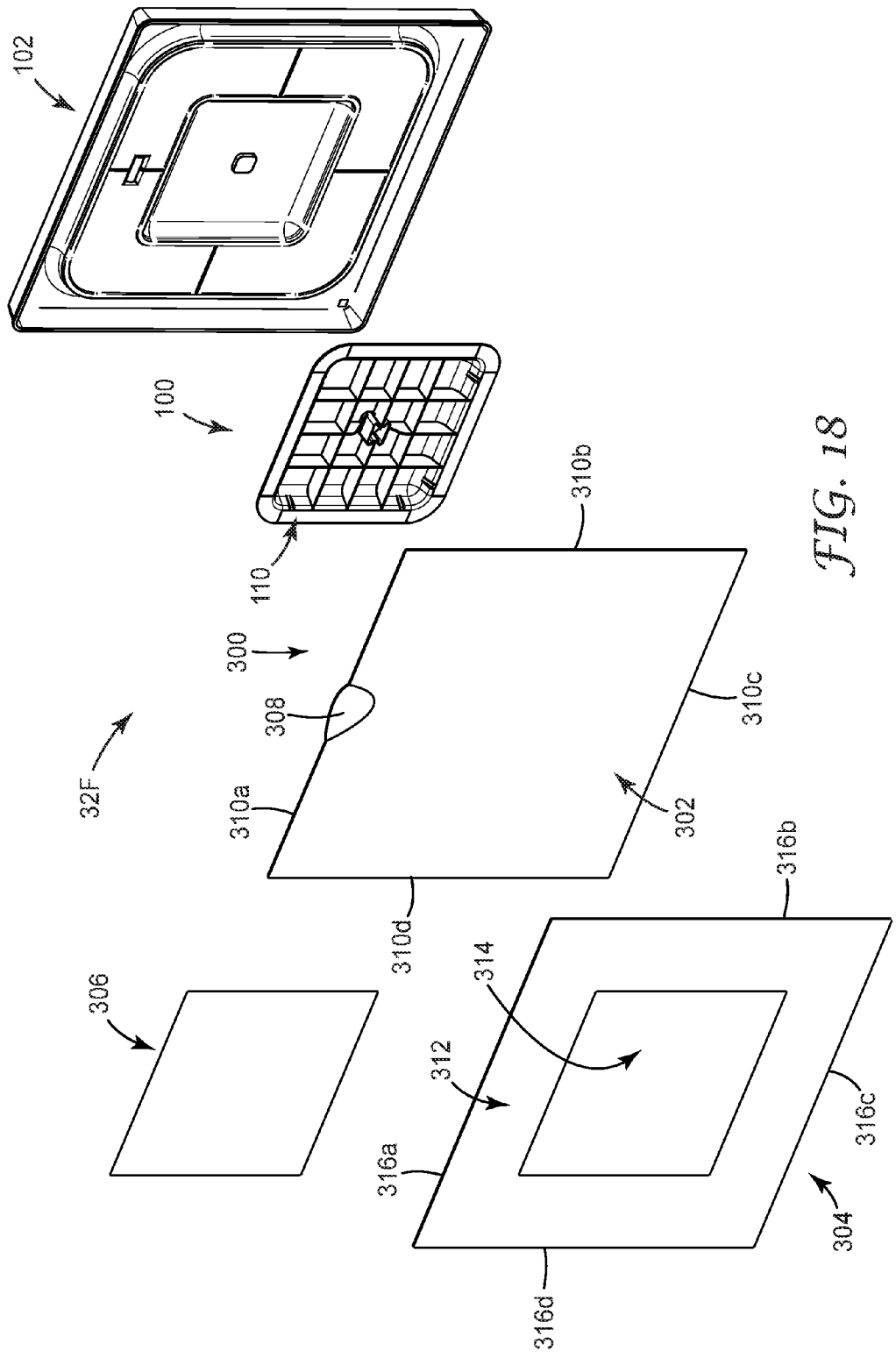

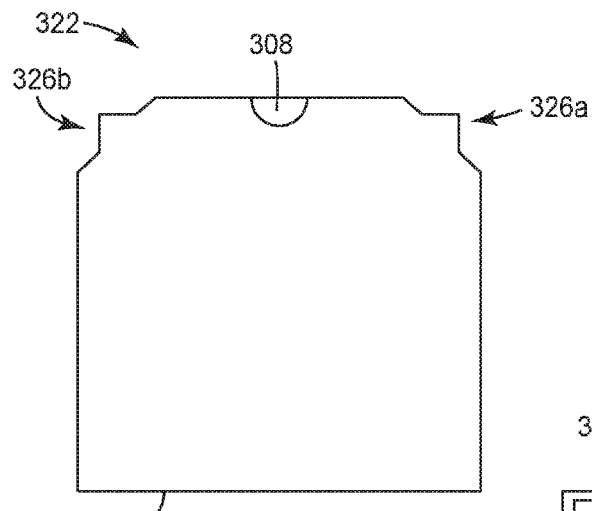
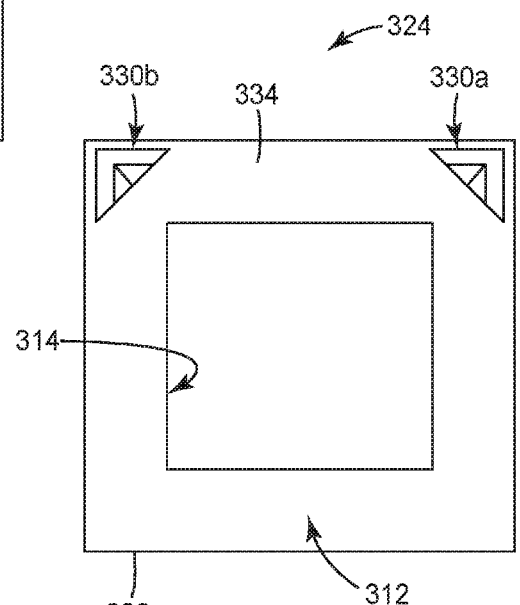
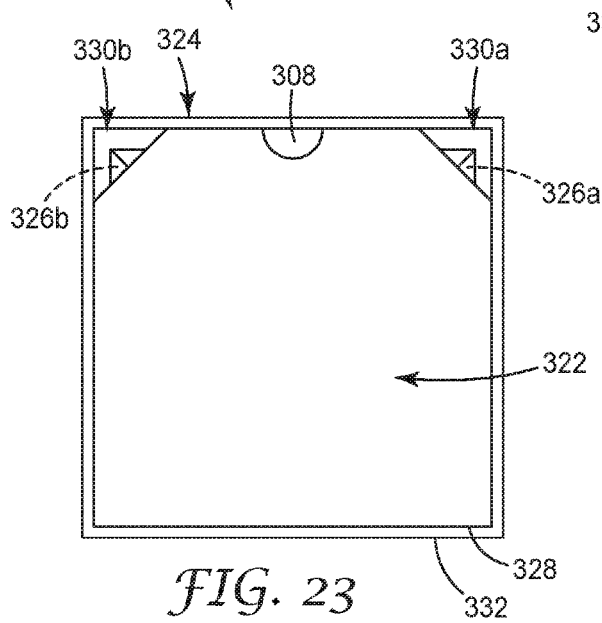
FIG. 21
FIG. 22
FIG. 23

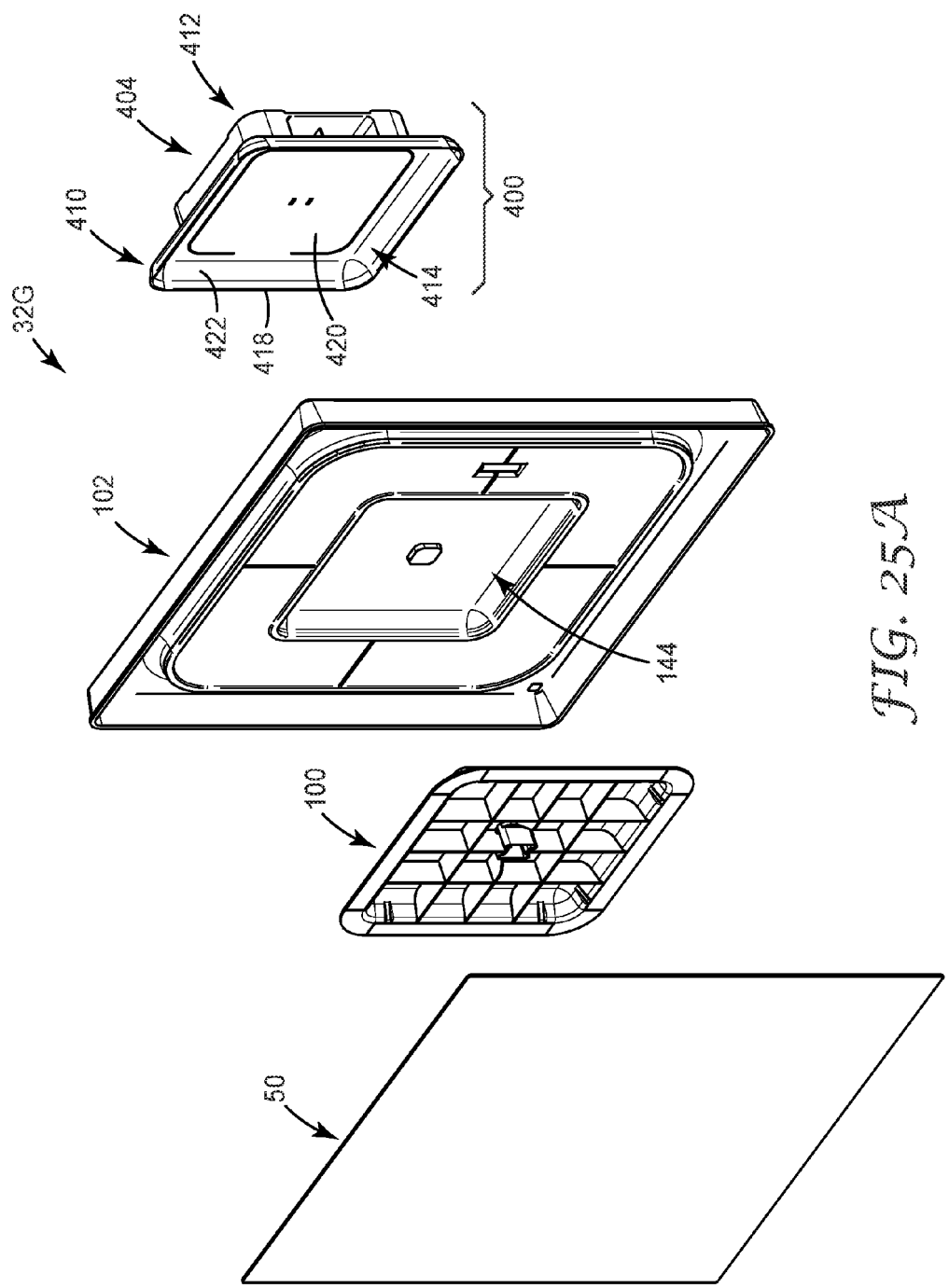

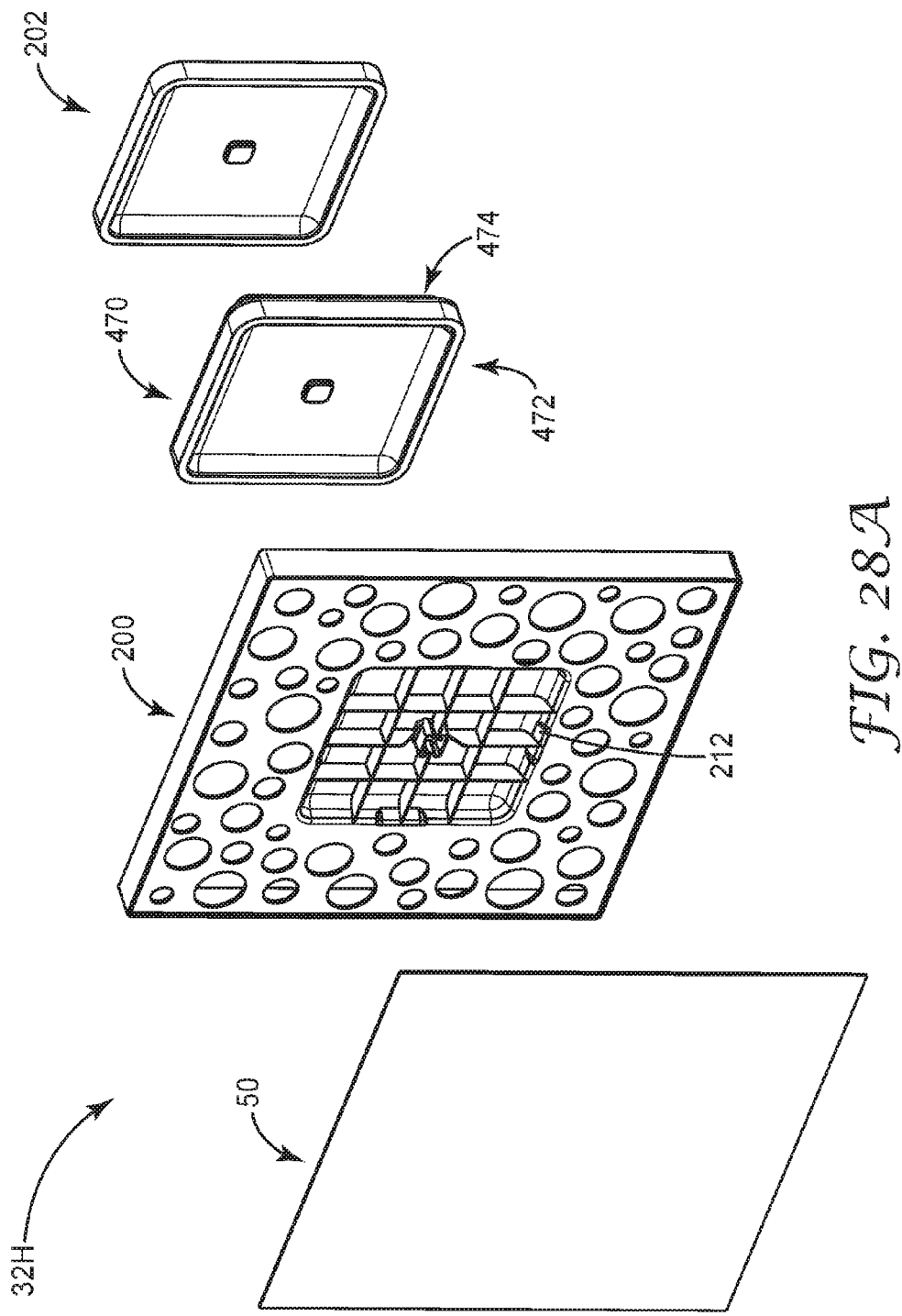

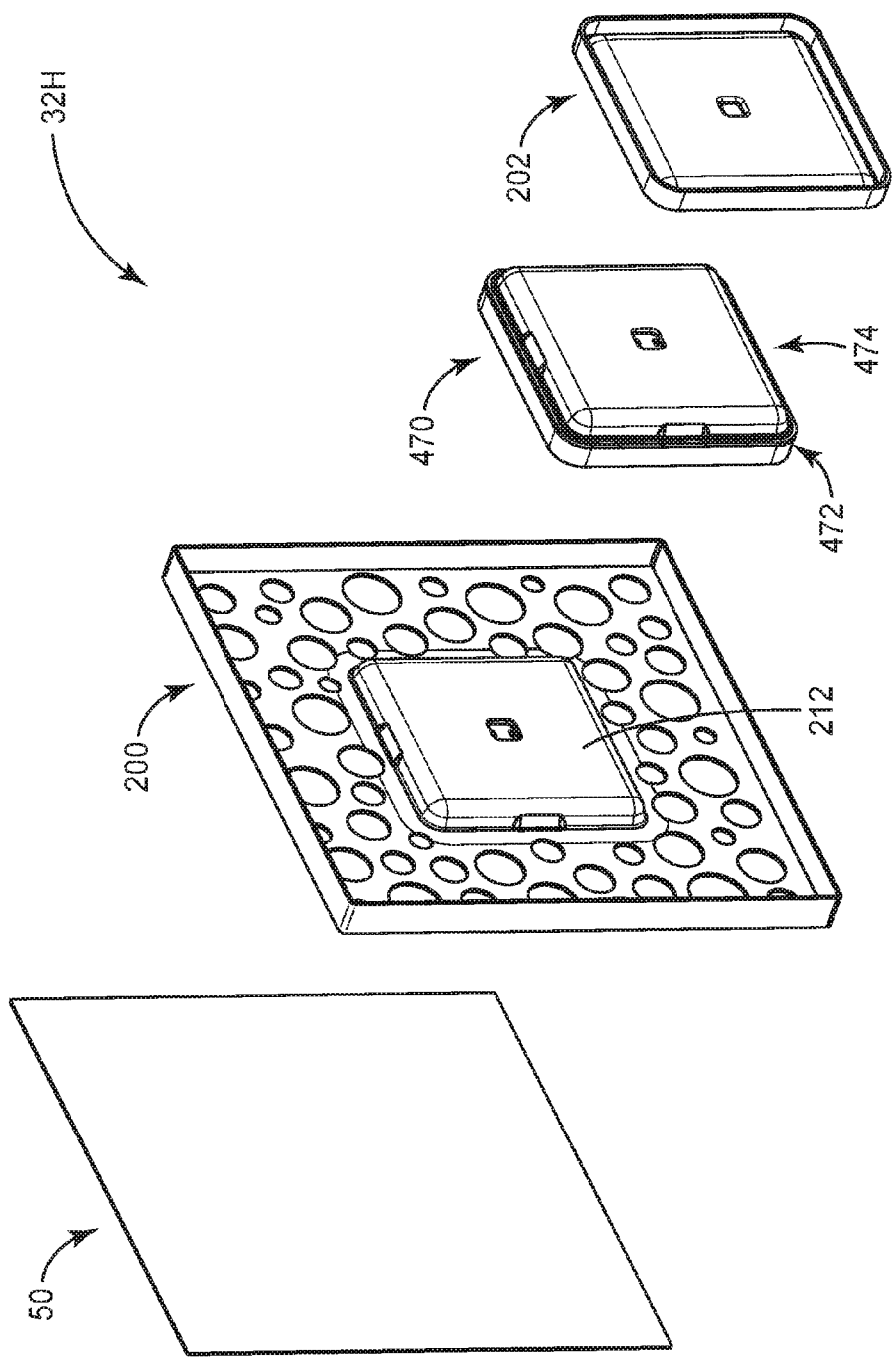

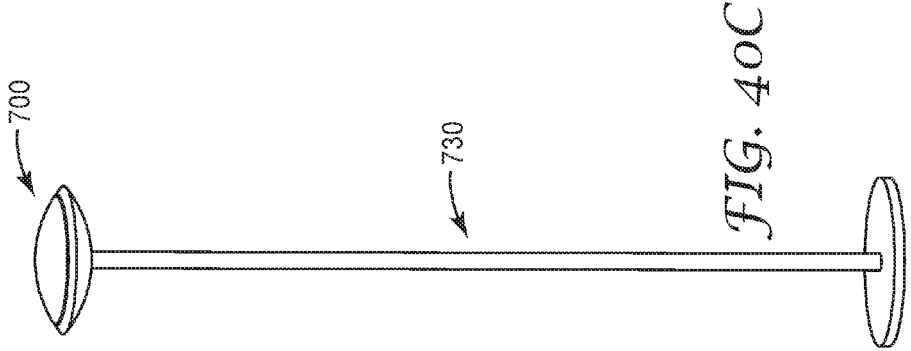
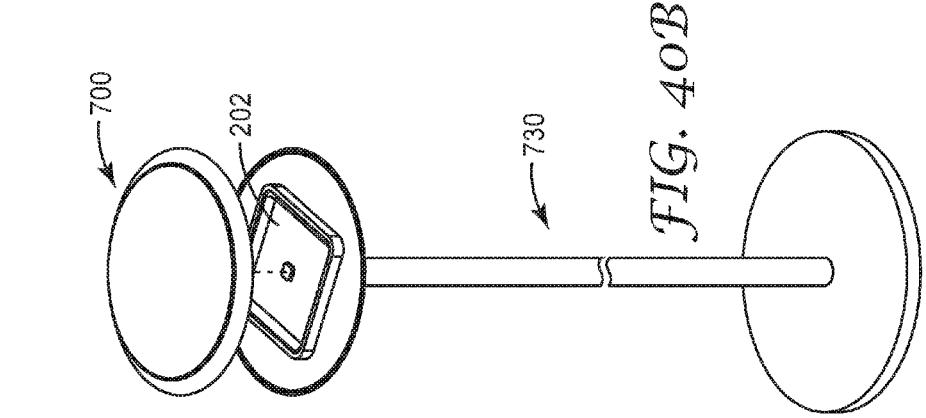
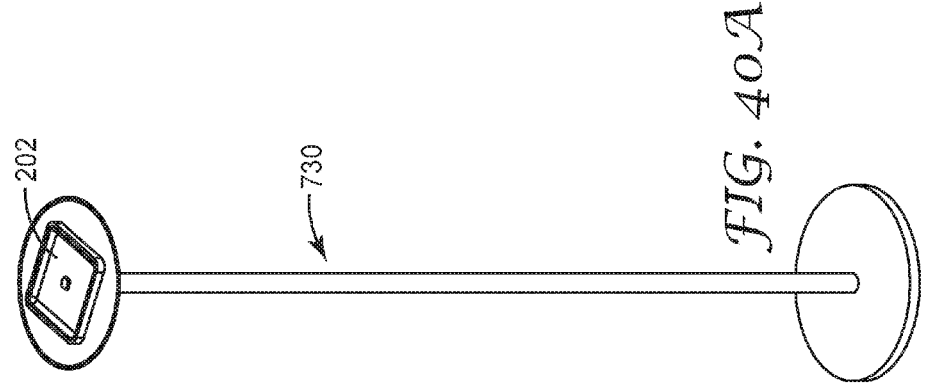

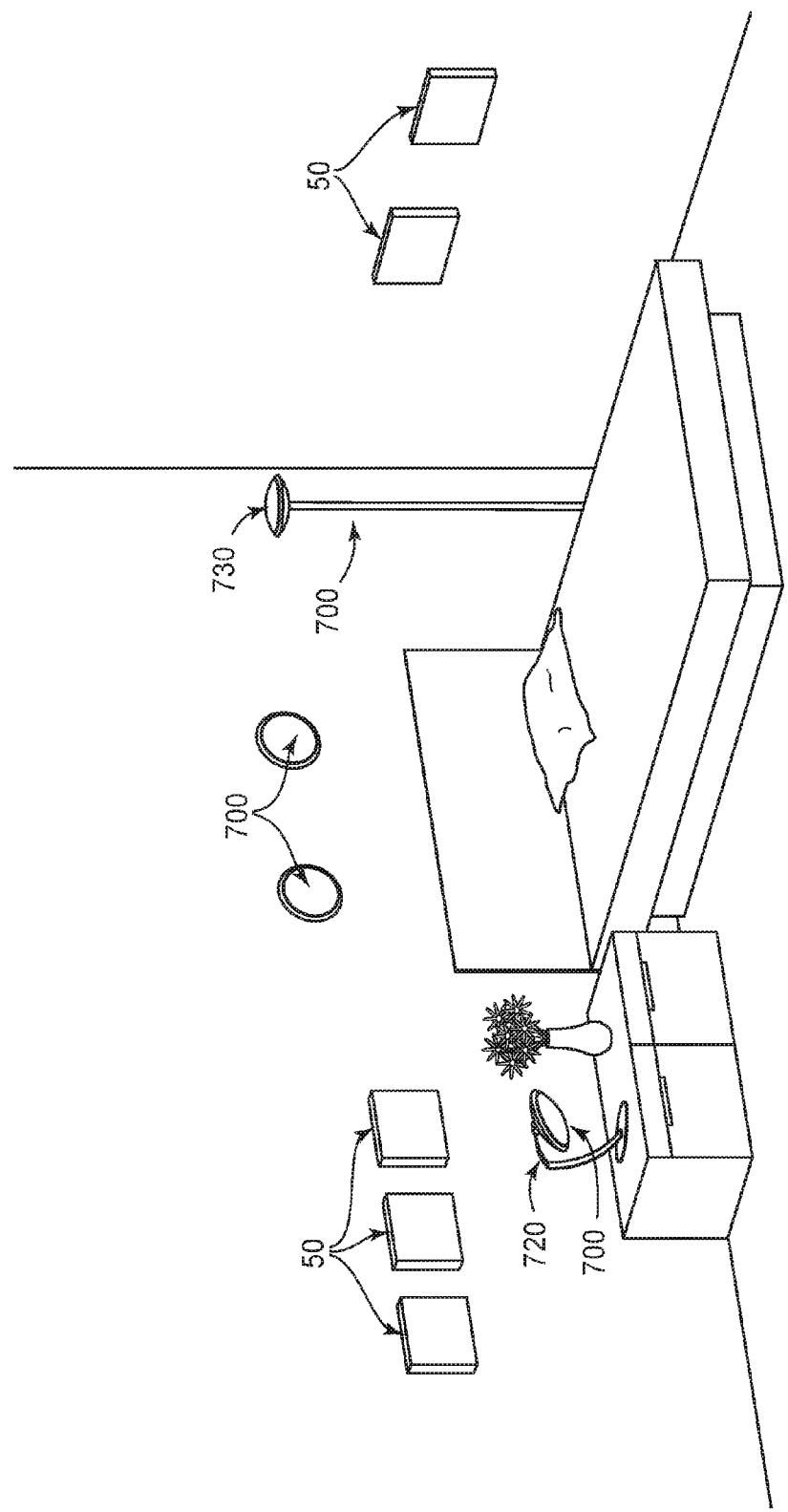

REMOVABLE WALL DECORATION KITS, SYSTEMS AND METHODS

CROSS-REFERENCE TO RELATED APPLICATIONS

This Non-Provisional Patent Application claims the benefit of the filing dates of U.S. Provisional Patent Application Ser. No. 61/830,367, filed Jun. 3, 2013, entitled "REMOVABLE WALL DECORATION KITS, SYSTEMS AND METHODS", U.S. Provisional Patent Application Ser. No. 61/948,946, filed Mar. 6, 2014, entitled "REMOVABLE WALL DECORATION KITS, SYSTEMS AND METHODS" and U.S. Provisional Patent Application Ser. No. 61/988,020, filed May 2, 2014, entitled "REMOVABLE WALL DECORATION KITS, SYSTEMS AND METHODS", which are herein incorporated by reference.

BACKGROUND

The present disclosure relates to wall décor. More particularly, it relates to kits, systems and methods for flexibly mounting multiple decorative elements to a wall.

Conventional wall décor has a plethora of forms. For example, a dwelling's wall(s) can be partially or entirely finished with paint or wallpaper. While the types, styles and end appearances of these wall finishing techniques are nearly endless, a significant amount of time and skill is required to prepare the wall surface and apply the particular finish. Further, the finish is effectively permanent, requiring extensive efforts to remove or replace.

Alternatively (or in addition), various decorative articles, such as artwork, photographs, mirrors, moldings, etc., can be directly fastened to the wall. Typically, one or more mechanical fasteners (e.g., nails, screws or hooks) are secured to the wall and used to support the article. While installation of a decorative article is less time-consuming than painting or applying wall paper, time and skill must be invested to ensure that the mechanical fastener is optimally located along the wall surface. The mechanical fastener permanently damages the wall and cannot easily be repositioned.

More recently, adhesive-based fastening systems have been developed as an alternative to mechanical fasteners. In general terms, these fastening systems are packaged and provided as a pair of pre-cut, adhesive-backed strips. The first strip carries a plurality of hooks (or similar structures), and the second strip carries a plurality of complementary loops. The user must adhere a first one of the two strips to the decorative article, and adhere the second strip to the wall. The article is then supported relative to the wall via engagement between the hooks and loops. A relationship of the decorative article/first strip relative to the wall/second strip can be slightly altered by disconnecting and then reconnecting the hooks and loops, or by a minor rotation of the decorative article/first strip relative to the wall/second strip (without separating the hooks and loops). Further, when complete removal of the decorative article from the wall is desired, the strips can be de-bonded from the decorative article and the wall surface, respectively. Manufacturers of these adhesive-based fastening systems strive to minimize costs while providing an end product that can support a wide variety (and thus sizes and weights) of decorative articles of possible interest to users. This balance is normally achieved by forming the strip pairs to be relatively small (and thus less expensive) but exhibiting relatively high adhesive strength and holding power. With relatively the small surface areas provided by these strips, however, certain drawbacks may arise.

For example, the adhesive utilized with the strips must have a high adhesive strength so that the strips do not delaminate from the corresponding decorative article or wall surface under the weight of the decorative article. This requirement, in turn, requires an aggressive adhesive. While, in theory, the adhesive is formulated to facilitate desired removal of the strip from the wall (or the article) without damaging the wall surface, in some instances the particular wall surface will have a relatively unique finishing that is, in fact, damaged during removal of the aggressive adhesive.

Along these same lines, releasable fastening technology employed by the packaged hook-and-loop adhesive strip pairs must be constructed to account for the possibility that a user may attempt to hang a relatively heavy (and/or large) object. Thus, the hook-and-loop format is conventionally selected to have as high a holding power as possible. In this regard, the holding power provided by a particular format is directly related to a size of the strips themselves. The packaged strip pairs are commonly provided in a specific, relatively small size (e.g., the first strip (hooks) is 1 inch×3 inches, and the second strip (loops) is 1.75 inches×4 inches). While existing hook-and-loop technologies generate a high level of engagement with relatively small surface area strips, a balance with the holding power of the adhesive is required. Because a user expects to be able to reposition the article relative to the wall after initial mounting, the user must be able to easily separate the decorative article/first strip from the wall/second strip. If the holding power of the hook-and-loop fastening system is greater than that of the adhesive, a user applying a pulling force onto the decorative article in an attempt to remove the article from the wall may instead cause the adhesive on one (or both) of the strips to de-bond from the corresponding decorative article or wall surface. Further, releasable fastening systems with elevated holding power may be difficult for some users (e.g., children) to separate.

While packaged, adhesive-based fastening systems are highly popular and have greatly simplified (and made more convenient) the application of a decorative article to a wall, drawbacks remain. Users are overtly limited by the size (and corresponding performance attributes) of the strips. Only a finite number object and wall surface types are amenable to successful mounting using the fastening strips. Further, the fastening systems are specifically designed to mount the article essentially against the wall surface; this limitation inherently stifles the creativity of a user desiring to create space or depth between the article and the wall surface.

In light of the above, a need exists for improved wall decoration systems and methods that facilitate rapid mounting, reposition, and removal of a decorative article.

SUMMARY

Some aspects of the present disclosure relate to a system for decorating a wall surface. The system includes a décor assembly and a complementary fastening structure. The décor assembly includes a décor element opposite a releasable fastening structure. The releasable fastening structure provides a plurality of first fastening elements. The complementary fastening structure is provided apart from the décor assembly and includes a pressure sensitive adhesive opposite a plurality of second fastening elements. The first fastening elements are releasably mateable with the second fastening elements to define a releasable fastening system.

The system is configured such that a Cleavage Strength established by the adhesive against a wall surface is greater than a Cleavage Strength established by the releasable fastening system, and an omni-directional Dynamic Shear Strength of the releasable fastening system is at least 10 lbs. The releasable fastening system can comprise low profile hooks and loops, exhibiting relatively low holding power. In some embodiments, the system further includes at least one spacer assembly adapted to be interposed between the décor assembly and the complementary fastening structures to establish depth between the décor assembly and the wall surface. In related embodiments, the décor assembly includes a backer maintaining the décor element and a base maintaining the releasable fastening structure, with the spacer assembly configured to releasably mount with one or both of the backer and the base.

Kits and systems of the present disclosure facilitate quick and easy decoration, and re-decoration, of a wall. The flexible décor attachment techniques facilitated by the releasable fastening system allows a user to simply position and re-position a plethora of different décor assemblies (each presenting a different visual appearance) along a wall surface. Further, the optional spacer assemblies allow a user to establish depth between the mounted décor element and the wall surface, creating a three-dimensional effect.

BRIEF DESCRIPTION OF THE DRAWINGS

FIG. 2A is a perspective, exploded view of a décor assembly in accordance with principles of the present disclosure and useful with the system of FIG. 1;

FIG. 2B is a cross-sectional view of the décor assembly of FIG. 2A;

FIGS. 3A and 3B are front views of two décor assemblies useful with the system of FIG. 1;

FIG. 7A is rear perspective view of a base component of the décor assembly of FIG. 5;

FIG. 7B is rear plan view of the base of FIG. 7A;

FIG. 7C is a cross-sectional view of the base of FIG. 7B taken along the line 7C-7C;

FIG. 9 is a perspective, exploded view of a portion of another décor assembly in accordance with principles of the present disclosure;

FIG. 11C is a cross-sectional view of the base of FIG. 11A taken along the line 11C-11C;

FIG. 17B is a cross-sectional view of the décor assembly of FIG. 17A mounted to a wall surface;

FIG. 18 is an exploded perspective view of another décor assembly in accordance with principles of the present disclosure;

FIG. 21 is a rear plan view of a backing of the décor element of FIG. 20

FIG. 22 is a rear plan view of a cover of the décor element of FIG. 20;

FIG. 23 is a rear plan view illustrating the décor element of FIG. 20 upon final assembly;

FIG. 25A is a front exploded perspective view of another décor assembly in accordance with principles of the present disclosure;

FIG. 28A is a front exploded perspective view of another décor assembly in accordance with principles of the present disclosure;

FIG. 28B is a rear exploded perspective view of the décor assembly of FIG. 28A;

FIGS. 40A-40C illustrate a floor light system in accordance with principles of the present disclosure and including a décor fixture component of the décor assembly of FIG. 37A; and FIG. 41 is a simplified perspective view of a portion of a room decorated with assemblies and systems of the present disclosure.

DETAILED DESCRIPTION

Figure 1:
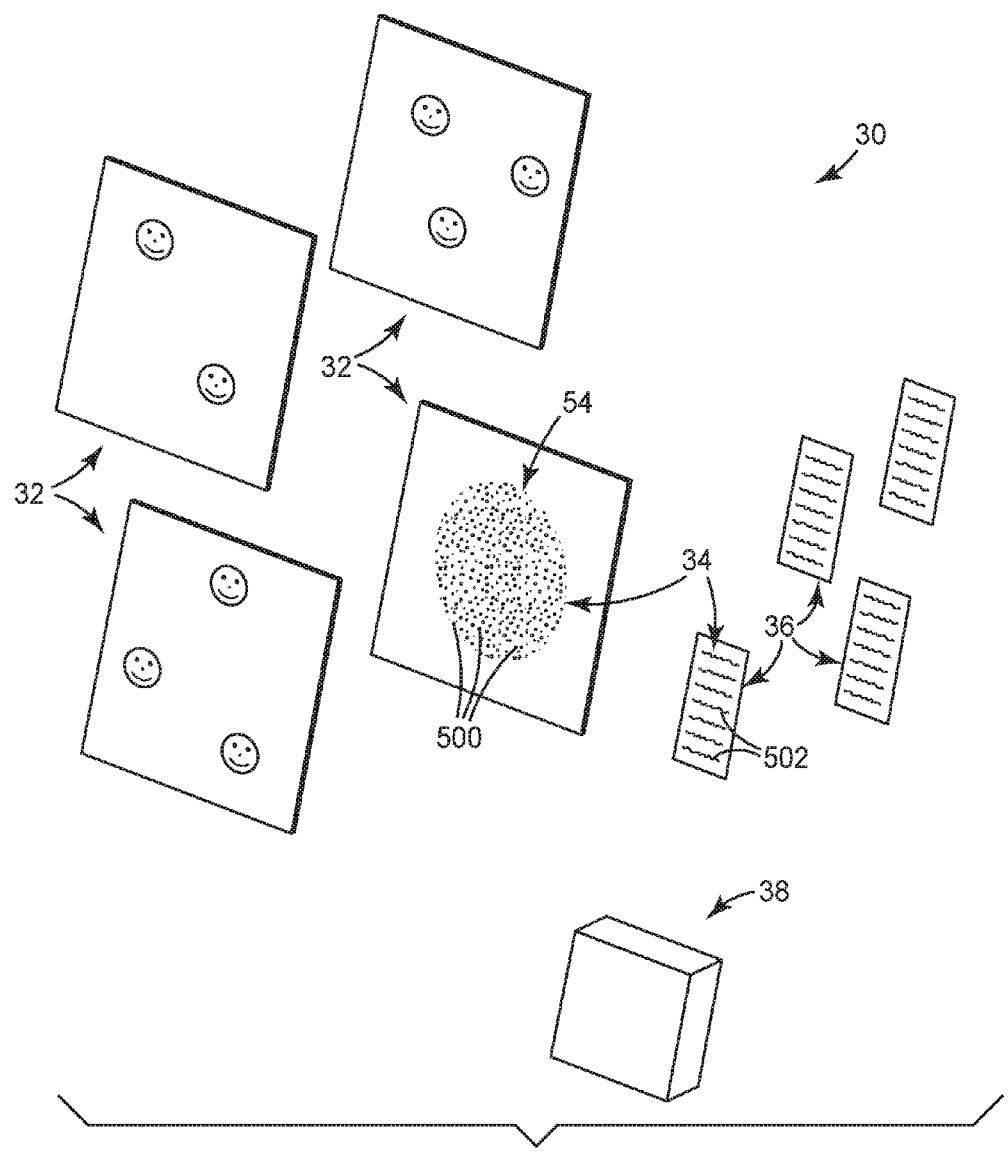
FIG. 1 is a simplified perspective view of a wall decorating system or kit in accordance with principles of the present disclosure.

Aspects of the present disclosure relate to wall decorating systems that can optionally be provided in kit form, along with methods of using the systems and kits. One embodiment of a kit 30 for decorating a wall is shown in FIG. 1, and includes a plurality of décor assemblies 32 (the rear side of one of which is shown in FIG. 1). The décor assemblies 32 each carry one component of a two-part releasable fastening system 34 (referenced generally), with the kit 30 further including a plurality of complementary fastening structures 36 that each carry the second component of the releasable fastening system 34. One or more spacer assemblies 38 are optionally included with the kit 30, along with packaging (not shown) maintaining the components 32-38 and an optional instructions for use (not shown). Systems of the present disclosure can be considered to include at least one of the décor assemblies 32, at least one complementary fastening structures 36, and optionally at least one of the spacer assemblies 38. Details on the various components are provided below. In general terms, however, the décor assemblies 32 are provided apart from the complementary fastening structures 36 within the packaging. A user seeking to decorate a wall (not shown) can apply one (or more) of the complementary fastening structures 36 to the wall surface, and then removably secures a desired one of the décor assemblies 32 to the so-applied complementary fastening structure 36. Where provided, a selected one of the spacer assemblies 38 is optionally interposed between the décor assembly 32 and the complementary fastening structure 36 and/or is within a structure of the décor assembly 32 as described below (e.g., in some embodiments, the spacer assembly 38 can be considered a component or sub-component of the décor assembly 32). Regardless, the releasable fastening system 34 facilitates easy, flexible or repositionable attachment between the décor assembly 32 and the wall surface, as well as replacing one décor assembly 32 with another décor assembly 32 having a different visual appearance.

Décor Assembly 32

The décor assembly 32 can assume a wide variety forms and in some embodiments generally includes a décor element 50, a panel or panel assembly 52 (drawn generally), and a releasable fastening structure 54 as reflected in FIGS. 2A and 2B. The décor element 50 is mounted to the panel 52, as is the releasable fastening structure 54. In this regard, the releasable fastening structure 54 provides fastening elements configured to releasably mate with corresponding fastening elements of the complementary fastening structures 36 (FIG. 1) and thus forms part of the releasable fastening system 34 (FIG. 1) as described below.

The décor element 50 can be formed apart from and applied to the panel or panel assembly 52, or can be integrally formed on or by the panel 52. The décor element 50 can be permanently carried by the panel 52, or can be releasably mounted to the panel 52 (e.g., a pressure sensitive adhesive is employed such that the décor element 50 can be re-positioned relative to the panel 52). In some embodiments, the décor element 50 has a size and shape commensurate with that of the corresponding panel 52. In yet other embodiments, the décor element 50 can be slightly larger than the corresponding panel 52 and is configured to wrap around sides of the panel 52 for attachment thereto. Regardless, the décor element 50 provides a visually decorative effective. Examples of possible decorative effects are limitless. For example, the decorative effect of the décor element 50 can be a two-dimensional presentation of: a fanciful graphic; a representation (photograph or artistic rendition) of an object, person, place, animal, or combinations thereof; imaginary objects or characters (e.g., cartoon character); origami; faux surfaces (e.g., a wood grain appearance); etc. Alternatively or in addition, the décor element 50 can include differing surfaces, such as a texture or similar attribute generating a three-dimensional visual effect, such as with woven fabrics or ribbons. In yet other embodiments, the décor element 50 can be or can include a chalk board and/or a white board. Thus, the décor element 50 can be, or can create the visual effect of a three-dimensional object such as a sculpture.

In some embodiments, the decorative effect of two or more of the décor assemblies 32 provided with the kit 30 (FIG. 1) can have a similar theme, but differ at least slightly. For example, FIGS. 3A and 3B illustrate non-limiting possibilities of first and second décor elements 50a, 50b provided with wall decorating kits and systems of the present disclosure. The décor elements 50a, 50b each embody a fanciful decorative effect of similar lines, shapes and colors;

however, the specific arrangement of lines (and/or colors) of the first décor element 50*a* differs from that of the second décor element 50*b*. With this configuration, a user of the kit 30 has the option of selecting the most desirable one of the décor assemblies 50*a*, 50*b*, or can locate both of the corresponding décor assemblies 32 in close proximity to one another with the décor elements 50*a*, 50*b* arranged as desired to create a combined visual effect. In other embodiments, the décor assemblies 32 provided with the kit 30 can have identical décor elements 50 (and thus identical decorative effects) such that when placed side-by-side, a continuous, uninterrupted visual effect is generated.

It will be understood that the decorative effects described above are but a few envisioned by the present disclosure. Virtually any visual effect can be embodied into the décor element 50. In yet other embodiments, the décor element 50 is configured to provide acoustic control; with these and other, similar embodiments, the décor element 50 need not necessarily create a discernible or marked visual effect.

In some embodiments, the décor element 50 is generated by the manufacturer of the wall decorating system and provided to the end user in final form. In other embodiments, wall decoration systems of the present disclosure are configured such that an end user can create a desired décor element 50. With these embodiments, a user can generate a desired picture (e.g., photograph) or design in a desired form (e.g., paper, fabric, etc.) and utilizes the so-generated picture or design as, or as part of, the décor element 50 (e.g., applying the photograph or other image to the panel 52). In other words, with some wall decorating systems of the present disclosure, the user is provided with one more panels or panel assemblies 52 that are configured to receive a user-generated décor element 50 (examples of which are provided below), typically printed on paper or photographic-type paper. The so-configured panel 52 can provide slots for receiving the user-generated décor element 50 and/or provide other features (e.g., wood strips that allow a user to staple the user-generated décor element 50 to the panel 52, clips, etc.). In other related embodiments, the user can electronically provide (e.g., email, website download, etc.) the manufacturer of the wall decorating system 30 with one or more desired decoration subject matter, with the manufacturing then creating the décor element 50 based upon the provided subject matter. For example, the user can provide the manufacturer with one or more digital photographs or other design in digital format. The manufacturer reviews the submitted subject matter, and reformats (e.g., crops or otherwise adjusts) to correspond with size and other parameters of the panel 52, and delivers to the user an appropriately formatted décor element 50 for implementation by the user as s/he sees fit (e.g., the user can secure the décor element 50 to one of the panels 52). In yet other embodiments, the manufacturer provides the user with a completed décor assembly 32, utilizing the user-provided subject matter as the basis for the décor element 50. Along these same lines, the manufacture and/or end-user can manipulate the digitally-stored subject matter of interest in a variety of manners, including dividing the subject matter into two or more sections, with each section serving as one of the décor elements 50.

Returning to FIGS. 2A and 2B, in some embodiments the panel or panel assembly 52 is a lightweight structure defining opposing, first and second major faces 60, 62. The lightweight nature of the panel 52 can be characterized in terms of material density. In some embodiments, a density of the panel 52 material is less than 5 g/cm$^3$, alternatively less than 3 g/cm$^3$, alternatively on the order of 1 g/cm$^3$. In some embodiments, the panel 52 is optionally relatively thin, for example a thickness on the order of 0.120 inch. One or both of the major faces 60, 62 can be substantially flat or planar (e.g., within 10% of a truly flat surface), and in some embodiments in which the panel 52 is a singular, homogenous structure, the panel 52 is relatively rigid characterized by the panel 52 not bending in response to expected user-applied forces during use. For example, it is contemplated that in some embodiments, a cleavage force on the order of 6 lbs/inch width or less will be applied by a user to the panel 52 to effectuate disengagement of the releasable fastening system 34; the panel 52 is sufficiently rigid so as to not permanently deform under the applied force conditions. The lightweight, rigid construction of the panel 52 uniquely provides sufficient support for the décor element 50 and reduces the holding forces required of the releasable fastening system 34 (FIG. 1). That is to say, because a large majority of a mass of the décor assembly 32 is attributable to the panel 52 and because the panel 52 is lightweight, a lesser degree of holding power can be designed into the releasable fastening system 34 than is otherwise associated with conventional, packaged hook-and-loop fastener strips.

In some embodiments, the panel 52 is a singular, homogeneous body provided as a substrate or laminate that forms the first and second major faces 60, 62 as continuous surfaces. For example, the panel 52 can be formed from various materials, such as micro-flute corrugated board, corrugated board, foam core or similar foam board, paper board, molded fiber board, wood, corrugated plastic board, polymer foam or materials of a similar nature or similar characteristics, and combinations thereof are acceptable. With embodiments in which the panel 52 forms at least the first major face 60 as a continuous surface, the décor element 50 can be optionally be formed directly on or by the panel 52 (e.g., a desired graphic can be printed directly on to the first major face 60). In other embodiments, the décor element 50 can be separately formed and subsequently applied (e.g., adhesively bonded) to the first major face 60. In other embodiments, the panel 52 can form one or both of the major faces 60, 62 as discontinuous surfaces (e.g., the panel 52 can have a honeycomb format).

Returning to FIGS. 2A and 2B, regardless of the exact format, each of the décor assemblies 32 provided with the kit 30 (FIG. 1) can have an identically formatted panel or panel assembly 52, including, in some embodiments, an identical shape and/or size. For example, in some embodiments, a perimeter of the panel 52 of each of the décor assemblies 32 (and/or of the décor element 50 carried or formed thereby) defines a parallelogram (square, rectangle, etc.), and has a length and a width of 16 inches or less. In some embodiments, each of the panels 52 is 12 inches by 12 inches in size. Alternatively, other shapes and maximum dimensions are also envisioned. In yet other embodiments, the panels 52 of two (or more) of the décor assemblies 32 provided with the kit 30 can differ from one another in terms of at least shape and/or shape.

Figure 4:
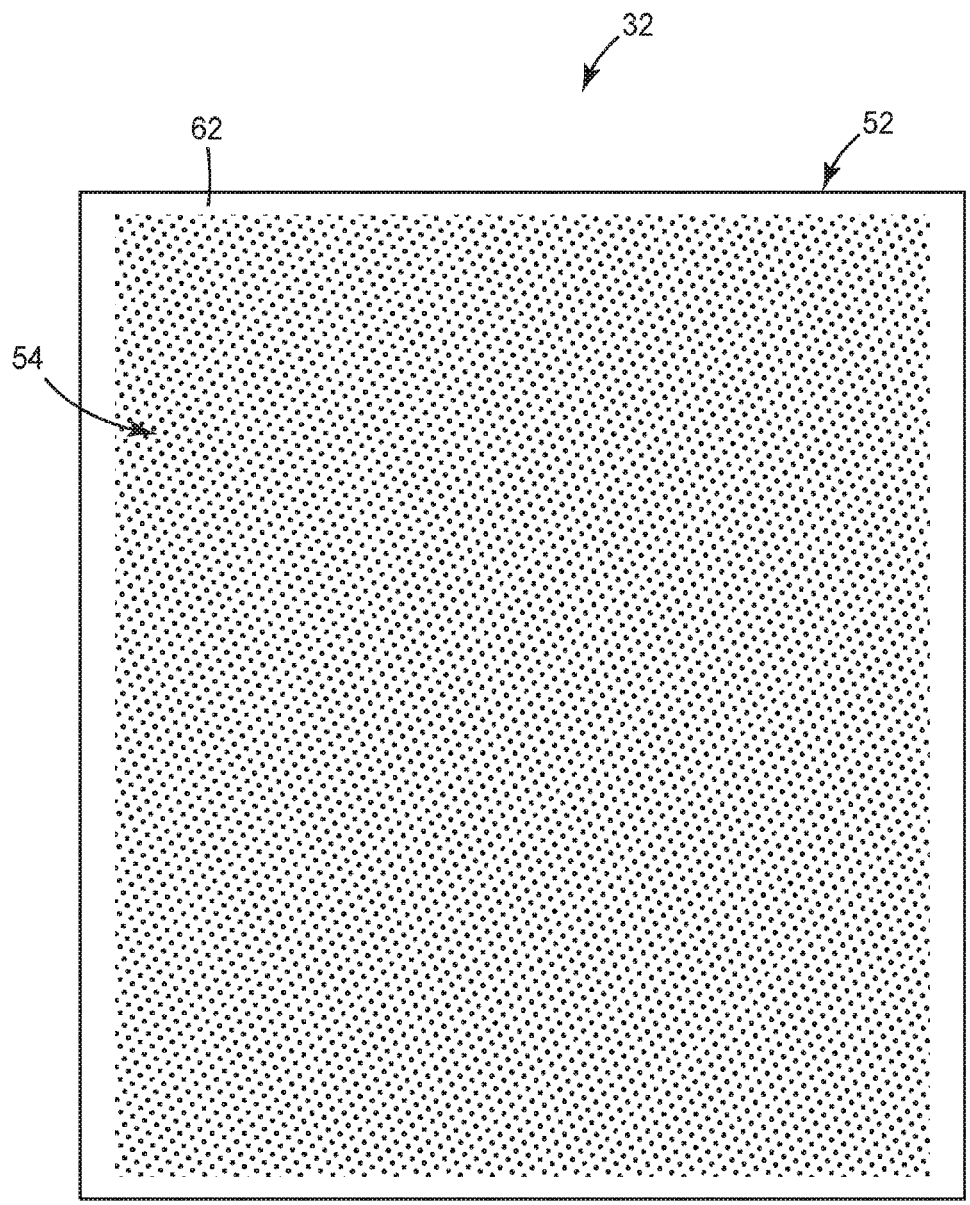
FIG. 4 is a rear plan view of a décor assembly in accordance with principles of the present disclosure and useful with the kit of FIG. 1.

Features of the releasable fastening structure 54 are described in greater detail below in conjunction with the releasable fastening system 34. Relative to a construction of the décor assemblies 32, the releasable fastening structure 54 is optionally permanently secured to the second major face 62 of the panel or panel assembly 52, for example adhesively bonded to the panel 52 by a permanent adhesive. Other techniques for permanently attaching the releasable fastening structure 54 to the second major face 62 are also acceptable, for example heat fusion, stitching, etc. As provided to a user, then, with the wall decorating kits and systems of the present disclosure, the first component of the two-part releasable fastening system 34 is optionally pre-assembled (and permanently assembled) to the décor element 50 as part of the décor assembly 32. In yet other embodiments, the releasable fastening structure 54 is removably connected (e.g., pressure sensitive adhesive) to the panel or panel assembly 52. As reflected in FIG. 4, regardless of an exact format, the releasable fastening structure 54 optionally encompasses a substantial portion of the surface area of the second major face 62. For example, in some embodiments, the releasable fastening structure 54 is sized and shaped to encompass or cover at least 20% of the second major face 62 (e.g., the second major face 62 can have outer dimension of 12 inches by 12 inches or an available surface area of 144 in$^2$, and the releasable fastening structure covers at least 20% of the available surface area (e.g., at least 28.8 in$^2$)). In other embodiments, the releasable fastening structure 54 is sized and shaped to encompass at least a majority (e.g., more than 50%) of the second major face 62, alternatively at least 60%, and in other embodiments at least 75%. In yet other embodiments, the releasable fastening structure 54 encompasses an entirety, or nearly an entirety (e.g., at least 95%), of the available surface area of the second major face 62. With these and similar constructions, a substantial surface area of the releasable fastening structure 54 is available for mounting the décor assembly 32 as described below, in contrast to conventional, packaged adhesive-backed removable fastening systems in which only small strip of material is available.

Figure 5:
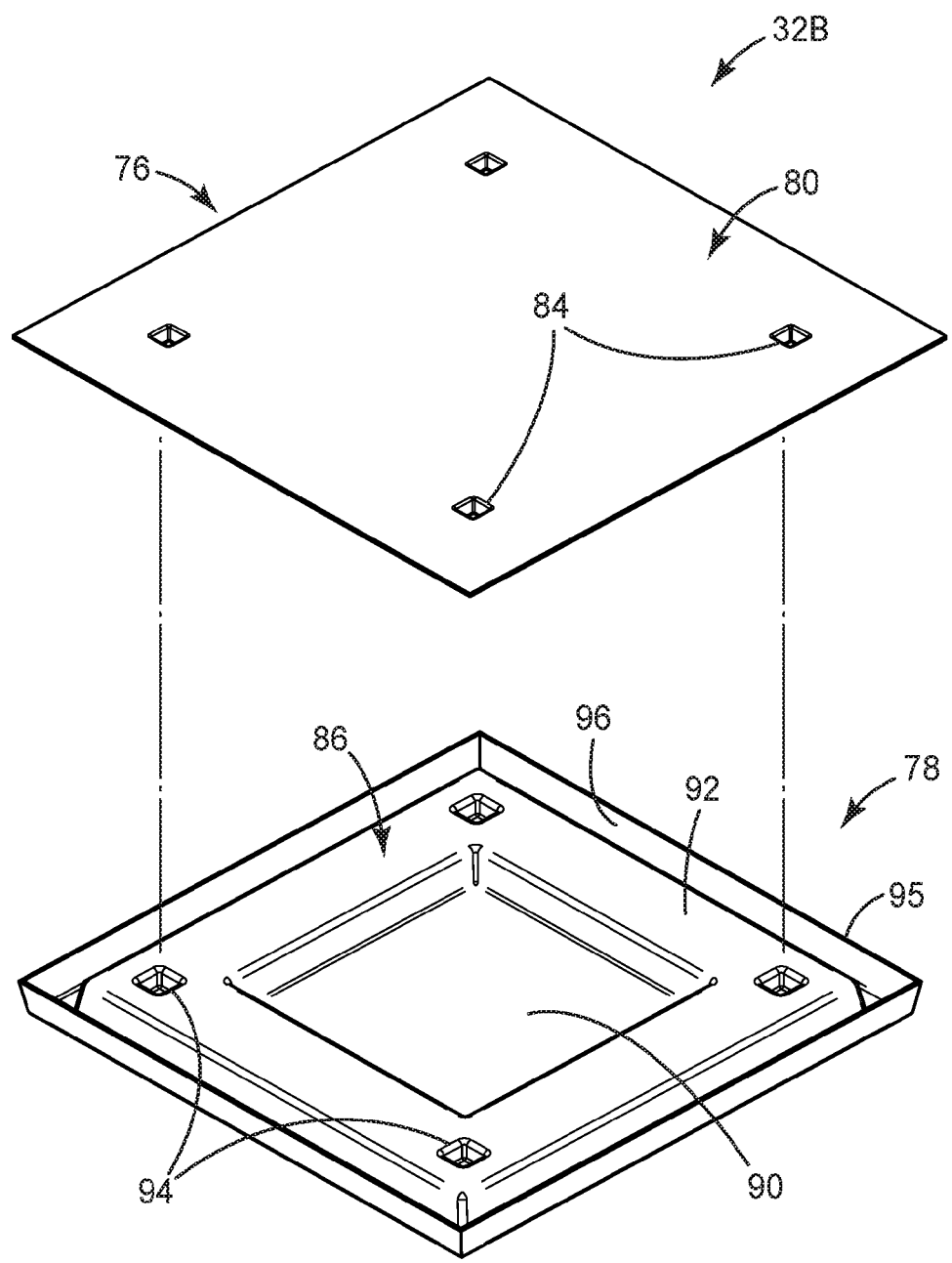
FIG. 5 is a perspective, exploded view of a portion of another décor assembly in accordance with principles of the present disclosure.

While the panel or panel assembly 52 has been described as being a singular body, in other embodiments, two (or more) components or bodies can be employed. For example, FIG. 5 illustrates portions of another embodiment décor assembly 32B in accordance with principles of the present disclosure, and includes the décor element 50 (not shown, but akin to the décor element 50 of FIG. 2A), a backer board or backer 76, a base 78, and optional connector assemblies (hidden in FIG. 5, but described in greater detail below). The backer 76 and the base 78 are, in combination, analogous to the panels 52 (FIG. 2A) described above, with the décor element 50 applied to the backer 76, and the releasable fastening structure 54 (hidden in FIG. 5 but shown, for example, in FIG. 1) carried by the base 78. With the embodiment of FIG. 5, however, the backer 76 (and thus the décor element 50 carried by the backer 76) is removably mounted to the base 78, and the base 78, in turn, is removably mounted to a wall surface (via the releasable fastening structure 54). With this construction, the base 78 can establish a "known" landing zone along the wall surface for more consistent replacement of different backers 76 (with differing décor elements 50).

Figure 6A:
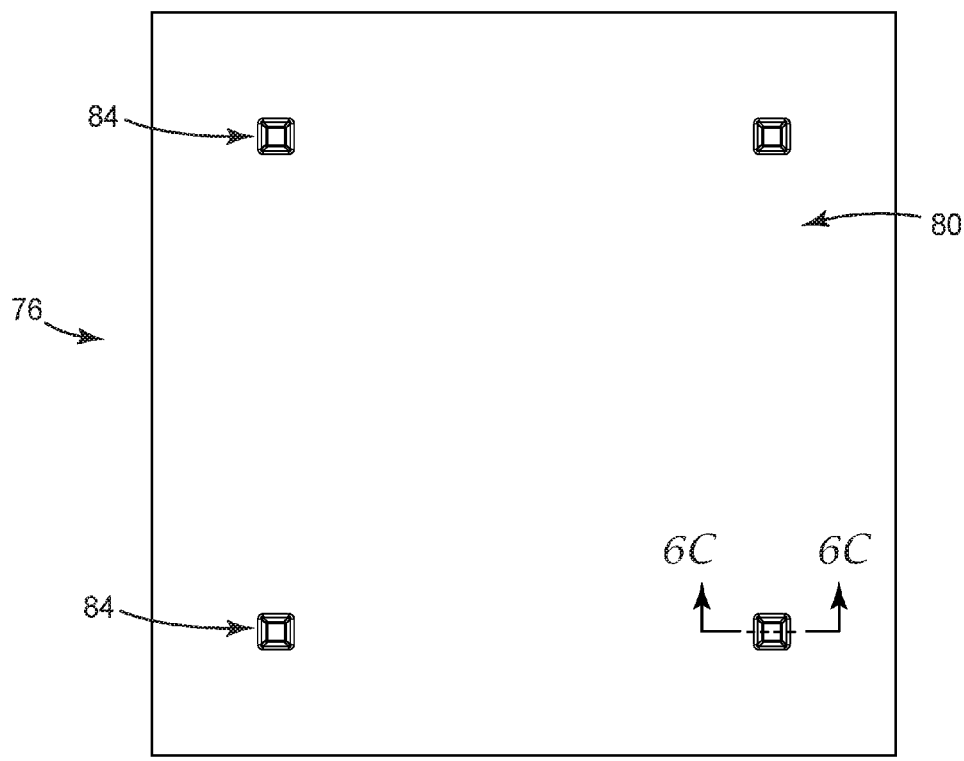
FIG. 6A is a top plan view of a backer board component of the décor assembly of FIG. 5.
Figure 6B:
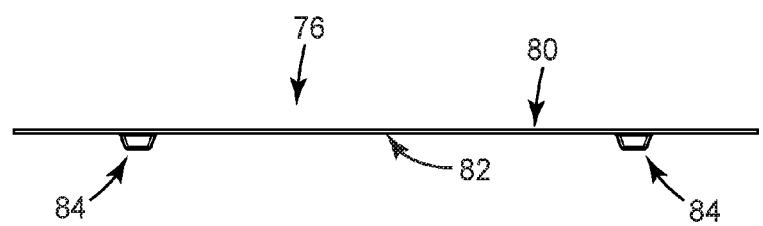
FIG. 6B is a side view of the backer board of FIG. 6A.
Figure 6C:
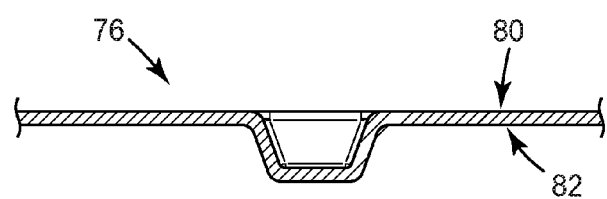
FIG. 6C is a cross-sectional view of a portion of the backer board of FIG. 6A.

The backer 76 is shown in greater detail in FIGS. 6A-6C, and defines a front face 80 opposite a rear face 82. One or more feet 84 are formed in the backer 76 as projections from a plane of the rear face 82. For example, the backer 76 can have a relatively uniform wall thickness, with each of the feet 84 being defined as a depression in the front face 80 and a corresponding projection at the rear face 82. Regardless, the faces 80, 82 are substantially planar (e.g., within 10% of a truly planar or flat surface) apart from the feet 84. In some embodiments, four of the feet 84 are provided, with respective ones of the feet 84 being located proximate a corresponding corner of the backer 76. Other numbers of the feet 84 and/or other locations are also acceptable. Regardless, the front face 80 is configured to receive the décor element 50 (FIG. 2A) (e.g., permanent adhesive bonding, mechanical fastening, etc.), whereas the feet 84 facilitate releasable engagement with the base 78 (FIG. 5) as described below. The backer 76 can be formed of various materials, and in some embodiments is a molded plastic.

The base 78 is shown in greater detail in FIGS. 7A-7C, and defines opposing front and rear sides 86, 88. A central region 90 along the rear side 88 is formatted to receive the releasable fastening structure 54 (not shown), such as by an adhesive or other bonding technique. In some embodiments, the base 78 has a relatively uniform wall thickness, with the central region 90 being defined as a depression or recess in the front side 86 and a corresponding projection at the rear side 88. A platform region 92 circumscribes the central region 90, and represents a raised surface of the base 78 (in a direction of the front side 86). That is to say, the platform region 92 is raised relative to the central region 90, whereas the central region 90 is recessed relative to the platform region 92. Regardless, the platform region 92 defines a leading or front major plane of the base 78 and is configured to receive the backer 76 (FIG. 5), and in particular the rear face 82 (FIG. 6B) as described below. With this in mind, one or more cavities 94 are formed in the platform region 92, each configured to receive a corresponding one of the backer feet 84 (FIG. 6C). Thus, the cavities 94 correspond in size, shape, number, and location with the feet 84. As reflected best in FIG. 7C, the cavities 94 can be formed as depressions from the major plane of the platform region 92 in a direction of the rear side 88, but do not necessarily extend to a plane of the central region 90.

In some embodiments, the base 78 optionally forms a perimeter wall 95 that is spaced from the platform region 92 by a channel 96. This configuration can enhance an overall rigidity of the base 78. Alternatively, the platform region 92 can be continuous or planar to the perimeter edge of the base 78. The base 78 can be formed of various materials, and in some embodiments is a molded plastic.

Figure 8A:
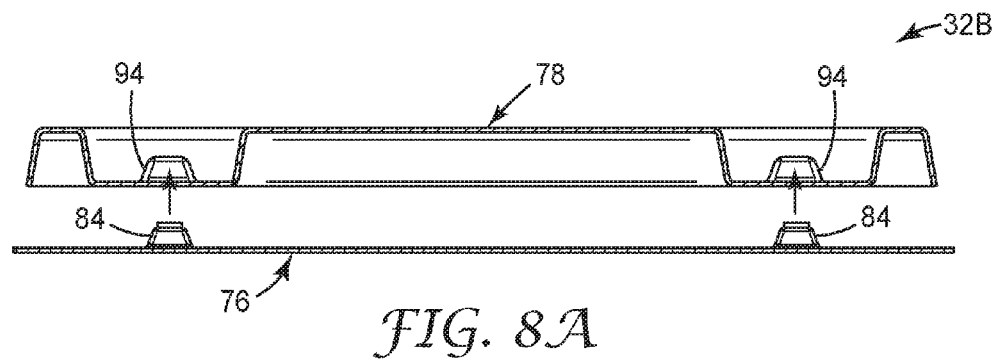
FIG. 8A is a side view illustrating construction of the décor assembly of FIG. 5.
Figure 8B:
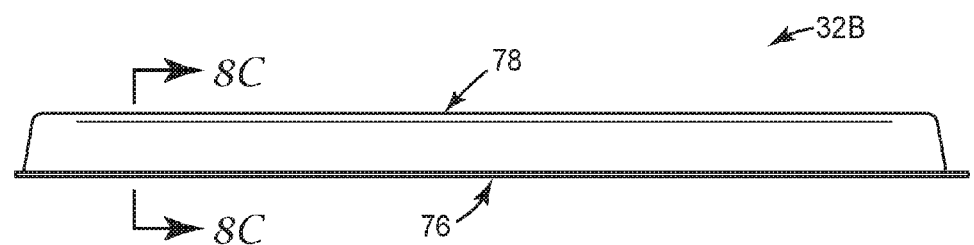
FIG. 8B is a side view of the completed décor assembly of FIG. 5.
Figure 8C:
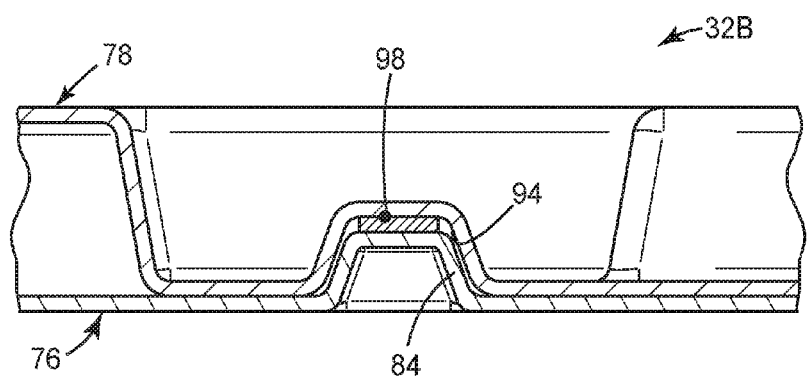
FIG. 8C is an enlarged cross-sectional view of a portion of the décor assembly of FIG. 8B taken along the line 8C-8C.
Figure 8D:
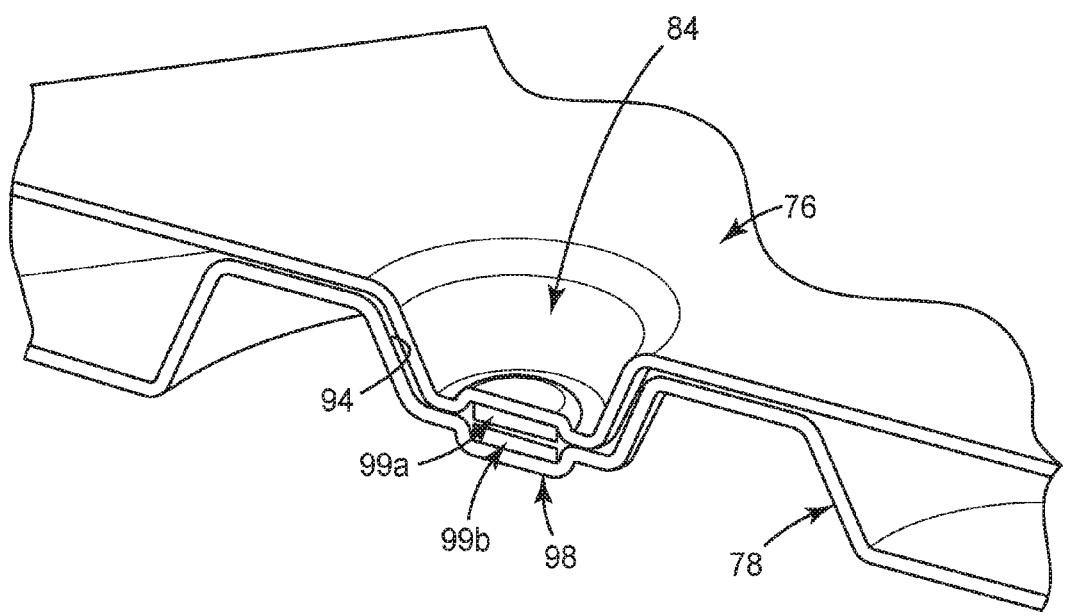
FIG. 8D is an enlarged, cross-sectional view of a portion of another décor assembly akin to FIG. 5.

As mentioned above, the backer 76 and the base 78 are configured to be releasably mounted to one another. In this regard, and with additional reference to FIGS. 8A-8C, the backer 76 is directed into a centered relationship relative to the base 78 by locating ones of the feet 84 within corresponding ones of the cavities 94. When the décor assembly 32B is arranged in an upright orientation, each of the feet 84/cavity 94 interfaces provides shear support to the final assembly. Further engagement is promoted by optional fasteners provided at the feet 84/cavity 94 interface. For example, FIG. 8C schematically illustrates a connector assembly 98 more robustly connecting the foot 84 to the base 78 within the cavity 94. The connector assembly 98 can assume a variety of forms. For example, the connector assembly 98 can be hook-and-loop fasteners, with a patch of hook (or loop) fasteners applied to the feet 84 at the rear face 82 thereof, and a patch of complementary loop (or hook) fasteners applied within the cavity 94 at the front side 86 thereof. Other connector assembly formats are also acceptable, such as an adhesive (e.g., pressure sensitive adhesive) on one or both of the feet 84 and the cavity 94. In other embodiments, the connector assembly 98 is magnet-based. One or more magnets or complementary magnetic structures can be located in various manners relative to the backer 76 and the base 78. For example, FIG. 8D illustrates one embodiment in which the connector assembly 98 includes a first magnet 99a attached to the foot 84 of the backer 76, and a second magnet 99b attached to the base 78 within the cavity 94. The first and second magnets 99a, 99b are arranged in a complementary fashion such that the second magnet 99b of the base 78 magnetically attracts the first magnet 99a (and vice-versa), thus self-driving the foot 84 within the cavity 94 and magnetically retaining the connected arrangement. Alternatively, the magnets 99a, 99b can be located at the front face 80 of the backer 76 and/or the rear side 88 of the base 78 where a lessened magnetic coupling is desired. In related embodiments, one of the magnets 99a, 99b can instead be a metal body (e.g., a steel plate) that is not necessarily magnetized, but is still magnetically attracted to the other magnet. Regardless, the magnetic-based constructions of the connector assembly 98 beneficially promote quick, centered engagement of the backer 76 with the base 78.

Another, related embodiment décor assembly 32C in accordance with principles of the present disclosure is shown in FIG. 9 and includes a backer board or backer 100, a base 102, an optional connector assembly (hidden in FIG. 9), and the décor element 50 (shown generally). The backer 100 and the base 102 are, in combination, analogous to some embodiments of the panel 52 (FIG. 2A) described above, with the décor element 50 applied to the backer 100 and the releasable fastening structure 54 (hidden in FIG. 9 but shown, for example, in FIG. 1) carried by the base 102. With the embodiment of FIG. 9, the backer 100 (and thus the décor element 50 carried by the backer 100) is removably mountable to the base 102, and the base 102 is removably mountable to a wall surface (via the releasable fastening structure 54). With this construction, the base 102 can establish a "known" landing zone along the wall surface for more consistent replacement of different backers 100 (each potentially carrying a different décor element 50).

Figure 10A:
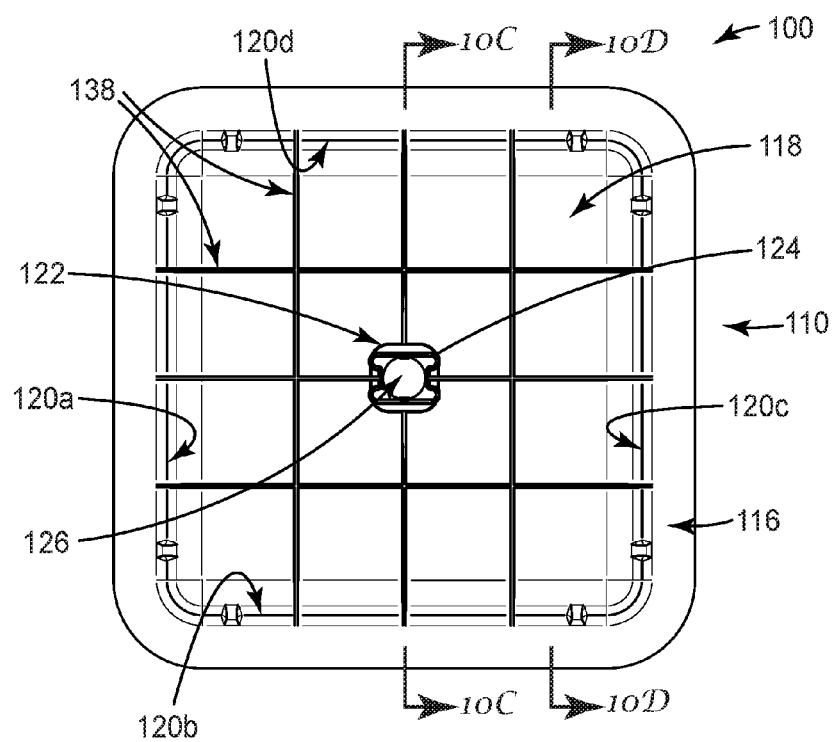
FIG. 10A is a front plan view of a backer board component of the décor assembly of FIG. 9.
Figure 10B:
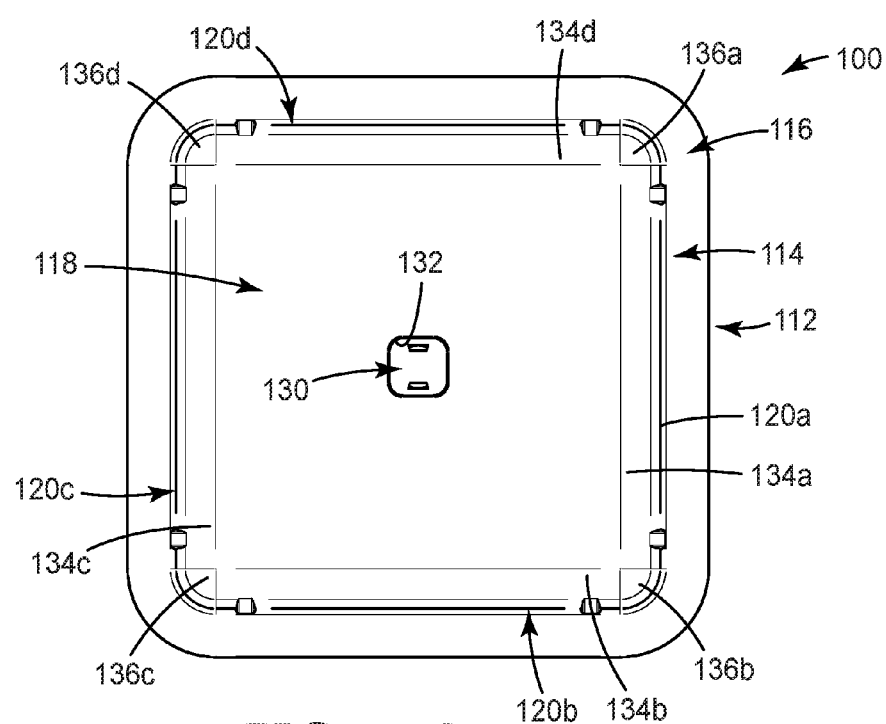
FIG. 10B is a rear plan view of the backer board of FIG. 10A.
Figure 10C:
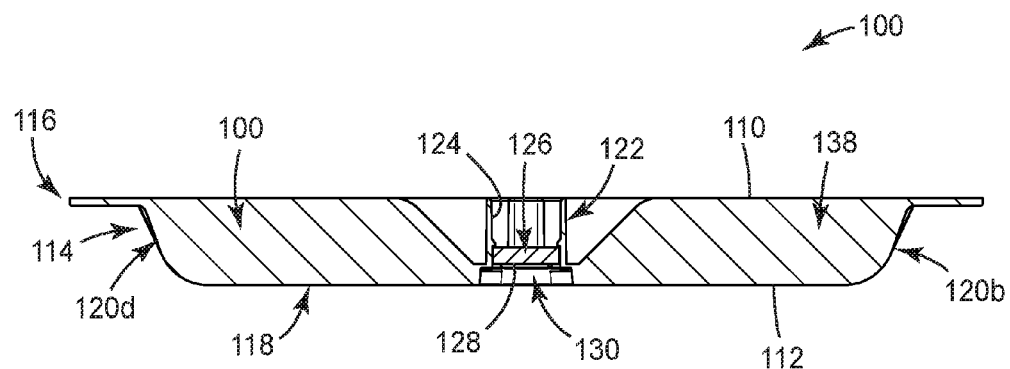
FIG. 10C is a cross-sectional view of the backer board of FIG. 10A taken along the line 10C-10C.

The backer 100 is shown in greater detail in FIGS. 10A-10C, and defines a front face 110 (FIG. 10A) opposite a rear face 112 (FIG. 10B). In some embodiments, the backer 100 can be bowl-like, and includes or defines a frame 114 and a flange 116. The frame 114 includes a bottom wall 118 and side walls 120a-120d (referenced generally in FIGS. 10B and 10C, and two of which are visible and identified in FIG. 9). The bottom wall 118 defines the rear face 112 of the backer 100. The side walls 120a-120d extend from the bottom wall 118, with the flange 116 projecting laterally outwardly from the side walls 120a-120d opposite the bottom wall 118 at the front face 110.

The backer 100 further forms or includes a post 122 as best seen in FIGS. 10A and 10C. The post 122 is defined as a projection from the bottom wall 118 in a direction of the front face 110, and forms a passage 124 that is optionally sized and shaped to receive and maintain an optional magnet 126. In some embodiments, the post 122 is open relative to the front face 110 to facilitate insertion and mounting of the magnet 126. Conversely, the post 122 can be closed relative to the rear face 112. For example, the post 122 can terminate at a platform 128. As best reflected in FIGS. 10B and 10C, a cavity 130 is formed in the rear face 112 opposite the post 122 for reasons made clear below. The cavity 130 is longitudinally aligned with the magnet 126, and is defined as a recess in the rear face 112 that extends to the platform 128. A perimeter 132 (FIG. 10B) of the cavity 130 is sized and shaped to receive a feature provided with the base 102 (FIG. 9), and in some embodiments has the square shape as shown.

The backer 100 is configured to receive and maintain the décor element 50 (FIG. 9) (e.g., permanent adhesive bonding, mechanical fastening, etc.) at the front face 110, with an enlarged surface area for mounting of the décor element 50 being provided along the flange 116. The flange 116 can define the front face 110 to be substantially planar. As best reflected in the view of FIG. 9, a footprint of the flange 116 is less than that of the décor element 50 in some embodiments. Alternatively, a footprint of the backer 100 can more closely approximate an expected size of the décor element 50.

Figure 10D:
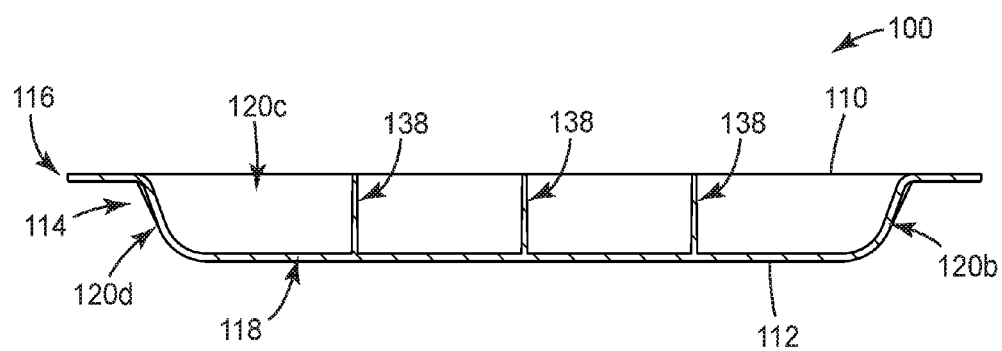
FIG. 10D is a cross-sectional view of the backer board of FIG. 10A taken along the line 10D-10D.

As best shown in the view of FIG. 10B, the frame 114 can have a square shape as reflected, for example, by four, identically sized side edges 134a-134d of the bottom wall 118. The side edges 134a-134d intersect at corners 136a-136d, with the corners 136a-136d optionally being rounded as shown in some embodiments. The side walls 120a-120d each project from a respective one of the side edges 134a-134d in a corresponding manner, thereby maintaining a square shape for the frame 114. As further illustrated in FIG. 10D, the side walls 120a-120d can form a smooth curve in extension from the bottom wall 118, and can be angled transversely outwardly to the front face 110. Stated otherwise, the side walls 120a-120d can be arranged such that a size of the frame 114 tapers from the front face 110 to the bottom wall 118. Returning to FIGS. 10A-10D, the post 122 and the cavity 130 are centrally located relative to the square shape of the bottom wall 118.

The backer 100 can incorporate additional, optional features in some embodiments. For example, interior walls 138 can extend between opposing pairs of the side walls 120a, 120c and 120b, 120d to reinforce the backer 100. In other constructions, the interior walls 138 can be omitted and/or the backer 100 can have a more solid construction from the front face 110 to the rear face 112. The backer 100 can be formed of various materials, and in some embodiments is molded plastic.

Figure 11A:
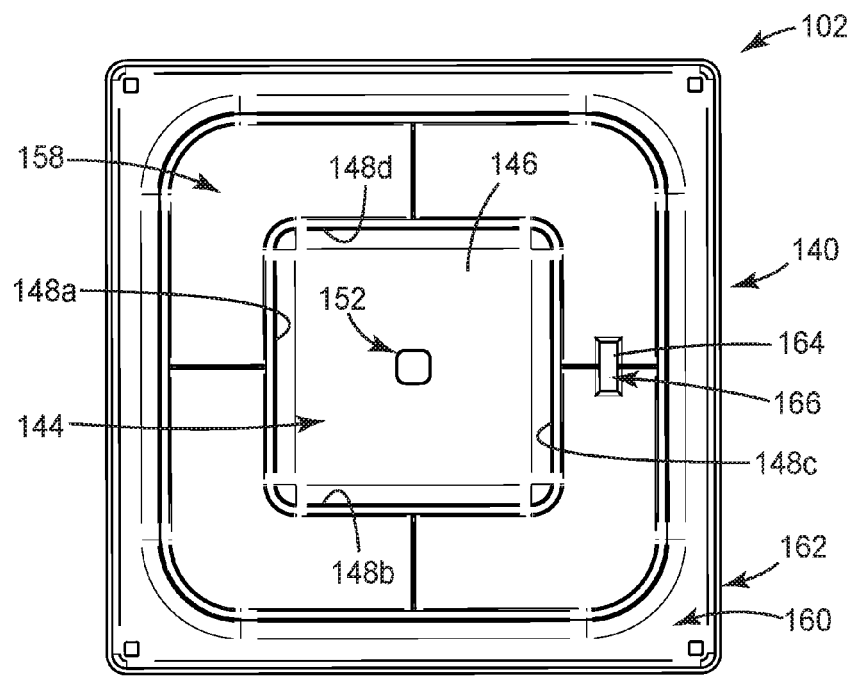
FIG. 11A is a front plan view of a base component of the décor assembly of FIG. 9.
Figure 11B:
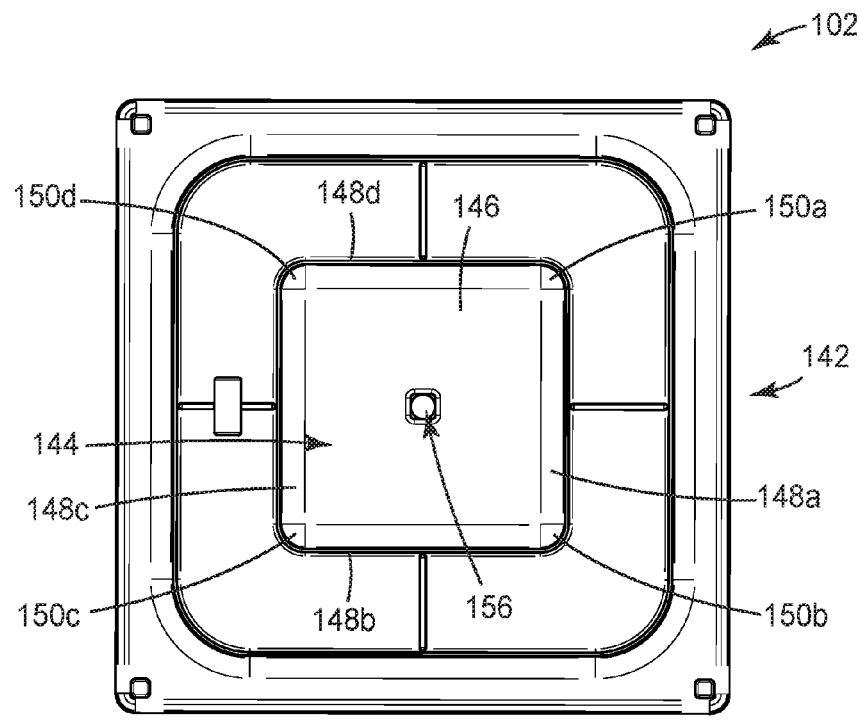
FIG. 11B is a rear plan view of the base of FIG. 11A.

The base 102 is shown in greater detail in FIGS. 11A-11C, and defines a front side 140 (FIG. 11A) opposite a rear side 142 (FIG. 11B). A central mounting region 144 is formatted to receive the releasable fastening structure 54 (not shown) along the rear side 142, such as by an adhesive or other bonding technique. In some embodiments, the base 102 has a relatively uniform wall thickness, with the mounting region 144 being defined as a depression or recess relative to the front side 140 and a corresponding projection relative to the rear side 142.

As best shown in FIG. 11A, the mounting region 144 has a square-shaped perimeter, with a size and shape of the mounting region 144 corresponding with the size and shape of the backer frame 114 (FIG. 10B). For example, a depth and shape of the mounting region 144 is generated by a bottom panel 146 and side panels 148a-148d. The bottom panel 146 corresponds with the backer bottom wall 118 (FIG. 10B), and the side panels 148a-148d generally correspond with the backer board side walls 120a-120d (FIG. 10B). More particularly, a lateral length of the side panels 148a-148d corresponds with that of the side walls 120a-120d, but the side panels 148a-148d optionally have a shorter longitudinal depth as compared to the side walls 120a-120d for reasons made clear below. The side panels 148a-148d intersect at rounded corners 150a-150d. Thus, the mounting region 144 is configured to receive the backer frame 114 in a nested relationship. Further, the base 102 forms a foot 152 centrally within the mounting region 144 that is sized and shaped (e.g., square shaped) in accordance with the backer cavity 130 (FIG. 10A). As best shown in FIG. 11C, the foot 152 is formed as a projection in a direction of the front side 140, and defines a receptacle 154 optionally configured to maintain an optional magnet 156. The receptacle 154 can be closed relative to the front side 140. Mounting of the magnet 156 within the receptacle 154 is described in greater detail below.

A partition region 158 circumscribes the mounting region 144, and represents an intermediate surface of the base 102

(between the front side 140 and the rear side 142). That is to say, the partition region 158 is raised relative to the mounting region 144, whereas the mounting region 144 is recessed relative to the partition region 158.

In some embodiments, the base 102 further includes or defines an outer perimeter wall 160 that terminates at a lip 162. As described in greater detail below, a height or location of the outer perimeter wall 160, and thus a spatial location of the lip 162, relative to the bottom panel 146 corresponds with a geometry of the backer 100 (FIG. 9). More particularly, the bottom panel 146 is recessed in a direction of the rear side 142 relative to the lip 162 by a distance that will align the lip 162 with the décor element 50 (FIG. 9) upon final assembly of the décor element 50 to the backer board 100.

The base 102 can optionally include one or more additional features. For example, the base 102 can form a pocket 164 sized and shaped to retain a bubble level indicator 166. The base 102 can be formed of various materials, and in some embodiments is molded plastic.

As mentioned above, the backer 100 and the base 102 are configured to be releasably mounted to one another. In this regard, and with initial reference to FIG. 12A, the backer 100 is self-directed into a centered relationship relative to the base 102 by generally locating the cavity 130 in close proximity to the foot 152, and the bottom wall 118 in general alignment with the mounting region 144. When placed in relatively close proximity to one another, the magnets 126, 156 are magnetically attracted to one another, drawing the frame 114 into the mounting region 144, including the cavity 130 being received over the foot 152. In this regard, and as represented by a comparison of FIG. 12B with FIG. 12C, the complementary square shape of the frame 114 and the mounting region 144 effectuates a self-alignment of the backer 100 relative to the base 102, with the magnetic attraction between the magnets 126, 156 causing the curved portion of side walls 120a-120d (two of which are visible in FIGS. 12B and 12C) to slide along a corresponding one of the side panels 148a-148d (two of which are visible in FIGS. 12B and 12C) and into the mounting region 144. Upon complete insertion, the backer side walls 120a-120d nest against the base side panels 148a-148d, respectively. The curved corners associated with the frame 114 and the mounting region 144 promote ease of alignment and complete insertion. Assembled magnetic engagement between the backer 100 and the base 102 via the magnets 126, 156 is reflected by FIG. 12C. In other embodiments, the magnets 126, 156 can be replaced with other formatted connector assemblies, as described above.

Figure 13:
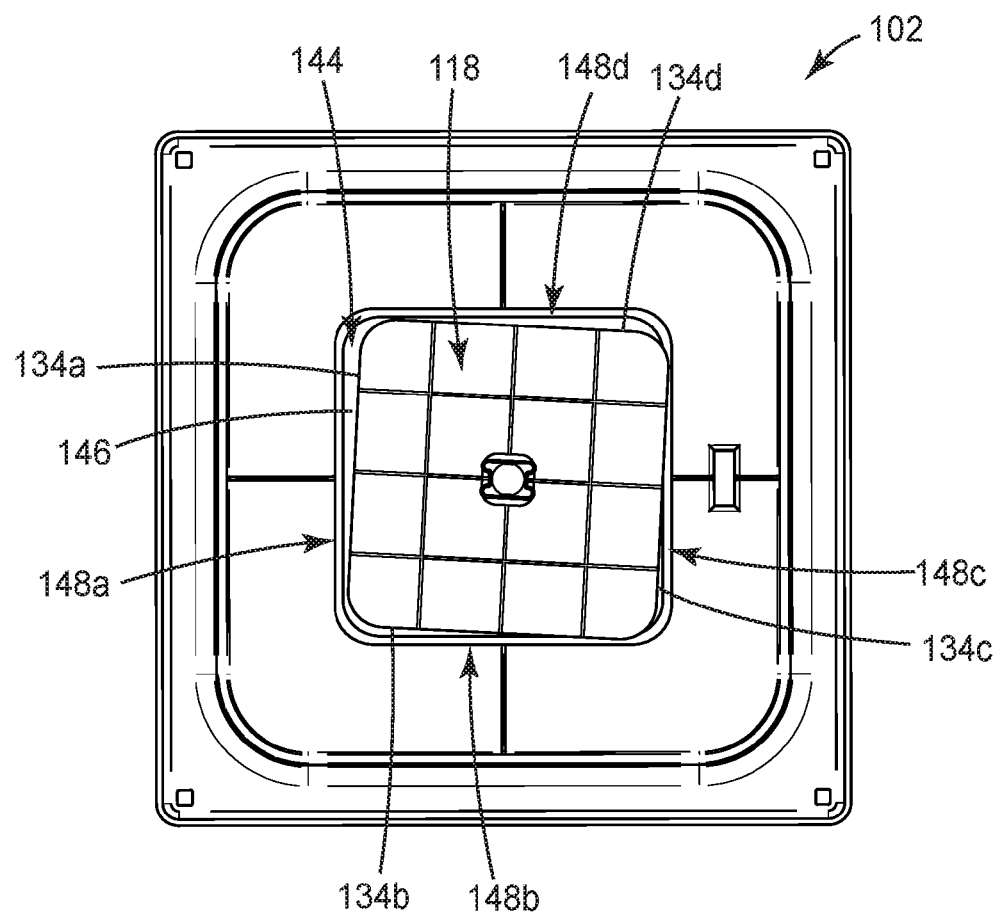
FIG. 13 is a front plan view of a portion of the décor assembly of FIG. 9 and illustrates self-alignment of the backer board relative to the base.

The corresponding, symmetrical shapes of the backer frame 114 and the mounting region 144 further self-corrects for any rotational off-set of the backer 100 relative to the base 102. For example, FIG. 13 illustrates the backer bottom wall 118 rotationally skewed or off-set relative to the mounting region 144 (e.g., the side edges 134a-134d of the bottom wall 118 are not aligned with the side panels 148a-148d of the mounting region 144). However, the magnetic force (described above) attracting the bottom wall 118 toward the bottom panel 146 is sufficient to cause the side edges 134a-134d to ride along side panels 148a-148d, self-aligning the bottom wall 118 with the mounting region 144 and drawing the frame 114 (FIG. 10C) into complete nested engagement within the mounting region 144.

Figure 14:
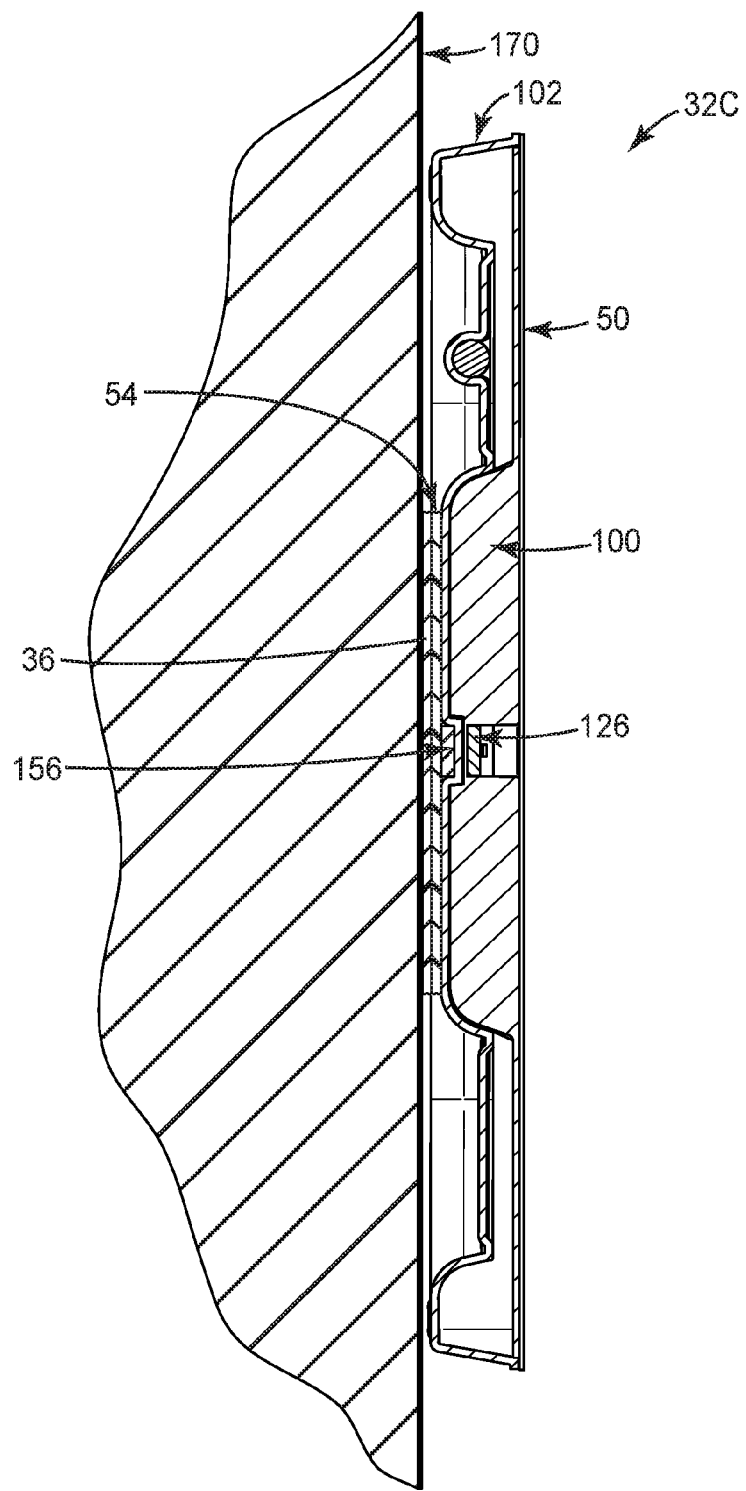
FIG. 14 is a cross-sectional view of the décor assembly of FIG. 9 mounted to a wall surface.

FIG. 14 illustrates mounting of the décor assembly 32C to a wall surface 170 via the releasable fastening structure 54 (and the complementary fastening structure 36). As a point of reference, FIG. 14 illustrates that the magnet 156 can be assembled to and captured within the receptacle 154 by the releasable fastening structure 54 in some embodiments.

Where desired, the backer 100/décor element 50 can be removed by simply applying a pulling force onto one or more edges of the décor element 50 sufficient to overcome the magnet attraction between the magnets 126, 156. Notably, the force required to separate the magnets 126, 156 is less than the force otherwise necessary to disengage the releasable fastening structure 54 from the complementary fastening structure 36 (and thus from the wall surface 170) as described below. Thus, removing or replacing the backer 100/décor element 50 does not require removal of the base 102 from a desired location along the wall surface 170. A new combination backer 100/décor element 50 can then be assembled to the base 102 (that otherwise remains attached to the wall surface 170). In this regard, the new backer 100/décor element 50 will automatically self-align relative to the base 102 as described above. Thus, the magnetic-based constructions of the décor assembly 32C beneficially promote quick, centered engagement of the backer 100 with the base 102.

Figure 15A:
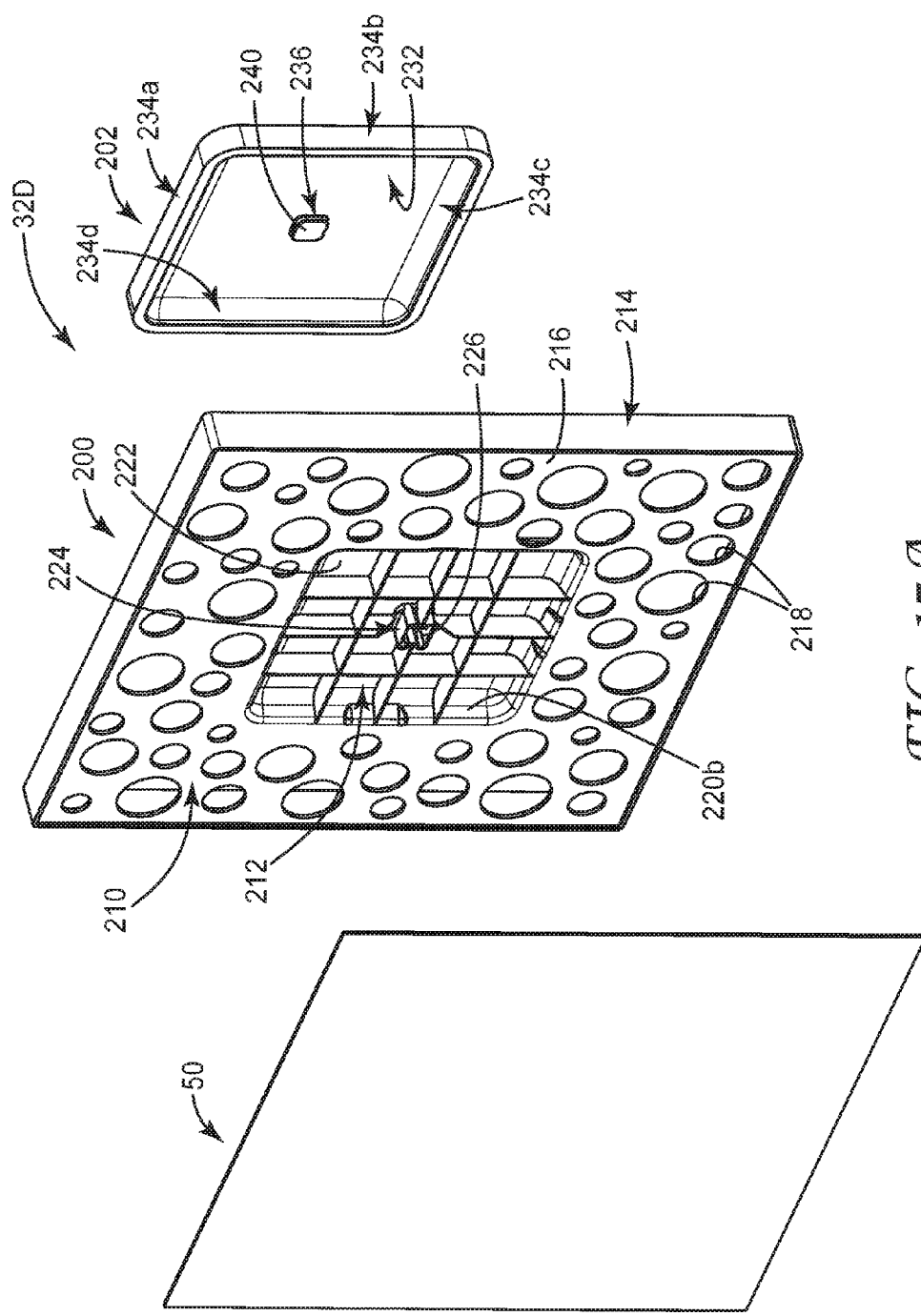
FIG. 15A is a front exploded perspective view of another décor assembly in accordance with principles of the present disclosure.
Figure 15B:
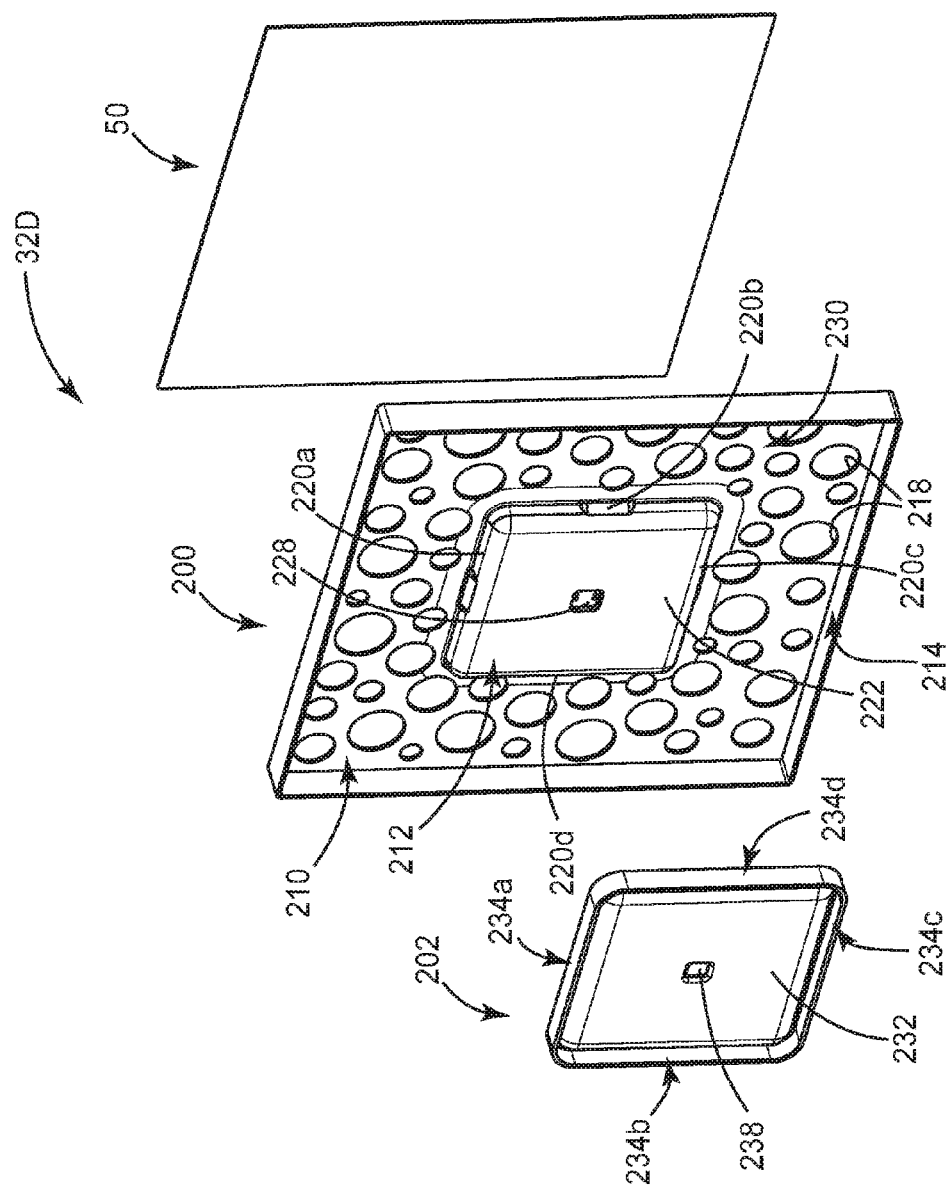
FIG. 15B is a rear exploded perspective view of the décor assembly of FIG. 15A.

Another embodiment décor assembly 32D in accordance with principles of the present disclosure is shown in FIGS. 15A and 15B. The décor assembly 32D includes a backer or backer board 200, a mounting pod or base 202, the décor element 50 (drawn generally), and the releasable fastening structure 54 (omitted from the view of FIG. 15B but shown, for example, in FIG. 1). The backer 200 and the mounting pod 202 combine to define the panel or panel assembly of other embodiments described above. The backer 200 is akin to the backer 100 (FIG. 9) described above, and the mounting pod 202 is akin to the base 102 (FIG. 9). Thus, the backer 200 is generally configured to maintain the décor element 50 and is removably mountable to the mounting pod 202; the mounting pod 202, in turn, is removably mountable to a wall surface (via the releasable fastening structure 54 carried by the mounting pod 202). With the décor assembly 32D, however, the mounting pod 202 is of a reduced size (as compared to a size of the base 102), affording more design freedom with respect to the types and formats of structures removably mounted to the mounting pod 202 as described below.

The backer 200 can include or define a panel 210, a central portion 212, and a rim 214. The panel 210 can be a substantially rigid, substantially planar body and defines a mounting face 216 (visible in FIG. 15A). The mounting face 216 can be substantially flat for receiving décor element 50 (e.g., adhesive, mechanical fastening, etc.). As reflected in the views, a footprint of the mounting face 216 approximates an expected size and shape of the décor element 50. Alternatively, the mounting face 216 can be larger or smaller than an expected sized and shape of the décor element 50. In some embodiments, apertures 218 can optionally be formed through a thickness of the panel 210 to reduce an overall weight and material cost of the backer 200.

The central portion 212 is integrally formed with the panel 210, and can be highly akin to the backer 100 (FIGS. 10A-10C) described above. Any of the descriptions above with respect to the backer board 100 apply equally to the central portion 212. In general terms, the central portion 212 includes four side walls 220a-220d projecting rearwardly from a plane of the panel 210 and terminate at a bottom wall 222 opposite the panel 210. The bottom wall 222 can have the square shape as shown, with the side walls 220a-220d angled transversely outwardly in extension from the bottom wall 222 to the panel 210.

The central portion 212 further forms or includes a post 224 as best seen in FIG. 15A. The post 224 is defined as a projection from the bottom wall 222 in a direction of the panel 210, and forms a passage 226 that is sized and shaped to receive and maintain a magnet (not shown). As best shown in FIG. 15B, a cavity 228 is formed in the bottom wall 222 opposite the post 224. The cavity 228 is aligned with the post 224.

The rim 214 circumscribes the panel 210, projecting rearwardly from a perimeter of the panel 210. The rim 214 can have curved or angled corners. An open region 860 (referenced generally in FIG. 15B) is defined between the rim 214 and the central portion 212 "behind" the panel 210. As described in greater detail below, the open region 230 is available for placement of other components (e.g., lighting) optionally provided with the décor assembly 32D.

The mounting pod 202 can be highly akin to the mounting region 144 (FIGS. 11A-11C) of the base 102 (FIGS. 11A-11C) described above. Any of the descriptions above with respect to the mounting region 144 apply equally to the mounting pod 202. In general terms, the mounting pod 202 has a size and shape corresponding with that of the backer central portion 212 (e.g., square-shaped perimeter). A depth and shape of the mounting pod 202 is generated by a bottom panel 232 and side panels 234a-234b. The bottom panel 252 corresponds with the backer bottom wall 222, and the side panels 234a-234d generally correspond with the backer side walls 220a-220d. Thus, the mounting pod 202 is configured to receive the backer central portion 212. Further, the mounting pod 202 forms a foot 236 as a centrally-located forward projection from the bottom panel 232. The foot 236 is sized and shaped (e.g., square shaped) in accordance with the backer cavity 228. As best seen in FIG. 15B, the foot 236 defines a receptacle 238 optionally configured to maintain an optional magnet (not shown). The receptacle 238 can be closed relative a front side 240 (FIG. 15A) of the foot 236.

Figure 12C:
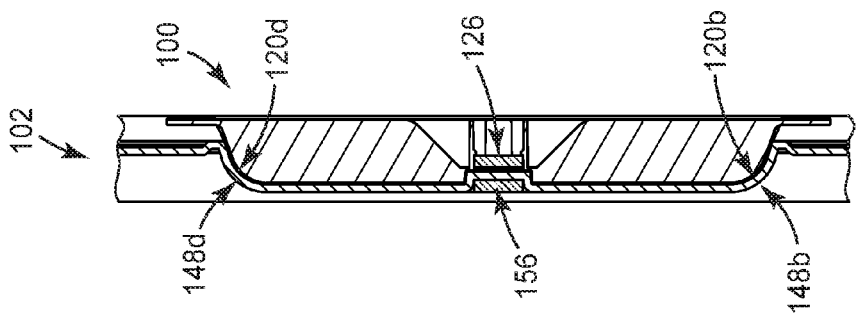
FIGS. 12A-12C illustrate mounting of the backer board of FIG. 10A to the base of FIG. 11A.
Figure 12B:
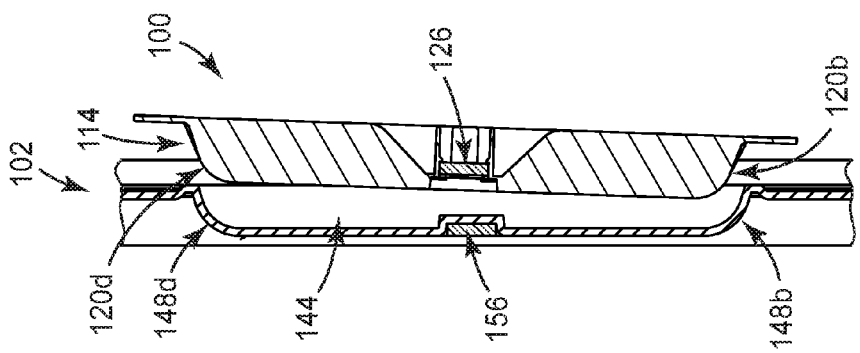
Figure 12A:
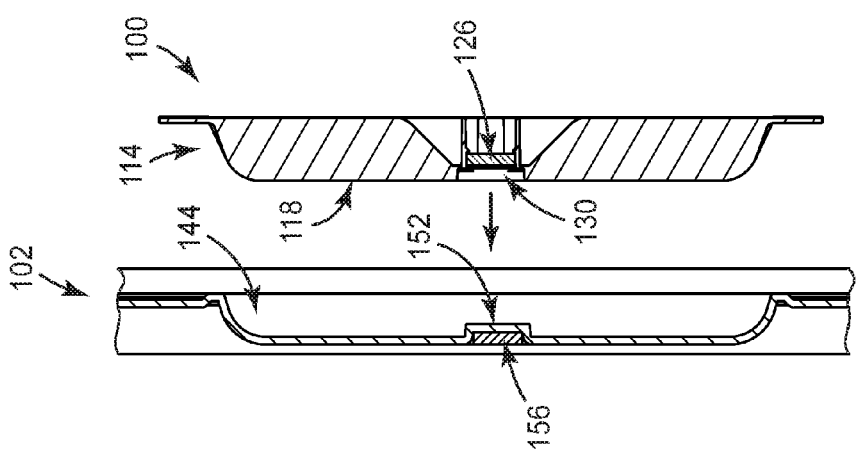
Figure 16A:
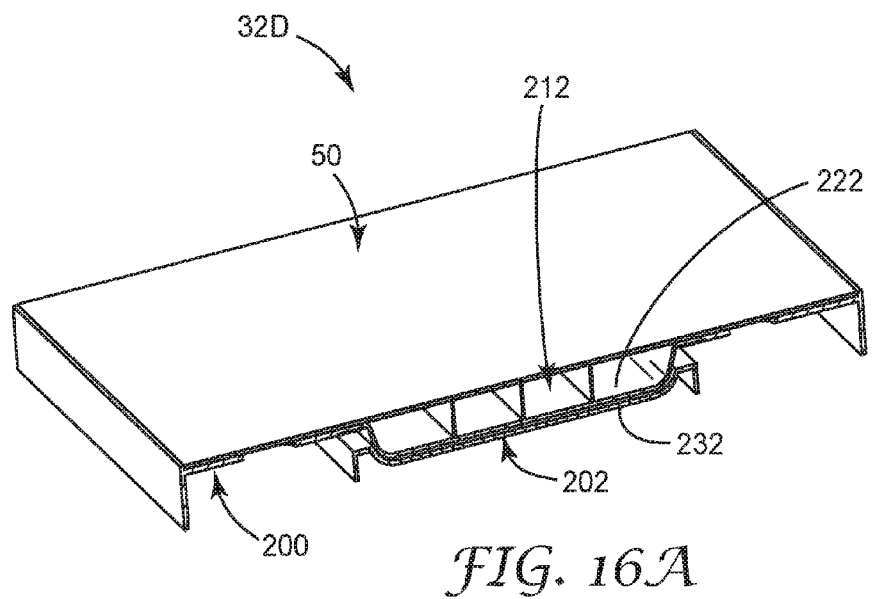
FIG. 16A is a perspective, cross-sectional view of the décor assembly of FIG. 15A upon final construction.

As mentioned above, the backer 200 and the mounting pod 202 are configured to be releasably mounted to one another. For example, FIG. 16A reflects the backer 200 coupled to the mounting pod 202 (as well as the décor element 50 mounted to the backer 200). The backer central portion 212 is nested within the mounting pod 202, including the bottom wall 222 abutting the bottom panel 232. Though not shown in FIG. 16A, the mounting pod foot 236 (FIG. 15A) is received within the backer post cavity 2238 (FIG. 15B), with the complementary magnets (not shown) achieving magnetic attachment between the backer 200 and the mounting pod 202, commensurate with the above descriptions of the décor assembly 32C (FIGS. 12A-12C). Other connector assembly formats described above can replace the complementary magnets in other embodiments.

Figure 16B:
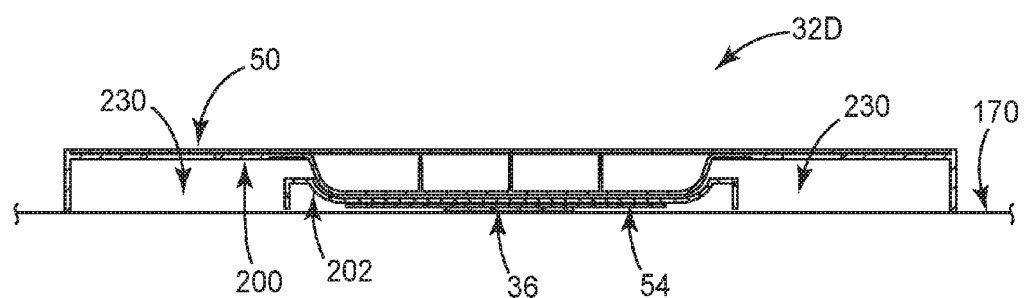
FIG. 16B is a cross-sectional view of the décor assembly of FIG. 15A mounted to a wall surface.

FIG. 16B illustrates mounting of the décor assembly to the wall surface 170 via the releasable fastening structure 54 and the complementary fastening structure 36. The backer 200/décor element 50 can be removed from the mounting pod 202 by simply applying a pulling force onto one or more edges of the backer 200 sufficient to overcome the magnet attraction between the magnets (not shown) provided with the backer 200 and the mounting pod 202. Once again, the force required to separate the magnets is less than the force otherwise necessary to disengage the releasable fastening structure 54 from the complementary fastening structure 36 (and thus from the wall surface 170 as described below). Thus, removing or replacing the backer 200/décor element 50 does not require removal of the mounting pod 202 from a desired location along the wall surface 170. Further, because the mounting pod 202 has a relatively small footprint (as compared to that of the backer 200), a significant portion of the open region 230 is available for receiving and maintaining optional auxiliary items, such as lighting, speakers, other electrical components, etc.

Figure 17A:
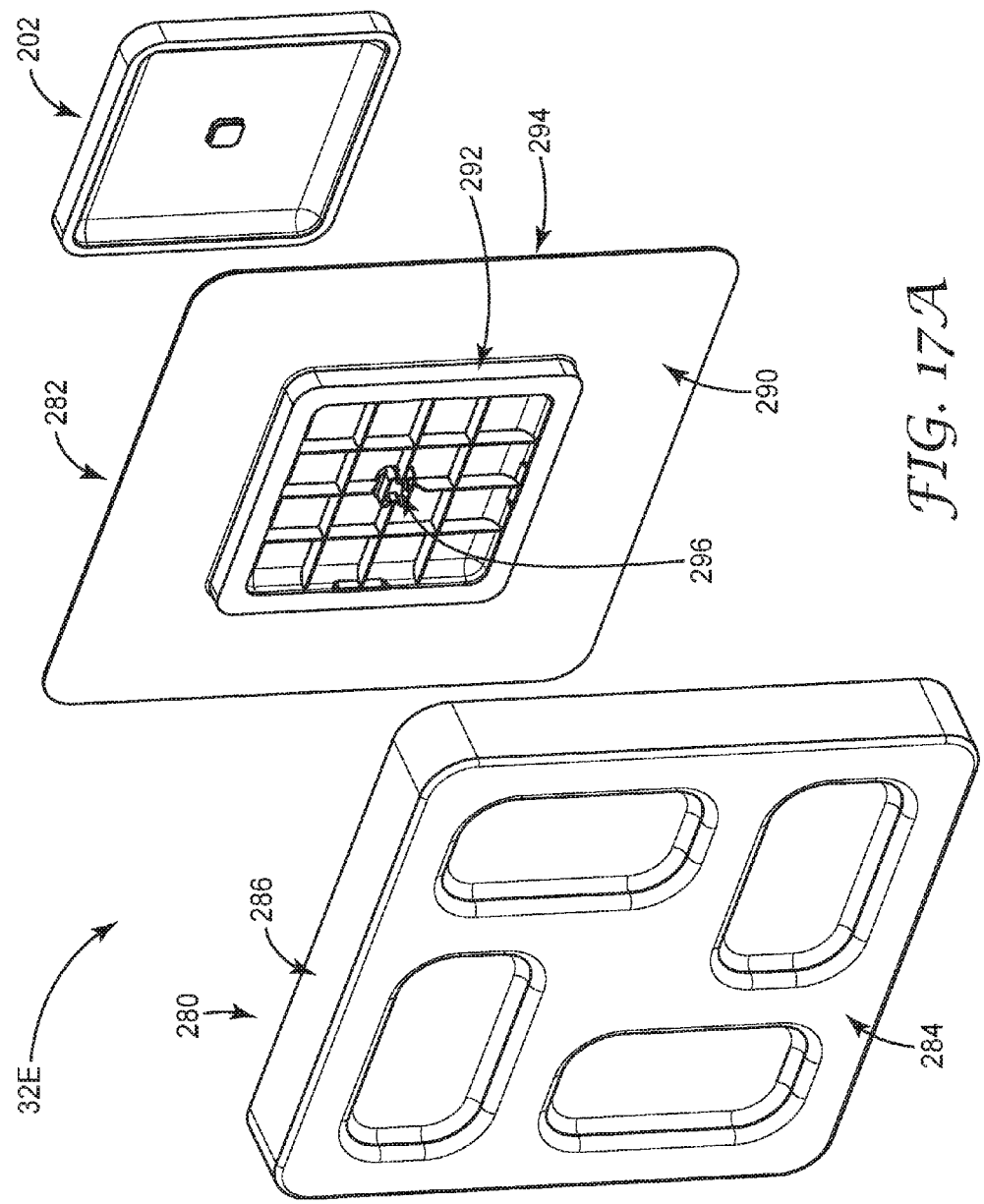
FIG. 17A is an exploded perspective view of another décor assembly in accordance with principles of the present disclosure.

Another embodiment décor assembly 32E is shown in FIG. 17A, and is akin to the décor assembly 32D described above. The décor assembly 32E includes a décor element 280, a backer or backer board 282, the mounting pod or base 202, and the releasable fastening structure 54 (hidden in the view of FIG. 17A but shown, for example, in FIG. 1). As with previous embodiments, the décor element 280 is attached to the backer 282 (e.g., permanently or removably attached). The backer 282 and the mounting pod 202 included complementary features (e.g., magnets) that promote selective coupling of the backer 282 to the mounting pod 202, with the mounting pod 202, in turn, being removably mountable to a wall surface (via the releasable fastening structure 54 carried by the mounting pod 202).

The décor element 280 can assume a wide variety of forms having various visual appearances. With the embodiment of FIG. 17A, the décor element 280 is shaped to provide depth or exhibit a three dimensional appearance attribute. For example, the décor element 280 has front face 284 in which various depressions can be formed. Further, a rim 286 circumscribes, and projects rearwardly from, the front face 284. The rim 286 can include one or more features (not shown) that facilitate mounting to the backer 282 as described below.

The backer 282 can be akin to the backer 202 (FIGS. 15A and 15B) described above, and includes a panel 290 and a central portion 292. The panel 290 is configured to receive and support the décor element 280, for example by defining a perimeter edge 294 having a complementary shape and size with that of the rim 286. Further, the edge 294 can incorporate or form one or more complementary coupling features (e.g., the edge 294 can form a lip (not shown) configured to be frictionally received within a slot (not shown) formed along the rim 286). Any other mounting technique, releasable or permanent, is also acceptable (e.g., the décor element 280 can be bonded to the panel 290). Regardless, the central portion 292 is configured for releasable coupling with the mounting pod 202 commensurate with the above descriptions, and can include a post 296 maintaining a magnet (not shown) that is magnetically attracted to a magnet (not shown) carried by the mounting pod 202.

FIG. 17B illustrates mounting of the décor assembly 32E to the wall surface 170 via the releasable fastening structure 54 and the complementary fastening structure 36. The décor element 280 is assembled to the backer 282. The backer 282/décor element 280 is removably coupled to the mounting pod 202 as described above (e.g., magnetically attached). The backer 282/décor element 280 can be removed from the mounting pod 202 by simply applying a pulling force onto one or more edges of the décor element 280 sufficient to overcome the magnet attraction between the magnets (not shown) provided with the backer 282 and the mounting pod 202. Once again, the force required to separate the magnets is less than the force otherwise necessary to disengage the releasable fastening structure 54 from the complementary fastening structure 36 (and thus from the wall surface 170) as described below. Thus, removing or replacing the backer 282/décor element 280 does not require removal of the mounting pod 202 from a desired location along the wall surface 170. Further, because the mounting pod 202 has a relatively small footprint (as compared to that of the backer 282), a significant portion of an open region 298 within the décor element 280 is available for receiving and maintaining optional auxiliary items, such as lighting, speakers, other electrical components, etc.

As mentioned above, in some embodiments the décor assemblies of the present disclosure can be formatted to receive a photo or other picture desired by a user. With this in mind, another embodiment décor assembly 32F in accordance with principles of the present disclosure is shown in FIG. 18. The décor assembly 32F includes the backer 100, the base 102 (or other corresponding components described above) and the releasable fastening structure 54 (hidden in FIG. 18 but shown, for example, in FIG. 1) as described above. Further, a décor element 300 including a backing 302 and a cover 304 is provided. The backing 302 and the cover 304 are configured to collectively form a pocket sized to removably receive and maintain a photograph 306 (or other item).

The backing or photo blank 302 is a thin, flexible sheet of relatively rigid material (e.g., plastic sheeting) configured for attachment to the backer 100 (e.g., permanent adhesive bonding, mechanical fastening, etc.) at the front face 110 thereof. The backing 302 can have a size and shape commensurate with that of the backer 100 or the base 102 in some embodiments. Regardless, the backing 302 optionally forms a dimple or cup 308 at an edge 310a. The dimple 308 represents a projection out of the plane defined by a remainder of the backing 302. As described below, the dimple 308 is sized for receiving a finger or thumb of a user when loading/unloading the photograph 306. While FIG. 18 illustrates a single dimple 308, in other embodiments, additional dimples can be formed at other edges 310b-310d of the backing 302. In yet other embodiments, the dimple 308 can be omitted.

The cover or photo frame front 304 is a thin, relatively stiff sheet forming or defining a border 312 and a window 314. In some embodiments, the cover 304 includes a base layer of transparent or substantially transparent material (e.g., acrylic). A second, opaque material is printed or applied on to the base layer to generate the border 312. Regardless, the window 314 is transparent or substantially transparent, allowing a user to "see" articles (e.g., the photograph 306) disposed "behind" the cover 304, with the border 312 creating the visual appearance of a picture frame. The cover 304 is sized and shaped in accordance with a size and shape of the backing 302, and can thus define edges 316a-316d the corresponding with the backing edges 310a-310d, respectively. However, the cover 304 need not form a counterpart to the dimple 308 in some embodiments; instead the corresponding edge 316a is straight or linear.

The cover 304 can be connected to the backing 302 in a variety of fashions that generate a pocket. In some embodiments, a hinge-like engagement between the backing 302 and the cover 304 is established, whereby a portion of the backing 302 can be pivoted away from the cover 304 (or vice-versa). For example, in one embodiment, the cover 304 is placed against the backing 302 with the corresponding edges 310a-310d and 316a-316d aligned with one another, and a strip of adhesive (not shown) is applied over the bottom edges 310c, 316c. With this arrangement, the adhesive strip maintains connection between the backing 302 and the cover 304 while allowing the upper edge 310a of the backing 302 to be maneuvered away from the upper edge 316a of the cover 304, with the backing 302 pivoting relative to the cover 304 at the connected bottom edges 310c, 316c. Other connection techniques are also envisioned.

Figures 19A, 19B:
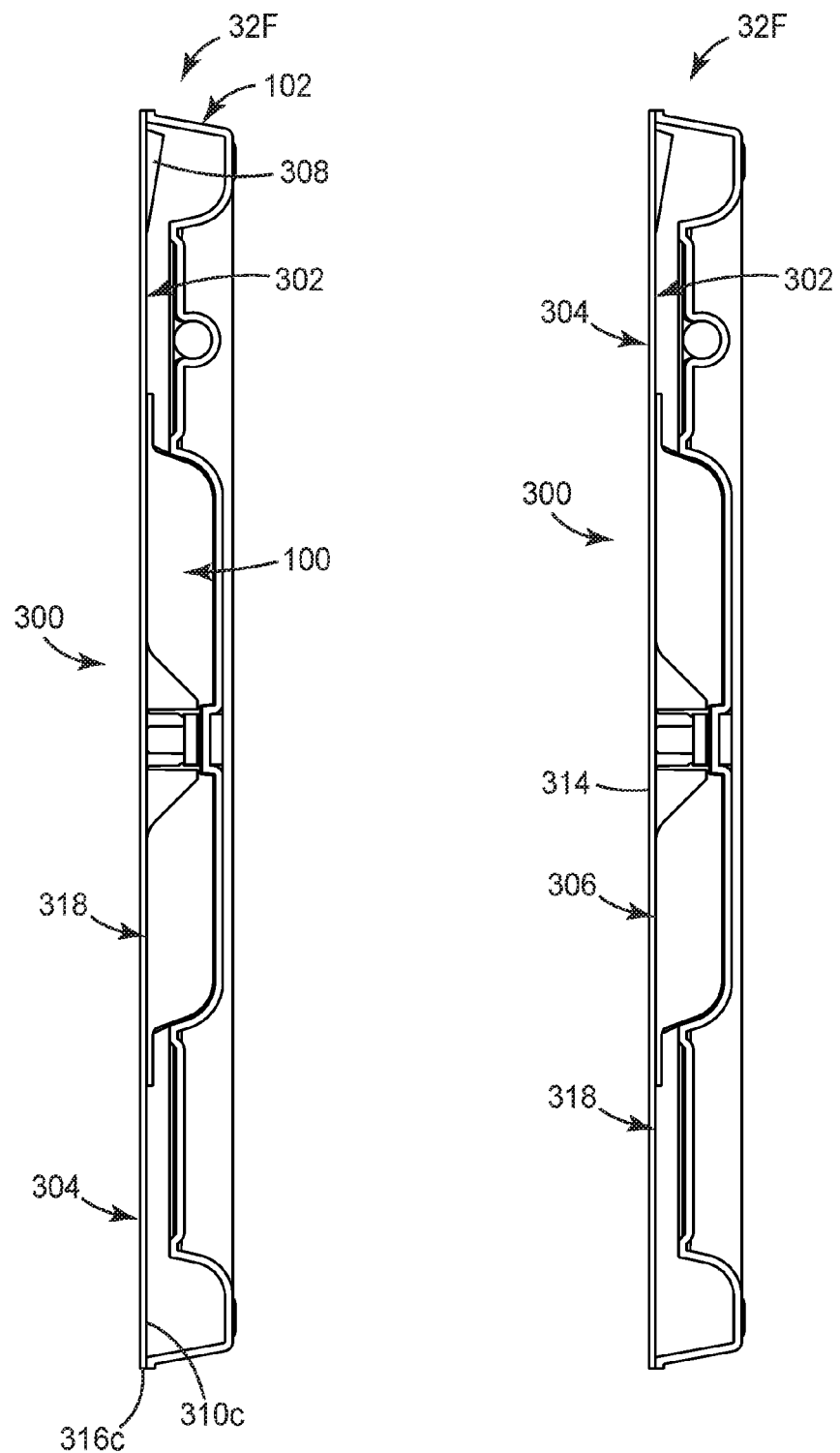
FIGS. 19A and 19B are cross-sectional views illustrating the décor assembly of FIG. 18 upon final construction.

Final construction of the décor assembly 32F is shown in FIG. 19A. The backing 302 is coupled to the backer 100, and the backer 100 is coupled to the base 102 (e.g., via magnets as described above). For ease of illustration, the releasable fastening structure 54 (FIG. 1) is omitted from the view of FIG. 19A, it being understood that the releasable fastening structure 54 can assume any of the forms described herein, configured to releasably interface with the complementary fastening structure 36 (FIG. 1) in securing the décor assembly 32F to a wall surface (e.g., as in, for example, FIG. 16B). The cover 304 is connected to the backing 302, for example at the corresponding bottom edges 310c, 316c. A pocket 318 (referenced generally) is established between the backing 302 and the cover 304. The pocket 318 can be accessed by pivoting the backing 302 away from the cover 304 (or vice-versa). In this regard, the dimple 308 provides a convenient region for insertion of a user's finger to effectuate movement of the backing 302 away from the cover 304.

As shown in FIG. 19B, the photograph 306 can be inserted into the pocket 318 (referenced generally). Once inserted, the photograph 306 is held between the backing 302 and the cover 304 (e.g., static cling), generally aligned with the window 314 (referenced generally in FIG. 20B, but shown more clearly in FIG. 18). Thus, the photograph 306 is visible to a viewer of the décor assembly 32F. When desired, the photograph 306 can be removed from the pocket 318 and replaced with a new photograph or other article of interest to a user. As a point of reference, the décor element 300 can be used with any of the other décor assemblies of the present disclosure.

Figure 20:
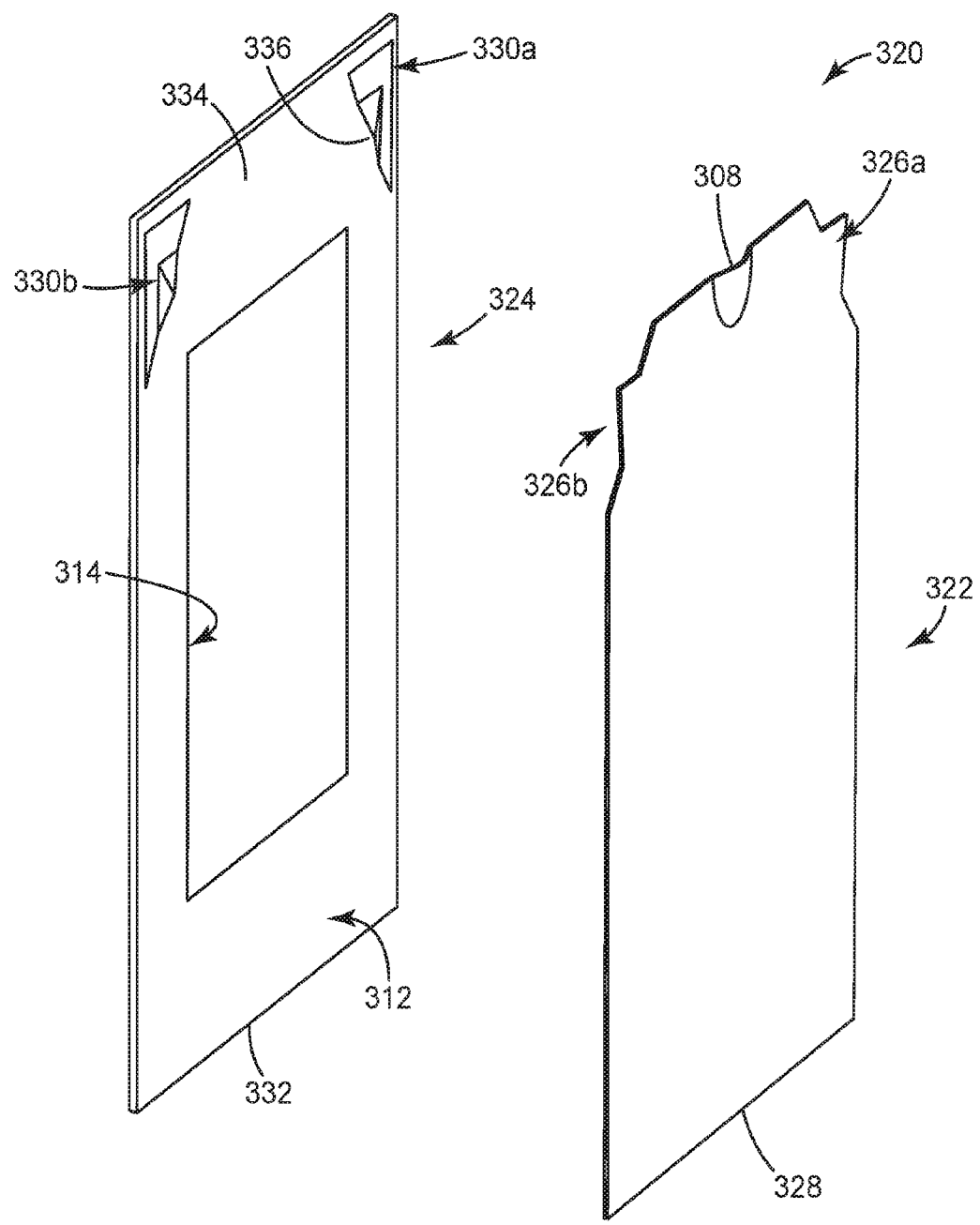
FIG. 20 is a rear exploded perspective view of a décor element useful with the décor assemblies of the present disclosure.

The décor element 300 can assume a number of other forms conducive to insertion and removal of the photograph 306 (or other item) within a pocket. For example, an alternative décor element 320 useful with the décor assembly 32F (or any other of the décor assemblies of the present disclosure) is shown in FIG. 20. The décor element 320 is akin to the décor element 300 (FIG. 18), and includes a backing or photo blank 322 and a cover 324. In general terms, the backing 322 and the cover 324 combine to form a pocket sized to removably receive and maintain the photograph 306 (FIG. 18) or other item.

With additional reference to FIG. 21, the backing 322 can be highly similar to the backing 302 (FIG. 18), and can have any of the attributes described above (including the optional dimple 308). Further, the backing 322 forms or defines opposing corner tabs 326,a, 326b opposite a bottom edge 328. The corner tabs 326a, 326b are sized and shaped in accordance with components of the cover 324 described below.

With reference between FIGS. 20 and 22, the cover or photo frame front 324 can be highly similar to the cover 304 (FIG. 18), can have any of the attributes described above (including the border 312 and the window 314). In addition, the cover 324 includes or has attached thereto opposing connectors 330a, 330b opposite a bottom edge 332. The connectors 330a, 330b can be identical, and are sized and shaped to selectively receive and retain a corresponding one of the corner tabs 326a, 326b. For example, a segment of each of the connectors 330a, 330b can project from a rear major face 334 of the cover 324 to define an open channel 336 (identified generally in FIG. 20 for the first connector 330a) into which one of the corner tabs 326a, 326b can be inserted and temporarily held.

The cover 324 can be connected to the backing 322 in a variety of fashions that generate a pocket as described above. For example, a hinge-like engagement between the backing 322 and the cover 324 is established at the corresponding bottom edges 328, 332. Regardless, a spatial location and arrangement of the corner tabs 326a, 326b relative to the backing bottom edge 328 correspond with a spatial location and arrangement of the connectors 330a, 330b relative to the cover bottom edge 332. Upon final assembly in which the bottom edges 328, 332 are generally aligned and fixed relative to one another (and a pocket is generally defined between the backing 322 and the cover 324), each of the corner tabs 326a, 326b can readily be inserted into and held within the channel 336 (FIG. 20) of the corresponding connector 330a, 330b as shown in FIG. 23, to hold the backing 322 in place relative to the cover 324. When a user desires to access the pocket (e.g., to insert or remove the photograph or other object), the backing 322 can be manipulated or pivoted away from the cover 324 (e.g., at the dimple 308) as described above, with the corner tabs 326a, 326b readily sliding out of engagement with the corresponding connector 330a, 330b.

Spacer Assemblies 38

Figure 24A:
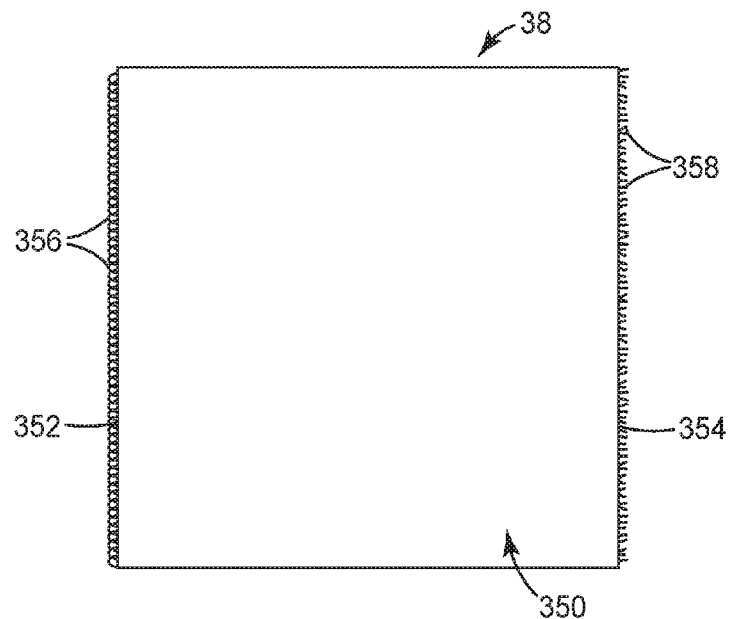
FIG. 24A is a simplified plan view of a spacer assembly useful with the kit of FIG. 1.

Returning to FIG. 1, the décor assembly 32 can be directly mounted in close proximity to a wall surface. Optionally, systems and kits of the present disclosure include one or more of the spacer assemblies 38 mentioned above that create additional depth between any of the décor assemblies described herein and the wall surface. The spacer assembly (or assemblies) 38 can assume a wide variety of forms. In general terms, and with reference to FIG. 24A, one non-limiting example of the spacer assembly 38 includes a spacing structure 350 defining a front major surface 352 and a rear major surface 354. The spacing structure 350 can consist of one, two, or more bodies that may or may not be movable relative to one another. Regardless, a plurality of first fastening elements 356 are disposed or formed over the front major surface 352 (e.g., the first fastening elements 356 are exposed relative to the front major surface 352), and a plurality of the second fastening elements 358 are disposed or formed over the rear major surface 354 (e.g., the second fastening elements 358 are exposed relative to the rear major surface 354). The first and second fastening elements 356, 358 can assume format appropriate for interfacing with components of the releasable fastening system 34 (FIG. 1) as described below, and can be connected to the spacing structure 350 in various manners (e.g., the first and second fastening elements 356, 358 can each be formed or carried by a material or composite structure that in turn is adhered or otherwise affixed to the corresponding major surface 352, 354).

Figure 24B:
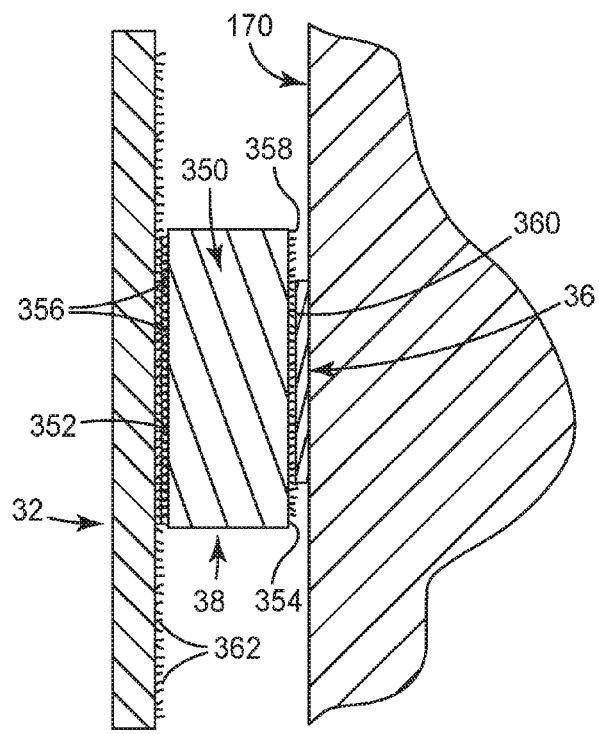
FIG. 24B is a cross-sectional view illustrating use of the spacer assembly of FIG. 24A in mounting a décor assembly to a wall surface.

During use, the spacer assembly 38 can be interposed between the décor assembly 32 and the complementary fastening structure 36 as shown in FIG. 24B. More particularly, the complementary fastening structure 36 is adhered to the wall surface 170 as described elsewhere. The spacer assembly 38 is mounted to the complementary fastening structure 36 via engagement between the second fastening elements 358 of the spacer assembly 38 (along the rear major surface 354 of the spacing structure 350) and complementary fastening elements 360 of the complementary fastening structure 36 (e.g., hook-and-loop fastening as described below). Similarly, the décor assembly 32 is mounted to the spacer assembly 38 via engagement between fastening elements 362 of the décor assembly 32 and the first fastening elements 356 of the spacer assembly 38 (along the front major surface 352 of the spacing structure 350). The spacing structure 200 thus maintains the décor assembly 32 away from the wall surface 170, creating visual depth.

With the above general concepts of the spacer assembly 38 in mind, the spacing structure 200 can assume a variety of different forms. The spacing structure 200 can be or include sliding or rotating plates, a telescoping or accordion arrangement. Further, spacer assemblies 38 of the present disclosure can incorporate one or more additional features not necessarily shown, such as lights (e.g., LEDs) and a power source.

Figure 25B:
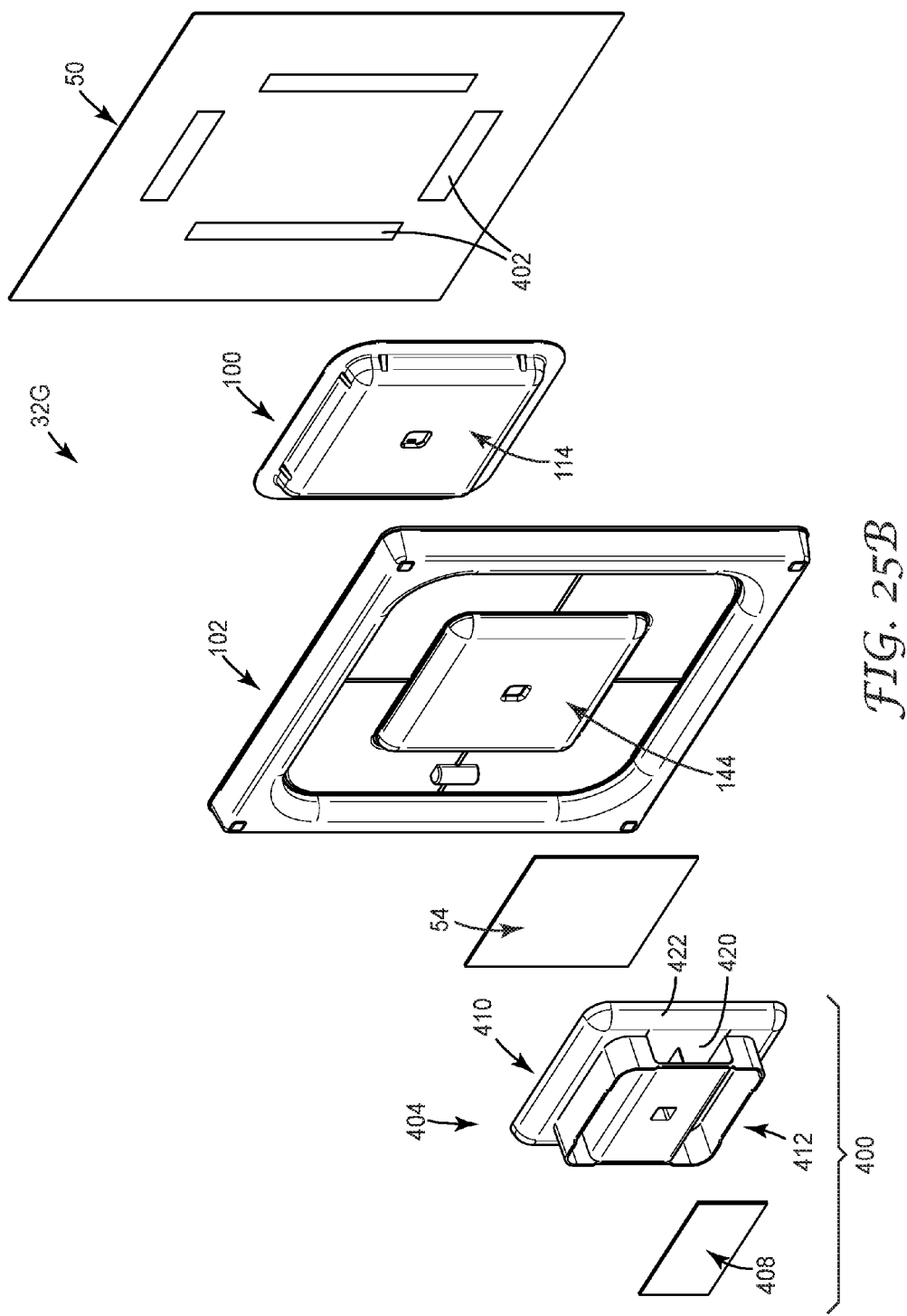
FIG. 25B is a rear exploded perspective view of the décor assembly of FIG. 25A.

Spacer assemblies of the present disclosure can incorporate one or more additional features corresponding with features provided with the corresponding décor assembly. In this regard, the spacer assembly can optionally be considered a sub-component of the décor assembly. With this in mind, another embodiment of a décor assembly 32G in accordance with principles of the present disclosure and including another embodiment spacer assembly or enhancer 400 is shown in FIGS. 25A and 25B. The décor assembly 32G can be akin to the décor assembly 32C (FIG. 9) described above, for example including the backer 100, the base 102, and the décor element 50 (illustrated generally) as described above. Once again, the décor element 50 can be assembled to the backer 100 in a variety of fashions, for example by adhesive strips 402 (e.g., pressure sensitive adhesive strips) shown in FIG. 25B. The adhesive strips 402 can be permanently bonded to the backer 100 and provide a releasable adhesive connection with the décor element 50 (such that the décor element 50 is replaceable relative to the backer 100), or can be permanently bonded to the décor element 50 and provide a releasable adhesive connection with the backer 100 (such that the combination décor element 50/adhesive strips 402 be replaced with another combination décor element 50/adhesive strips 402). In other embodiments, the décor element 50 can be more permanently attached to the backer 100 as described above. Further, FIG. 25B illustrates the releasable fastening structure 54 otherwise provided with the base 102.

In addition to the backer 100 and the base 102, the décor assembly 32G includes the spacer or spacer assembly 400. In general terms, the spacer assembly 400 is configured to be removably mountable to a wall surface, to removably receive and maintain the backer 100, and to removably receive and maintain the base 102. With this construction, a user is provided with the ability to create multiple different decorative effects relative to the wall surface of interest. For example, the spacer assembly 400 can be mounted to the wall surface. The backer 100/décor element 50 can then be directly removably mounted to the spacer assembly 400, or the base 102 can be removably mounted to the spacer assembly 400 and the backer 100/décor element 50 removably mounted to the base 102. Or, the spacer assembly 400 need not be used, with the base 102 instead being removably mounted to the wall surface (and the backer 100/décor element 50 removably mounted to the backer base 102) commensurate with the descriptions above.

Figure 26:
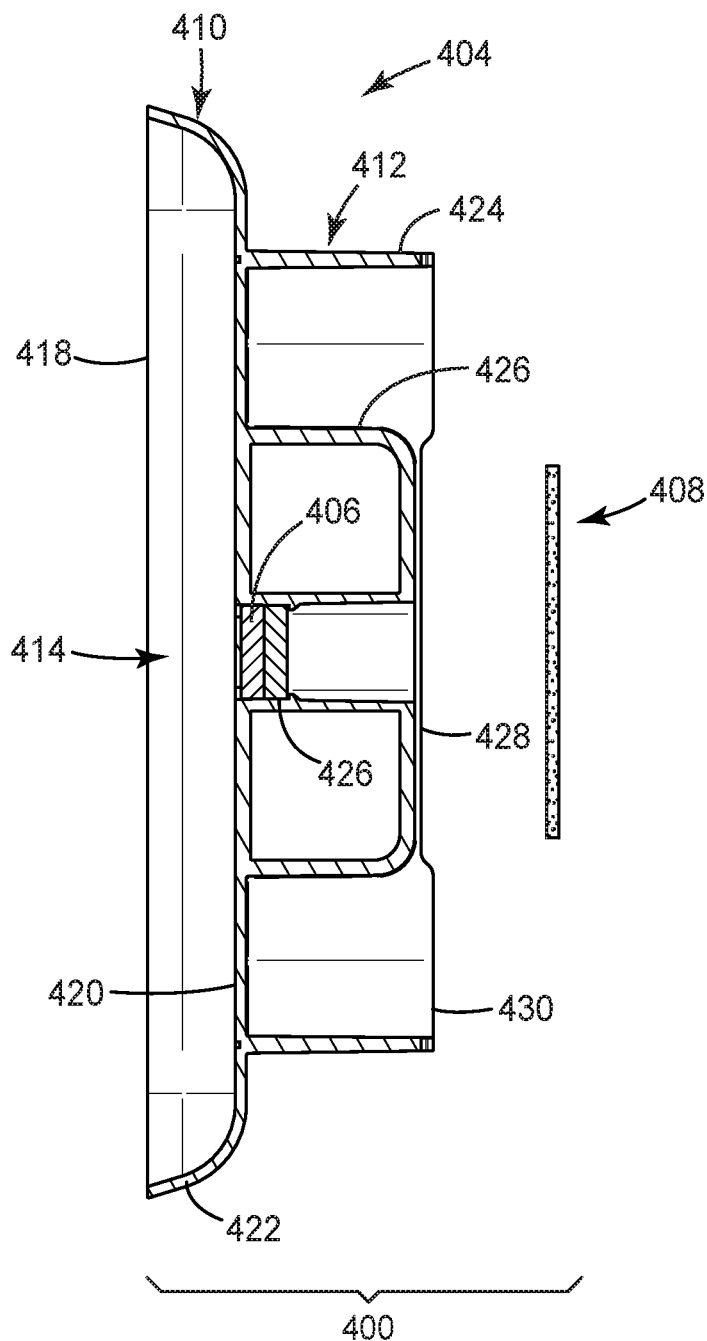
FIG. 26 is a cross-sectional view of a spacer sub-assembly useful with the décor assembly of FIG. 25A.

With additional reference to FIG. 26, the spacer assembly 400 includes, in some embodiments, a spacer 404, one or more magnets 406, and a releasable fastening structure 408. The spacer 404 forms or defines a head 410 and a neck 412. The head 410 defines a coupling region 414. The coupling region 414 has a cup-like shape, and is open at a front face 418 of the spacer 404. A depth, size and shape of the coupling region 414 is generated by a bottom panel 420 and a continuous side panel 422 (referenced generally), and correspond with the size and shape of the frame 114 of the backer 100 as well as with the size and shape of an exterior of the mounting region 144 of the base 102. Thus, the coupling region 414 of the spacer 404 is configured to receive the backer frame 114 in a nested relationship, and to receive the base mounting region 144 in a nested relationship.

The neck 412 projects from the head 410 in a direction opposite the front face 418. As best reflected by FIG. 26, an outer perimeter size of the neck 412 is defined by an outer frame 424, and can be less than that of the head 410 (with extension of the neck 412 from the head 410 establishing an elevated depth for the spacer 404). The neck 412 forms a receptacle 426 configured to maintain the one or more magnets 406. The receptacle 426 is formed (and thus the magnet(s) 406 is retained) immediately adjacent the bottom panel 420 and centrally located relative to a shape of the coupling region 414. This location corresponds with a spatial location of the magnet(s) provided backer 100 and the base 102 for reasons made clear below. Finally, the neck 412 can include an interior frame 426 terminating at a rear face 428. The rear face 428 is configured to receive the releasable fastening structure 408. In this regard, a depth of the interior frame 426 can be slightly less than a depth of the outer frame 424 by a distance corresponding with a thickness of the releasable fastening structure 408. When the releasable fastening structure 408 is fixed to the rear face 428, then, a thickness of the releasable fastening structure 408 will be generally aligned with a trailing end 430 of the outer frame 424 (e.g., upon final assembly, the releasable fastening structure 408 optionally does not project beyond the trailing end 430 of the outer frame 424).

The magnet(s) 406 can take any of the forms described above. In the exemplary embodiment shown, the spacer assembly 400 includes two of the magnets 406 to generate an elevated magnetic force or field. A greater or lesser number of magnets are equally acceptable. Regardless, the magnet(s) 406 is arranged relative to the spacer 404 such that the magnetic pole (north or south) of the magnet(s) 406 at or facing the coupling region 414 is opposite the magnetic pole of the magnet(s) associated with the backer 100 and the base 102 when arranged within the coupling region 414 and facing the magnet(s) 406 as described below.

The releasable fastening structure 408 can assume any of the forms described elsewhere in the present disclosure for the releasable fastening structure 54. In some embodiments, a size and shape of the releasable fastening structure 408 corresponds with that of the rear face 428 such that the releasable fastening structure 408 has a relatively large surface area. Regardless, the releasable fastening structure 408 can be attached to the rear face 428 in a variety of fashions, such as a permanent adhesive bond.

Figure 27A:
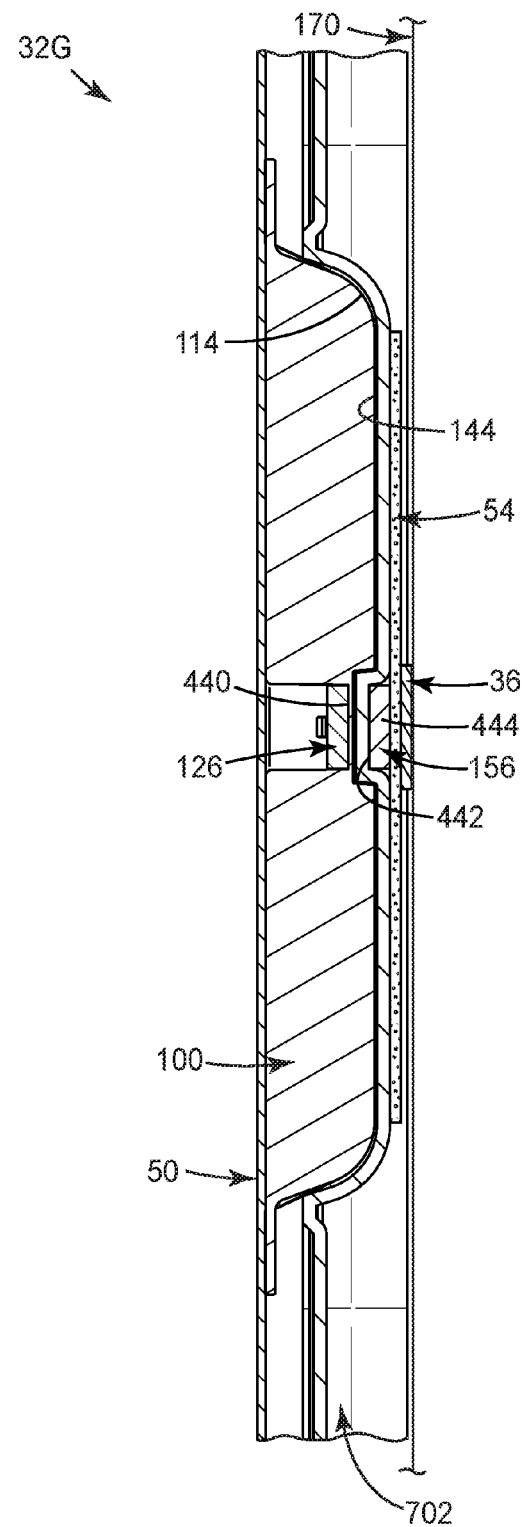
FIGS. 27A-27C are cross-sectional views of different arrangements of the décor assembly of FIG. 25A mounted to a wall surface.

As indicated above, the décor assembly 32G can be mounted to a wall surface in a number of different fashions. For example, FIG. 27A illustrates a first arrangement in which the spacer assembly 400 (FIG. 25A) is set aside or not used. The base 102 is directly releasably mounted to the wall surface 170 via the complementary fastening structure 36 and the releasable fastening structure 54 (e.g., the complementary fastening structure 36 is attached to the wall surface 170, and the releasable fastening structure 54 (otherwise attached to the base 102) is releasably connected to the complementary fastening structure 36). The backer 100 (to which the décor element 50 is otherwise attached) is releasably mounted to the base 102 as described above, including the backer frame 114 nesting within the mounting region 144 of the base 102. A robust mounting or engagement is achieved via magnetic attraction between the magnet 126 provided with the backer 100 and the magnet 156 provided with the base 102. In this regard, the backer magnet 126 is arranged relative to the backer 100 and the base magnet 156 is arranged relative to the base 102 such that a polarity of a trailing side magnetic pole 440 of the backer magnet 126 is opposite a polarity of a leading side magnetic pole 442 of the base magnet 156 (such that the backer magnet 126 and the base magnet 156 are magnetically attracted to one another in the backer 100/base 102 arrangement of FIG. 27A). In some embodiments, the base magnet 156 is a disk magnet magnetized axially through the opposing faces such that a polarity of a trailing side magnetic pole 444 of the base magnet 156 is opposite that of the leading side magnetic pole 442. In other words, the magnet 156 (or plurality of magnets) as provided with the base 102 is arranged such that the leading and trailing side magnetic poles 442, 444 have opposite polarities, with a polarity of the trailing side magnetic pole 444 of the base magnet 156 being the same polarity as the trailing side magnetic pole 440 of the backer magnet 126.

Figure 27B:
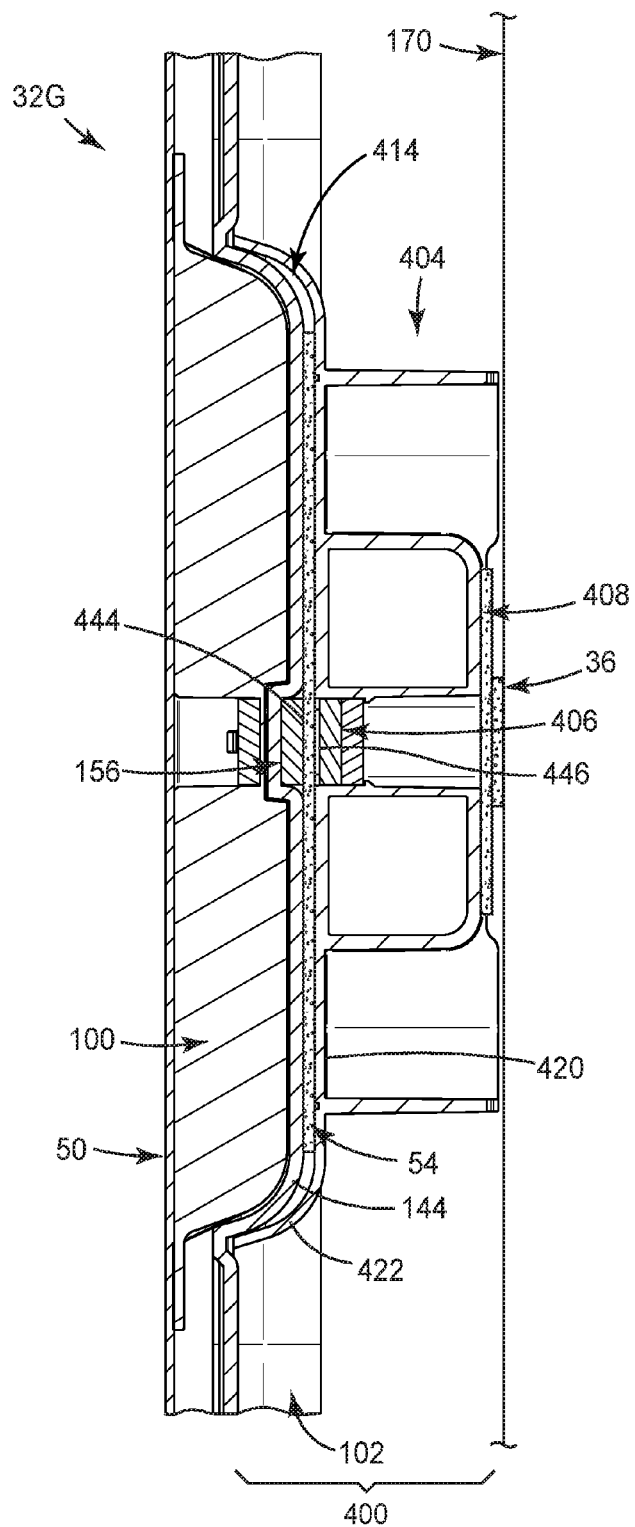

Another possible arrangement available with the décor assembly 32G is shown in FIG. 27B. The spacer assembly 400 is directly mounted to the wall surface 170 (e.g., the complementary fastening structure 36 is attached to the wall surface 170, and the releasable fastening structure 408 (otherwise attached to the spacer 404) is releasably connected to the complementary fastening structure 36). The backer 100/décor element 50 is releasably mounted to the base 102 as described above. Finally, the base 102 is releasably mounted to the spacer 404. More particularly, the mounting region 144 of the base 102 is received within the coupling region 414 of the spacer 404, with walls or panels of the base mounting region 144 nesting with or against the side panel 422 of the spacer 404. As shown, the coupling region 414 is configured to accommodate the releasable fastening structure 54 (with embodiments in which the base 102 carries the releasable fastening structure 54), including the releasable fastening structure 54 bearing or nesting against the bottom panel 420. A robust mounting or engagement is achieved via magnetic attraction between the magnet 156 provided with the base 102 and the magnet(s) 406 provided with the spacer 404. In this regard, the spacer magnet(s) 406 is arranged relative to the spacer 404 such that a polarity of a leading side magnetic pole 446 of the spacer magnet(s) 406 is opposite the polarity of the trailing side magnetic pole 444 of the base magnet 156 (such that the base magnet 156 and the spacer magnet(s) 406 are magnetically attracted to one another in the base 102/spacer 404 arrangement of FIG. 27B).

Figure 27C:
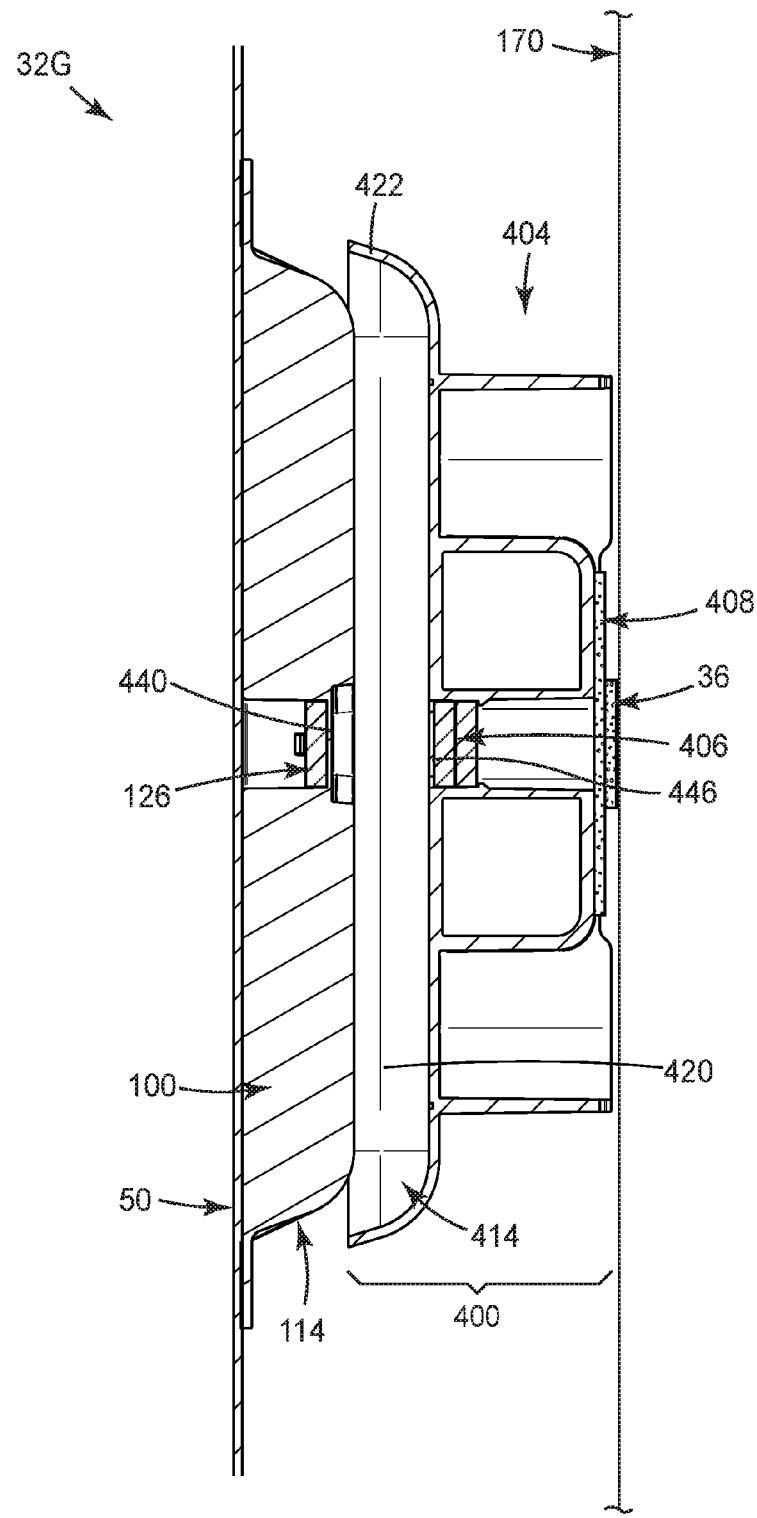

Another possible arrangement available with the décor assembly 32G in which the base 102 (FIG. 25A) is set aside or not used is shown in FIG. 27C. The spacer sub-assembly 400 is releasably mounted to the wall surface 170 as described above (e.g., the releasable fastening structure 408 of the spacer sub-assembly 400 is releasably fastened to the complementary fastening structure 36 otherwise applied to the wall surface 170). The backer 100/décor element 50 is releasably mounted to the spacer 404 (it being understood that the view of FIG. 27C reflects the backer 100 in the process of being directed into complete engagement with the spacer 404). More particularly, the frame 114 of the backer 100 is received within the coupling region 414 of the spacer 404, with walls or panels of the backer frame 114 nesting with or against the bottom panel 420 and/or the side panel 422 of the spacer 404. A robust mounting or engagement is achieved via magnetic attraction between the magnet 126 provided with the backer 100 and the magnet(s) 406 provided with the spacer 404. In this regard, the polarity of the leading side magnetic pole 446 of the spacer magnet(s) 406 is opposite the polarity of the trailing side magnetic pole 440 of the backer magnet 126 (such that the backer magnet 126 and the spacer magnet(s) 406 are magnetically attracted to one another in the backer 100/spacer 404 arrangement of FIG. 27C).

In any of the arrangements of FIGS. 27A-27C, the backer 100/décor element 50 can be removed by simply applying a pulling force on to one or more edges of the décor element 50 sufficient to overcome a magnet attraction between the corresponding magnets (e.g., the magnets 126, 156 of FIGS. 27A and 27B, or the magnets 126, 406 of FIG. 27C). Further, with arrangements in which both the base 102 and the spacer assembly 400 are employed, the base 102 can be removed from the spacer 404 by simply applying a pulling force on to one or more edges or the base 102 sufficient to overcome a magnetic attraction between the magnets 156, 406 (FIG. 27C). Thus, removing or replacing the backer 100/décor element 50 does not require removal of the component otherwise directly attached to the wall surface (e.g., the base 102 in FIG. 27A or the spacer assembly 400 in FIGS. 27B and 27C). A new combination backer 100/décor element 50 can then be assembled to the base 102 (in the arrangements of FIGS. 27A and 27B) or to the spacer assembly 400 (in the arrangement of FIG. 27C). In this regard, the new backer 100/décor element 50 will automatically self-align relative to the base 102 or the spacer 404 as described elsewhere. Further, the user is provided with the ability to select a depth of the décor element 50 relative to the wall surface 170 (by employing only one of the base 102 or the spacer assembly 400, or both). The magnetic-base constructions of the décor assembly 32G beneficially promote quick, centered engagement of the backer 100 relative to the component otherwise mounted to the wall surface 170.

Another embodiment décor assembly 32H is shown in FIGS. 28A and 28B. The décor' assembly 32H can be akin to the décor' assembly 32D (FIGS. 15A and 15B), and includes the décor' element 50, the backer 200, and the mounting pod or base 202 as described above. In addition, the décor' assembly 32H includes a spacer assembly or enhancer 470. Alternatively, the enhancer 470 can be considered a component apart from the décor' assembly 32D.

The enhancer 470 forms or includes opposing, leading and trailing sections 472, 474 (referenced generally). The leading section 472 is configured to releasably received and maintain the backer central portion 212, and optionally has a perimeter size and shape identical to that of the mounting pod 202 as described above. Further, the leading section 472 carries a magnet (not shown) arranged to be complementary with the magnet (not shown) provided with the backer 200. Thus, the leading section 472 receives and maintains the backer 200 as described above. The trailing section 474 is configured to be received and maintained by the mounting pod 202, and optionally has a perimeter size and shape identical to that of the backer central portion 212 (FIGS. 15A and 15B) as described above. Further, the trailing section 474 carries a magnet (not shown) arranged to be complementary with the magnet (not shown) provided with the mounting pod 202. Thus, the mounting pod 202 receives and maintains the trailing section 474 as described above. Upon final assembly, then, the enhancer 470 is interposed between the backer 200 and the mounting pod 202, ensuring that the backer 200 (and thus the décor element 50 carried thereby) is securely connected to the mounting pod 202 and providing additional depth between the décor element 50 and the wall surface (not shown).

Releasable Fastening System 34

As evidenced by the above descriptions, components of the décor assemblies of the present disclosure can assume a variety of forms. In the following discussions, then, reference to "the décor assembly 32" is inclusive of all décor assembly embodiments of the present disclosure. As shown in FIG. 1 and as mentioned above, the releasable fastening system 34 is a two-part system that includes the releasable fastening structure 54 (provided with any embodiment of the décor assemblies described throughout the present disclosure) and the complementary fastening structures 36. The releasable fastening system 34 can assume a variety of forms, and generally includes a plurality of first fastening elements 500 provided with the releasable fastening structure 54 (of the décor assemblies 32) and a plurality of second fastening elements 502 provided with the complementary fastening structures 36. The first and second fastening elements 500, 502 have complementary structures that promote releasable, non-permanent mating there between. For example, the first and second fastening elements 500, 502 can mimic hook-and-loop type fastening systems. The first fastening elements 500 can serve as hooks, and the second fastening elements 502 as loops, or vice-versa.

In some embodiments, the first and second fastening elements 500, 502 have a low profile, and exhibit a mated holding power characterized by a Dynamic Shear Strength of at least 10 lbs in all directions, a Cleavage Strength of not more than 6 lbs/inch width, and a Tensile Strength of not more than 6.5 lbs/inch as described below. The holding power of the releasable fastening system 34 is optionally less than that provided by conventional packaged hook-and-loop strips and desirably requires a lesser user-applied force to disconnect the fastening elements 500, 502 from one another. The reduced holding power features of the present disclosure are viable due to the lightweight construction of the décor assemblies 32 as described above.

Figure 29:
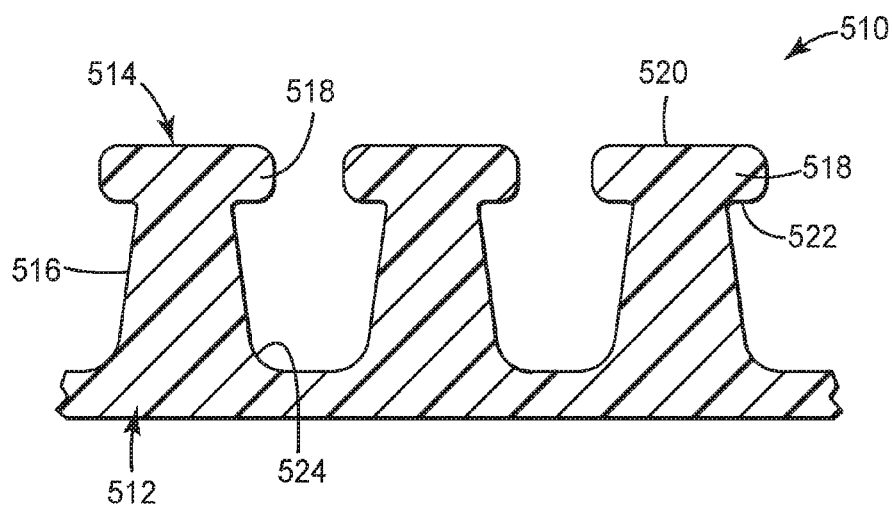
FIG. 29 is an enlarged cross-section view of a portion of a fastening structure including fastening elements useful with wall decorating kits and systems of the present disclosure.

With embodiments in which the releasable fastening system 34 incorporates a two part, hook-and-loop type format, the hook portion (e.g., either the releasable fastening structure 54 or the complementary fastening structure 36) can assume a format akin to that shown in FIG. 29. In particular, a hook fastening structure 510 useful with the present disclosure includes a backing 512 and an array of mushroom-shaped projections or hooks 514. As a point of reference, the mushroom-shaped projections or hooks 514 serve as one of the first or second fastening elements 500, 502 (FIG. 1). Each of the hooks 514 has a molecularly oriented stem 516, and, at the end of the stem 516 opposite the backing 512, a generally circular plate-like cap or head 518 projecting radially past or overhanging the stem 516. The cap 518 optionally defines a generally planar but slightly concave outer surface 520, and a generally planar radially extending inner surface 522 adjacent and parallel to the major surfaces of the backing 512. In some embodiments, the head 518 has a diameter to thickness ratio of greater than 1.5:1 (i.e., the diameter of the head 518 being its average maximum diameter measured radially of the head 518 and the stem 516, and the thickness of the head 518 being its average maximum thickness measured between its outer and inner surfaces 520, 522). The stem 516 can also have a fillet 524 around its base.

Optional features of the hook fastening structure 510 are described, for example, in U.S. Pat. Nos. 5,077,870 and 5,845,375, the teachings of which are incorporated herein by reference. In some embodiments, the hooks 514 are of uniform height, for example from about 0.10 to 1.27 mm in height, alternatively 0.18 to 0.51 mm in height; have a density on the backing 112 of 60 to 1,550 hooks per square centimeter, alternatively 125 to 690 hooks per square centimeter; have a stem diameter adjacent the head 518 of from 0.076 to 0.635 mm, alternatively 0.127 to 0.305 mm; the head 518 projects radially past the corresponding stem 516 on each side by an average of about 0.013 to 0.254 mm, alternatively by an average of about 0.025 to 0.127 mm; the head 518 has an average thickness between the outer and inner surfaces 520, 522 (measured in a direction parallel to the axis of the stem 516) of from about 0.013 to 0.254 mm, alternatively of from about 0.025 to 0.127 mm; and the head 518 has an average head diameter (measured radially of the axis of the head 518 and the stem 516) to average head thickness ratio of from 1.5:1 to 12:1, alternatively from 2.5:1 to 6:1.

In some embodiments, the hook fastening structure 510 is integrally formed from a polymer such as polypropylene or a copolymer of polypropylene and polyethylene. Virtually any oreintable thermoplastic resin can alternatively be employed, including polyesters such as poly(ethylene terephthalate), polyamides such as nylon, poly(styrene-acrylonitrile), poly(acrylonitrile-butadiene-styrene), polyolefins such as polypropylene, and plasticized polyvinyl chloride.

One exemplary form of the hook fastening structure 510 incorporating the mushroom-shaped hooks described above is available from 3M Company of St. Paul, Minn. under the trade designation 3M™ CHK02854. Other non-limiting examples of available hook fastening structures 510 include products available from 3M Company of St. Paul, Minn. under the trade designations 3M™ CHK00752 and 3M™ KN3457.

Although the hooks 514 (otherwise useful as one of the first or second fastening elements 500, 502 (FIG. 1)) have been described as being mushroom-shaped (and thus non-biased) and having a low profile, other shapes and/or properties are also acceptable. The hooks 514 can be curved or exhibit a directional bias (e.g., J-shaped), can have a plurality of heads or prongs extending from a common stem, etc.

Figure 30:
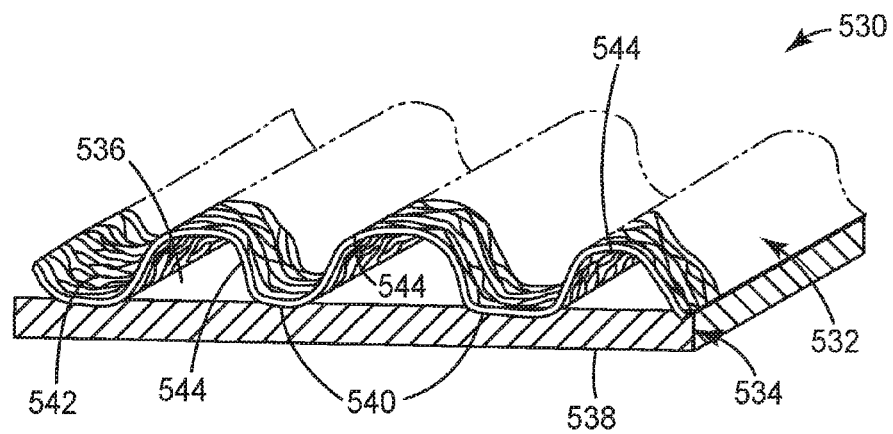
FIG. 30 is an enlarged perspective view of a portion of another fastening structure including fastening elements releasably mateable with the fastening elements of FIG. 29 and useful with wall decorating kits and systems of the present disclosure.

With embodiments in which the releasable fastening system 34 (FIG. 1) incorporates a two part, hook-and-loop type format, the loop portion (e.g., either the releasable fastening structure 54 (FIG. 1) or the complementary fastening structure 36 (FIG. 1)) can assume a format akin to that shown in FIG. 30. In particular, a loop fastening structure or loop composite 530 useful with the present disclosure includes a nonwoven loop layer 532 and an underlying backing layer 534. In some embodiments, the backing layer 534 is a thermoplastic film with front and rear surfaces 536, 538. The nonwoven loop layer 532 has anchor portions 540 autogeneously bonded to the backing layer 534 at bonding locations 542. The bonding locations 542 are along the front surface 536, with arcuate portions 544 of the nonwoven loop layer 532 projecting from the front surface 536 of the backing layer 534 between the bonding locations 542. The bonding locations 542 can be continuous rows extending transversely across the loop composite 530. However, the bonding locations 542 can be arranged in any pattern including, for example, intermittent lines, hexagonal cells, diamond cells, square cells, random bond points, patterned bond points, crosshatched lines, or any other regular or irregular geometric pattern.

Optional features of the loop composite 530 are described, for example, in U.S. Pat. Nos. 5,256,231, 5,616,394 and 7,303,805, the teachings of which are incorporated herein by reference. Generally, the nonwoven loop layer 532 has a basis weight from 10 to 100 g/m², alternatively 15 to 50 g/m². The backing layer 534 generally has a basis weight in the range of 10 to 100 g/m², alternatively 20 to 50 g/m², as measured along the front surface 536. The total loop composite 530 has a basis weight of from 30 to 200 g/m², alternatively 40 to 100 g/m².

The nonwoven loop layer 532 comprises at least in part thermoplastic fibers suitable for bonding, such as at least 10 percent bondable thermoplastic fibers, alternatively from 20 to 100 percent bondable thermoplastic fibers. The arcuate portions 544 have a generally uniform maximum height from the backing layer 534 of less than 3.0 mm, alternatively from 0 to 1 mm. The distance between the bonded portions 540 is from 4 mm to 1000 mm, alternatively 5 mm to 500 mm. The arcuate portions 544 generally comprise 20 to 99 percent of the cross-section of the entire loop composite 510, alternatively 50 to 95 percent.

Fibers suitable for forming the nonwoven loop layer 532 can be produced from a wide variety of thermoplastic polymers that are known to form fibers. Suitable thermoplastic polymers are selected from polyolefins, polyamides, polyesters, copolymers containing acrylic monomers, and blends and copolymers thereof. Suitable polyolefins include polyethylene, e.g., linear low density polyethylene, high density polyethylene, low density polyethylene and medium density polyethylene; polypropylene, e.g., isotactic polypropylene, syndiotactic polypropylene, blends thereof and blends of isotactic polypropylene and atactic polypropylene; and polybutylene, e.g., poly(1-butene) and poly(2-butene); polypentene, e.g., poly-4-methylpentene-1 and poly(2-pentene); as well as blends and copolymers thereof. Suitable polyamides include nylon 6, nylon 6/6, nylon 10, nylon 4/6, nylon 10/10, nylon 12, nylon 6/12, nylon 12/12, and hydrophilic polyamide copolymers such as copolymers of caprolactam and an alkylene oxide, e.g., ethylene oxide, and copolymers of hexamethylene adipamide and an alkylene oxide, as well as blends and copolymers thereof. Suitable polyesters include polyethylene terephthalate, polybutylene terephthalate, polycyclohexylenedimethylene terephthalate, and blends and copolymers thereof. Acrylic copolymers include ethylene acrylic acid, ethylene methacrylic acid, ethylene methylacrylate, ethylene ethylacrylate, ethylene butylacrylate and blends thereof.

One exemplary form of the loop fastening structure 530 incorporating the low profile loops or arcuate portions 544 described above is available from 3M Company of St. Paul, Minn. under the trade designation 3M™ KN5059 EBL Light.

Returning to FIG. 1, the low profile, releasable fastening systems 34 described above (e.g., the hook fastening structure 510 (FIG. 29) and the loop fastening structure 530 (FIG. 30)) are but some examples of fastening systems envisioned by the present disclosure. In other embodiments, one or both the components of the two-part fastening system 34 need not have a low profile and/or can exhibit an elevated holding power. For example, hook and loop materials of the type used in 3M™ Scotchmate™ SJ3506 adhesive-backed hook material and 3M™ Scotchmate™ SJ3507 adhesive-backed loop material may be used, though may exhibit a Cleavage Strength outside of the parameters set forth above, and thus may not be useful with some embodiments of the present disclosure. Hook and loop fastening systems are but one type of mechanical interlocking connector system useful as the releasable fastening systems of the present disclosure. By mechanical interlocking, it is meant those fasteners where at least one of the fastening elements undergoes some macroscopic deformation (e.g., plastic deformation) so that a mechanical interface results between the plural elements. Well known examples include hook and loop products commercially available under the trade designation "3M Scotchmate" industrial fastener from 3M Company of St. Paul, Minn., and those hook and loop products that are commercially available under the trade designation "Velcro". Many other connector systems and fasteners are known which comprise elements extending from a generally planar layer of one material mate with similar or dissimilar complementary or cooperating elements extending from another generally planar layer. Many different modifications of the interengaging elements are designed based on the requisite force and manner of separation between the cooperating layers of such a releasable fastening system.

In other embodiments, the releasable fastening system 34 comprises similar intermeshing first and second connector elements (as the fastening elements 500, 502). The first and second connector elements can each comprise a replicated (e.g., micro-replicated) surface structure, and can be identical. This type of releasable fastening system relies on the frictional characteristics of the materials and structures making of the connector elements 500, 502 without macroscopic deformation and interference between the elements. Examples of this type of intermeshable connector construction (including similar and dissimilar connector elements) are described in U.S. Pat. No. 4,875,259 to Appeldorn; U.S. Pat. No. 5,360,270 to Appeldorn; U.S. Pat. No. 5,201,101 to Rouser et al., the entire disclosures of each of which are incorporated herein by reference. Other mechanical fastening elements can also be used with the releasable fastening system 34 in accordance with principles of the present disclosure so long as the system is separable and optionally reusable. Other examples include, without limitation, snaps (plastic or metal), deformable closure systems such as those commercially available under the trade designation "Ziplok" closures, deformable fastening systems having pins and sockets, and the like.

Yet another contemplated format of the releasable fastening system 34 in accordance with principles of the present disclosure comprises the provision of magnetic material as the complementary fastening elements 500, 502. In some embodiments, the magnetic materials are flexible magnetic material stripes, which are conventionally known.

As yet another contemplated embodiment, at least one of the first and second fastening elements 500, 502 can comprise a low adhesion material which permits separation and repositioning. The other of the fastening elements 500, 502 can comprise a material which is easily separable from and reconnectable to such a low adhesion material. Alternatively, both components 500, 502 can comprise the same or different low adhesion material if they can be adequately separated from one another.

Examples of the above releasable fastening systems 34, as well as other releasable fastening (or connecting) systems envisioned by the present disclosure are described, for example, in U.S. Pat. No. 6,972,141 to Bries et al, the entire teachings of which is incorporated herein by reference.
Complementary Fastening Structures 36

Figure 31:
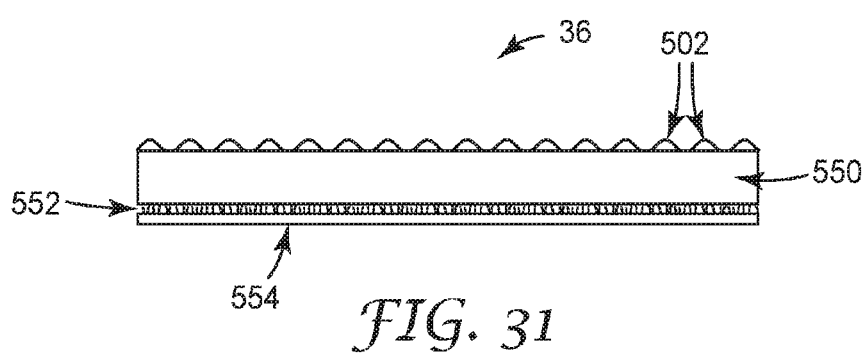
FIG. 31 is a simplified end view of a complementary fastening structure useful with the kit of FIG. 1.

The complementary fastening structures 36 provided with the kit or system 30 of the present disclosure can be identical, and generally comprise patches of material each carrying the plurality of second fastening elements 502. For example, FIG. 31 illustrates a portion of one of the complementary fastening structures 36 as including a base 550, the second fastening elements 502 (drawn generally), and a pressure sensitive adhesive 552. As indicated above, the complementary fastening structures 36 serve as one component of the two-part releasable fastening system 34 (FIG. 1), with all of the second fastening elements 502 being either a hook or a loop. The base 550 supports the selected second fastening element 502 format. For example, with some embodiments in which the second fastening elements 502 are low profile loops, the base 550 and the second fastening elements 502 can assume any of the formats described above with respect to the loop composite 530 of FIG. 30 (e.g., the base 550 of FIG. 31 is analogous to the backing layer 534 (FIG. 30)). Other constructions for the base 550 (e.g., a film) are equally acceptable.

The pressure sensitive adhesive 552 is applied (e.g., coated) to a surface of the base 550 opposite the second fastening elements 502. The pressure sensitive adhesive 552 is generally a removable adhesive selected from an available class of removable adhesives such as acrylic, silicone, rubber/resin or the like. Due to the amount of surface area used to attach the décor assemblies 32 (FIG. 1) via the releasable fastening system 34 (FIG. 1), the pressure sensitive adhesive 552 need not have a strong shear holding property. The optional reduced holding power of the releasable fastening system 34 described above also contributes to the viability of a less aggressive adhesive (e.g., because the releasable fastening system 34 allows a user to disconnect the fastening element 500, 502 with a relatively small applied force, the pressure sensitive adhesive 552 will not be subjected to elevated shear forces during use). For example, the pressure sensitive adhesive 552 need only have a shear holding power of about 0.05 lb/inch or more. The adhesion provided by the pressure sensitive adhesive 552 is sufficient to avoid peeling from a conventional room wall yet still allow smooth removal from the wall without damaging the wall. In some embodiments, the selected pressure sensitive adhesive 552 exhibits an adhesion range (as measured on stainless steel) in the range of about 5-45 oz/inch.

Acrylic adhesives can be useful as the pressure sensitive adhesive 552 due to their low cost and adhesive performance (e.g., ability to smoothly remove from a wall surface after long periods of time (e.g., six months of more)). One non-limiting class of acrylic adhesives are those containing microspheres that enhance removability. In some embodiments, the pressure sensitive adhesive 552 can be an adhesive available under the trade designation T-15780 from 3M Company (3M Commercial Graphics Division) or an adhesive available under the trade designation R-22597 from 3M Company (3M™ Removable Poster Tape adhesive). Alternatively, an adhesive exhibiting elevated holding power can be employed.

Regardless of a format of the pressure sensitive adhesive 552, in some embodiments the complementary fastening structures 36, as provided in the kit 30 (and thus prior to use) include a release liner 554 disposed over the pressure sensitive adhesive 552. The release liner 554 can assume any conventional format, and is formed of a material that readily releases from the adhesive 552.

The complementary fastening structures 36 can have a number of different shapes and sizes. In some embodiments, the complementary fastening structures 36 are parallelograms (e.g., rectangular or square), having a width on the order of 1 to 6 inches and a length on the order of 2 to 6 inches.
Direct Mounting of a Décor Assembly 32 to a Wall Surface Returning to FIG. 1, in some embodiments of wall decorating kits of the present disclosure, the spacer assembly 38 is not provided. Alternatively, even with kits including one or more spacer assemblies 38, a user may decide to not make use of the provided spacer assembly 38. In either instance, one or more of the provided décor assemblies 32 can be mounted to a wall surface via direct engagement with one (or more) of the complementary fastening structures 36.

Figure 32A:
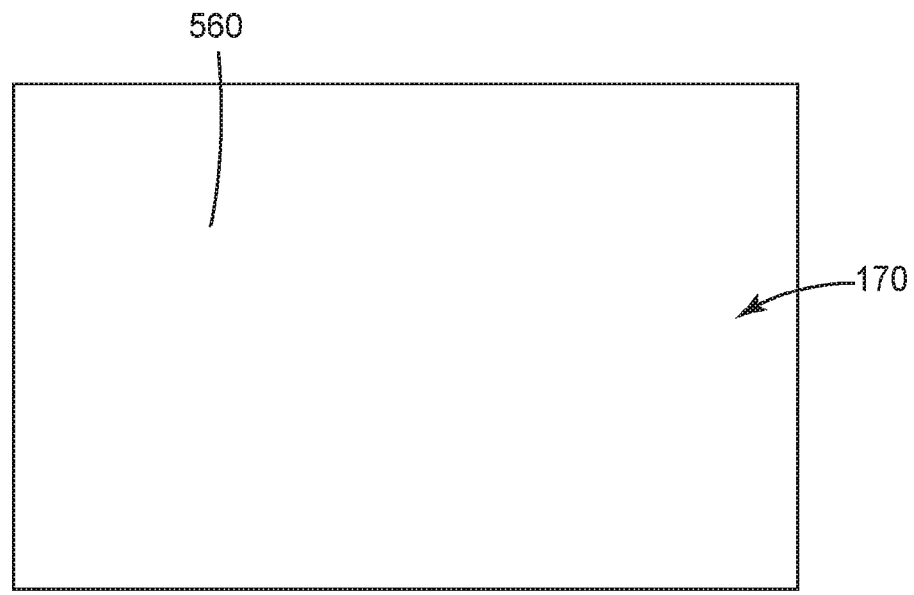
FIGS. 32A-32F illustrate installation of a décor assembly of FIG. 1 to a wall surface using a complementary fastening structure in accordance with principles of the present disclosure.
Figure 32B:
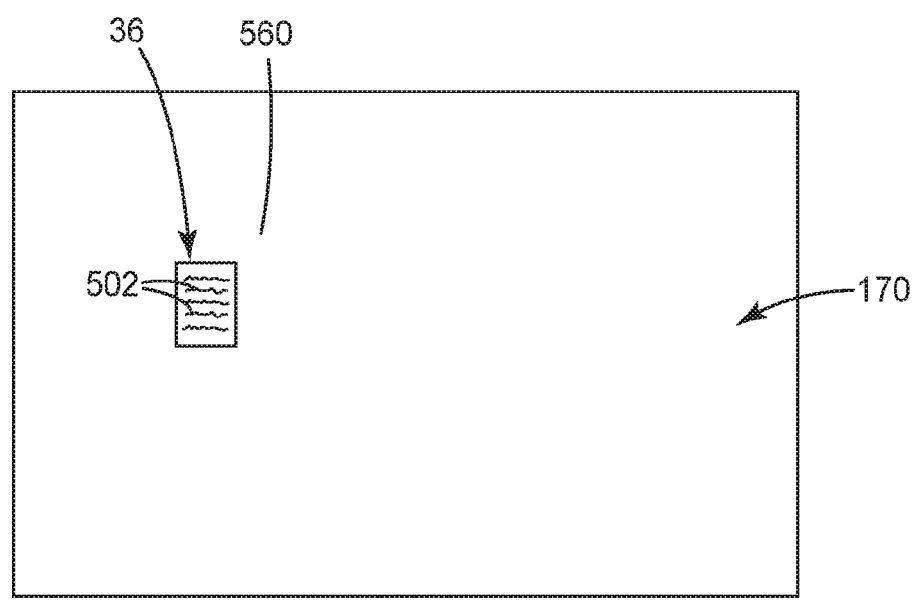

For example, FIG. 32A schematically illustrates the wall surface 170. Prior to mounting the décor assembly 32, a user will likely envision a generally desired location for the to-be mounted décor assembly 32 (e.g., the décor assembly 32 of FIG. 1 or any other embodiment décor assembly of the present disclosure); this location is generally indicated at 560 in FIG. 32A. The complementary fastening structure 36 is then adhered to the wall surface 170 in a region of the desired location 560 via the corresponding pressure sensitive adhesive 552 (hidden) such that the second fastening elements 502 are exposed as shown in FIG. 32B. With exemplary systems, kits and methods of the present disclosure, the user is not required to precisely measure or carefully locate the complementary fastening structure 36 at the desired location 560, nor is the user required to spatially arrange the complementary fastening structure 36 in a particular direction.

Figure 32C:
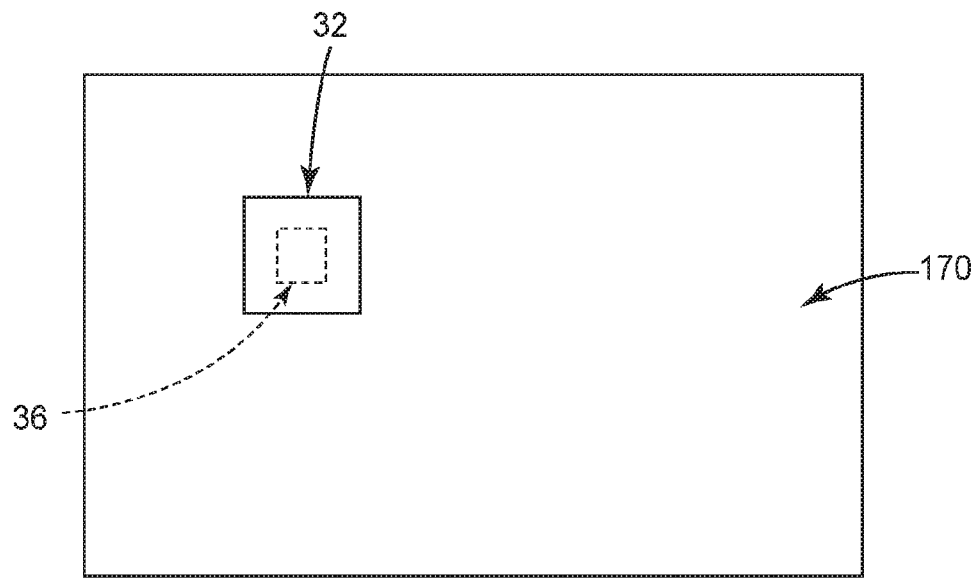
Figure 32D:
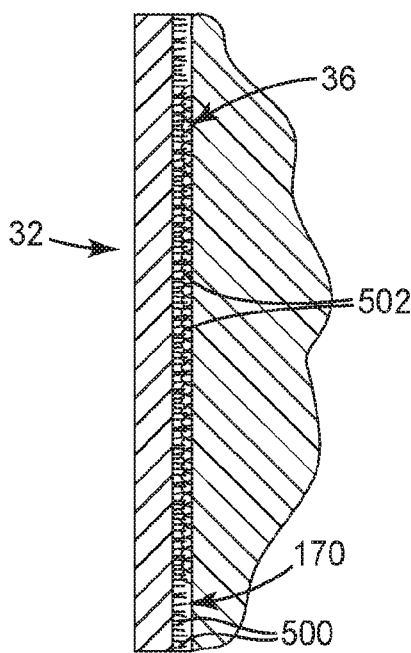

The selected décor assembly 32 is then mounted to the complementary fastening structure 36 by bringing the first fastening elements 500 carried by the décor assembly 32 into engagement with the second fastening elements 502 of the complementary fastening structure 36 as generally reflected in FIGS. 32C and 32D. If the user is unhappy with the location of the décor assembly 32 relative to the wall surface 170 and/or a spatial orientation of the décor assembly 32, the décor assembly 32 is simply removed from the complementary fastening structure 36 and repositioned as desired. In this regard, the releasable fastening system 34 and the pressure sensitive adhesive 552 (FIG. 31) provided with the complementary fastening structure 36 are configured in tandem such that in response to a tensile force and/or cleave force applied to the décor assembly 32 (by a user attempting to move the décor assembly 32 in a direction away from the wall surface 170), the fastening elements 500, 502 will disengage from each other while the complementary fastening structure 36 remains bonded to the wall surface 170. In other words, a holding strength established by the adhesive 552 against the wall surface 170 is greater than a cleavage strength and tensile strength established by the releasable fastening system 34.

Figure 32E:
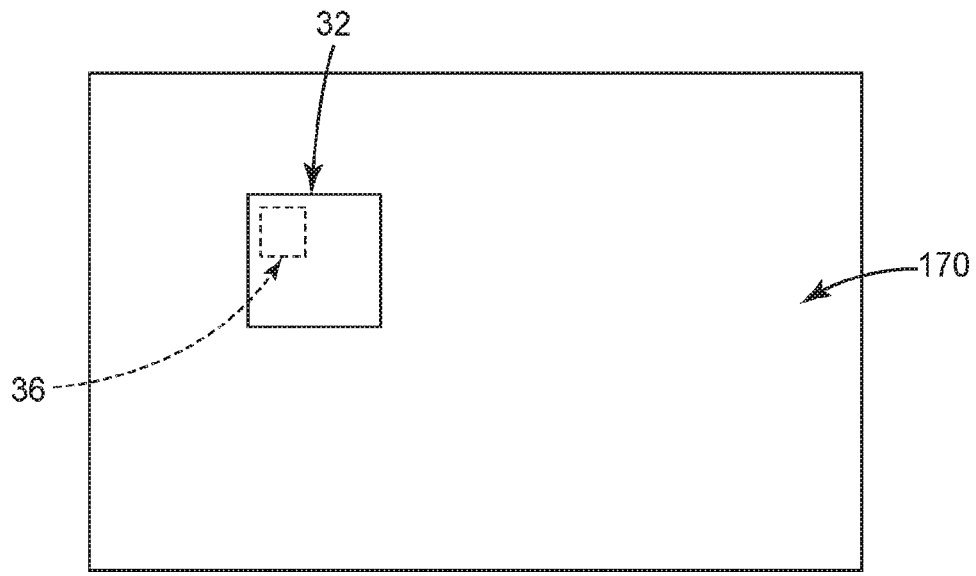
Figure 32F:
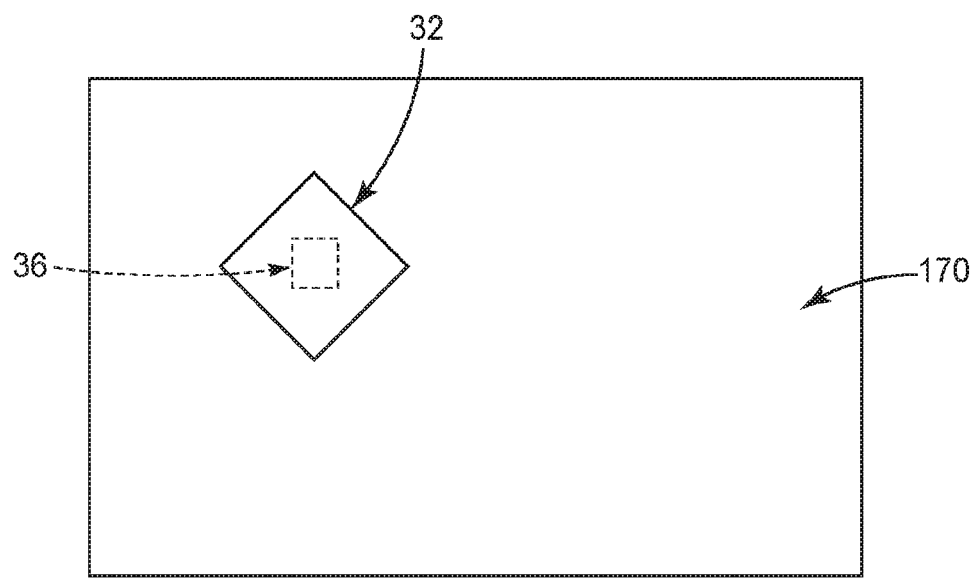

FIGS. 32E and 32F illustrate two possible re-positions of the décor assembly 32. With respect to the re-positioning of FIG. 32E, because a substantial surface area of the décor assembly 32 is covered with the first fastening elements 500 (FIG. 1) in some embodiments, the décor assembly 32 can be moved an appreciable distance relative to the complementary fastening structure 36 (and thus relative to the wall surface 170), yet sufficient engagement with the complementary fastening structure 36 is achieved. With respect to the re-positioning of FIG. 32F, the décor assembly 32 can be spatially rotated to any orientation desired by the user yet sufficient engagement with the complementary fastening structure 36 is achieved due to the "un-biased" format of the hook-and-loop fastening system 34 (FIG. 1). As compared to the very limited repositioning afforded by conventional, packaged hook-and-loop fastening systems (that are inherently limited by the relatively small size or surface areas associated with the strips, a directional bias, or both) in which an object (e.g., picture) can be moved only slightly (e.g., on the order of one inch) relative to the wall and oftentimes cannot be rotated more than 15 degrees, wall decorating systems and methods of the present disclosure allow a user to move the décor assembly 32 a significant distance relative to the complementary fastening structure 36 (e.g., on the order of at least one-half of the corresponding dimension of the décor assembly 32) without "exposing" the applied complementary fastening structure 32 and/or to rotate the décor assembly 32 to any extent desired. Thus, the wall decorating systems and methods of the present disclosure are highly useful for inexperienced users. The user need only roughly estimate a general area for application of the complementary fastening structure 36 and then repeatedly (and simply) reposition the décor assembly 32 to whatever extent desired relative to the complementary fastening structure 36 until the décor assembly 32 is spatially arranged as desired.

In some instances, the repositioning desired by the user may entail moving the décor assembly 32 an appreciable distance, or the user may desire to remove the décor assembly 32 entirely. In either case, the user simply removes the décor assembly 32 from the complementary fastening structure 36, and then peels the complementary fastening structure 36 from the wall surface 170, with the complementary fastening structure 36 being configured (e.g., the selected adhesive 552 (FIG. 31)) such that the complementary fastening structure 36 is removed from the wall surface 170 (e.g., peeling) without damaging the wall surface 170. The complementary fastening structure 36 can be re-applied to a different region of the wall surface 170, saved for a later time, or discarded.

An alternative technique for mounting the décor assembly 32 to the wall surface 170 entails initially placing one (or more) of the complementary fastening structures 36 into engagement with the selected décor assembly 32. The combined décor assembly 32/complementary fastening structure 36 is then mounted to the wall surface 170 in a general region of the desired location 162 via the pressure sensitive adhesive 552 (FIG. 31). Once again, if the user is unsatisfied with the location or spatial orientation of the décor assembly 32 relative to the wall surface 170, the décor assembly 32 can be removed from the complementary fastening structure 36, repositioned as desired, and then re-engaged to the complementary fastening structure 36 as described above.

With wall decorating kits and systems of the present disclosure, a significant surface area of the wall surface 170 can be quickly and easily decorated and re-decorated as desired. For example, with embodiments in which the kit 30 (FIG. 1) includes décor assemblies 32 having visually distinct décor elements 50 (FIG. 2A), a user can mount a first one of the décor assemblies 32 to the wall surface 170 and if unhappy with the resulting visual effect, can replace the applied décor assembly 32 with a different décor assembly 32 from the kit 30 and having a different décor element 50 via the previously applied complementary fastening structure 36. Similarly, if after a period of time the user desires to implement a decorating theme differing from that provided by a previously-mounted décor assembly 32, that décor assembly 32 can be replaced with a "new" décor assembly 32 using the previously-applied complementary fastening structure 36. Similarly, a series of décor assemblies 32 can be applied to the wall surface 170, repositioned or replaced (individually or entirely) as desired.

Direct Mounting of Other décor Assemblies to a Wall Surface

Direct mounting of the décor assemblies 32B (FIG. 5), 32C (FIG. 9), 32D (FIG. 15A), 32E (FIG. 17A), 32F (FIG. 18), 32G (FIG. 25A), and FIG. 32H (FIG. 28A) (as well as other décor assemblies described below) to the wall surface 170 can be accomplished in a manner akin to the above descriptions, and for several embodiments are at least partially illustrated above. By way of further explanation, and with respect to the décor assembly 32B, in one embodiment, the base 78 is mounted to the wall surface 170 at a desired location via the complementary fastening structure 36 (FIG.

Figure 33A:
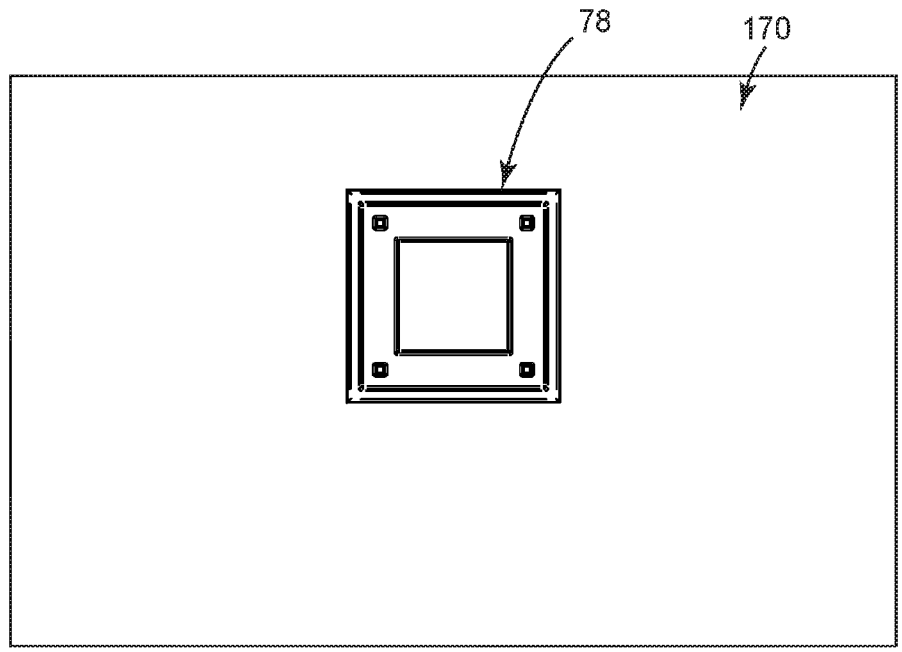
FIGS. 33A-33D illustrate installation of the décor assembly of FIG. 5.
Figure 33B:
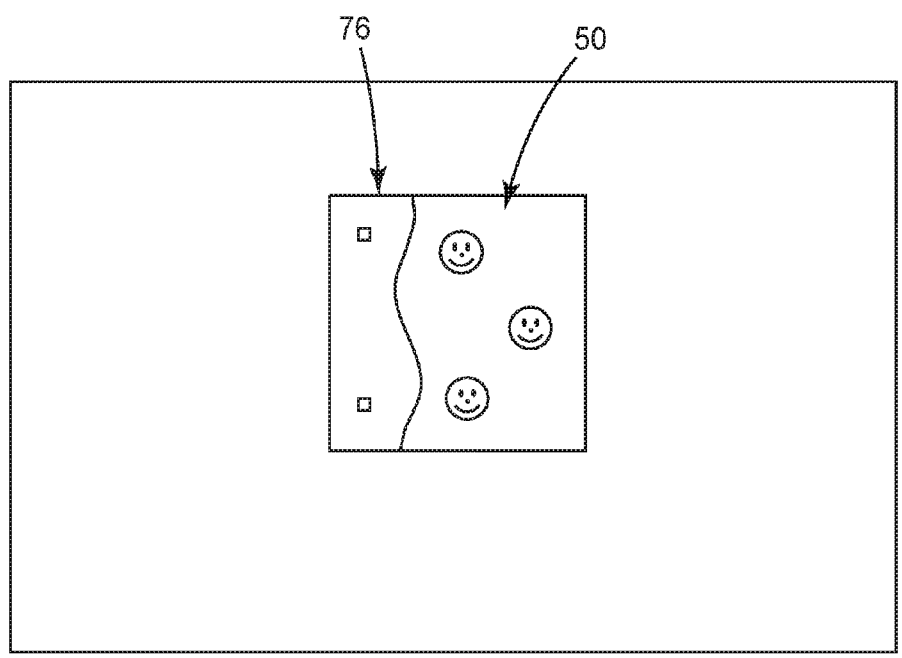
Figure 33C:
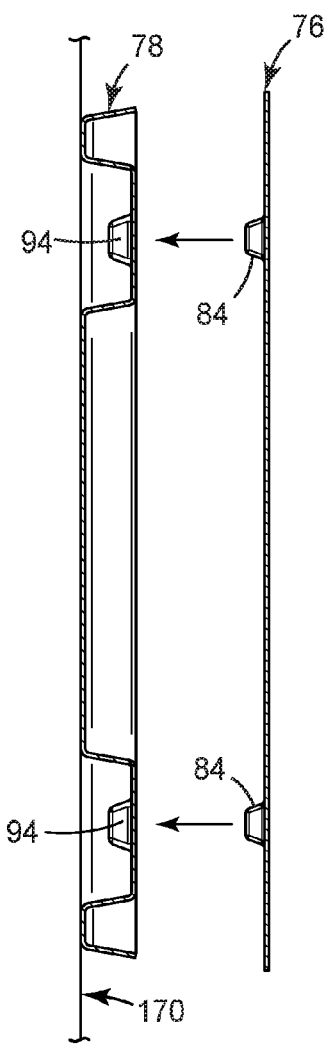

1) as shown in FIG. 33A (e.g., the complementary fastening structure 36 may have been previously applied to the wall surface 170, or the complementary fastening structure 36 can initially be connected to the base 78 and then the base 78/complementary fastening structure 36 collectively mounted to the wall surface 170). The backer 76 is then mounted to the base 78 as reflected in FIG. 33B. As a point of reference, the backer 76 is referenced generally in FIG. 33B and carries or forms the décor element 50. The backer 76 is readily guided into a centered relationship relative to the base 78 as the feet 84 are inserted into corresponding ones of the cavities 94 as generally indicated by FIG. 33C. With embodiments in which a foot 84/cavity 94 connection is provided adjacent the corners of the backer 76, the backer 76 (and thus the décor element 50 carried thereby) is held substantially flush against the base 78. Where desired, the base 78 (with or without the backer 76) can be repositioned relative to the wall surface 170 as described above.

Figure 33D:
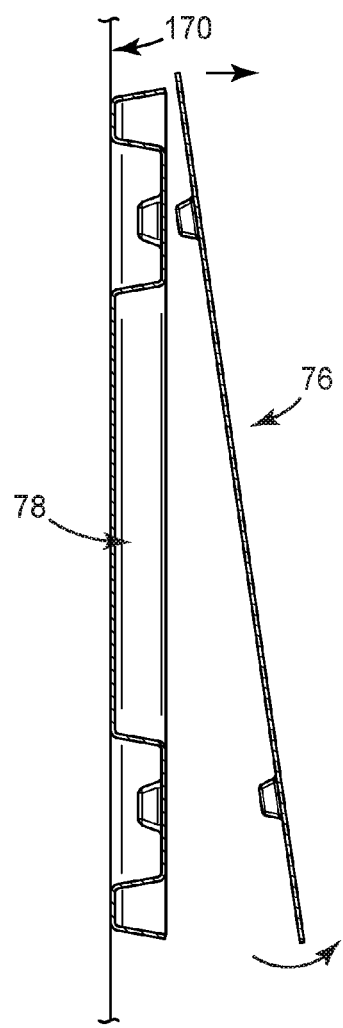

A user desiring to replace the so-installed décor element 50 with a differently-formatted décor element 50 simply disengages the mounted backer 76 from the base 78, as shown in FIG. 33D. For example, the user can grasp the backer 76 at opposing edges thereof and pull the backer 76 away from the base 78 in a direction substantially perpendicular to the wall surface 170. Alternatively or in addition, the backer 76 can be pivoted relative to the base 78 to effectuate partial or complete disengagement. In other words, the tensile strength and/or cleave strength established by the selected releasable fastening system 34 (FIG. 1) is greater than that collectively established between the backer 76 and the base 78; additionally, the holding strength or force established between the complementary fastening structure 36 (i.e., the adhesive 552 (FIG. 31)) and the wall surface 170 is greater than the collective tensile strength and cleavage strength between the backer 76 and the base 78. Regardless, the base 78 remains mounted to the wall surface 170. The backer 76 can be rotated and re-connected to the base 78, or a new backer 76 carrying or forming a different décor element 50 can be mounted to the base 78 as described above. Upon mounting to the wall surface 170, then, the base 78 serves as a constant landing zone so that a "new" backer 76 will be identically located and oriented relative to the wall surface 170 when the backer 76/décor element 50 is replaced. Thus, once a user is satisfied with the spatial location and orientation of the base 78, décor replacement is easily and consistently accomplished.

Holding Strength Relationships

As implicated by the above descriptions, the wall decorating systems, kits and methods of the present disclosure uniquely correlate various releasable attachment or mounting properties across multiple components or regions of engagement. The complementary fastening structure 36, and notably the adhesive 552 (FIG. 31) utilized with the complementary fastening structure 36, is configured to maintain the décor assembly 32 (e.g., any embodiment décor assembly of the present disclosure), as well as any spacer assembly employed with the décor assembly, relative to the wall surface 170, yet not damage the wall surface 170 when removal of the complementary fastening structure 36 is desired. Further, the complementary fastening structure 36 maintains engagement with the wall surface 170 in the presence of pulling (or tensile) and cleavage forces placed upon the décor assembly 32 (e.g., as a user is attempting to remove the décor assembly 32 from the complementary fastening structure 36). The releasable fastening system 34, in turn, is configured to maintain the décor assembly 32 mounted to the wall surface 170 (via the adhesive mounting provided by the complementary fastening structure 36) in all orientations or directions of the first and second fastening elements 500, 502 relative to one another. In other words, the releasable fastening system 34 exhibits sufficient shear strength in all orientations of the panel or panel assembly 52 (FIG. 2A) (or other décor assembly component carrying the first fastening elements 500) relative to the complementary fastening structure 36 (and thus the second fastening elements 502 carried thereby). Further, the tensile and cleavage strength embodied by the releasable fastening system 34 correlates with the holding (e.g., adhesive) strength of the complementary fastening structure 36 as described above (i.e., the fastening elements 500, 502 uncouple in response to an applied tensile and/or cleavage force without debonding of the complementary fastening structure 36 from the wall surface 170).

With the above in mind, in some embodiments, the configurations of the releasable fastening system 34 in tandem with the configurations of the complementary fastening structure 36 (and in particular the adhesive 552 (FIG. 31)) have the parameters as shown in Tables 1 and 2.

TABLE 1

Properties of Releasable Fastening System

| | |
|---|---|
| Cleavage Strength | Not more than 6 lbs/inch width |
| Tensile Strength | Not more than 6.5 lbs/inch$^2$ |
| Dynamic Shear Strength | At least 10 lbs in all directions, optionally at least 15 lbs in all directions, optionally at least 25 lbs in all directions |

TABLE 2

Properties of Complementary Fastening Structure Adhered to Wall

| | |
|---|---|
| 180 Degree Peel Force | At least 10 oz/inch, optionally at least 14 oz/inch, optionally at least 18 oz/inch |
| 90 Degree Peel Force | At least 12 oz/inch, optionally at least 14 oz/inch, optionally at least 20 oz/inch |
| Peel Removal Strength | Not more than 30 oz/inch |
| Static Shear Strength | At least 20,000 minutes, optionally at least 50,000 minutes |

Samples of releasable fastening systems and of complementary fastening structures in accordance with the present disclosure may be tested for each of the above parameters in accordance with the test methods below.

Cleavage Strength Test

Figure 34A:
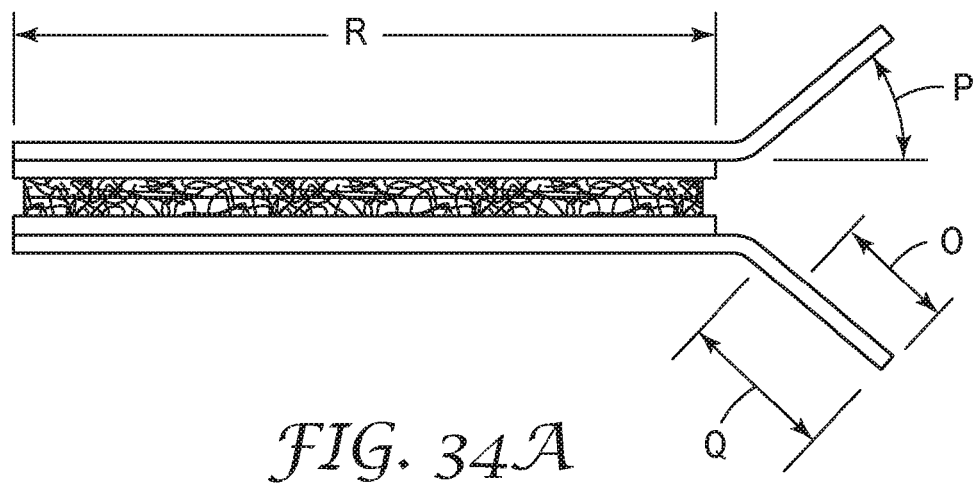
FIG. 34A is a side view of a test plate configuration used in a cleavage strength test.
Figure 34B:
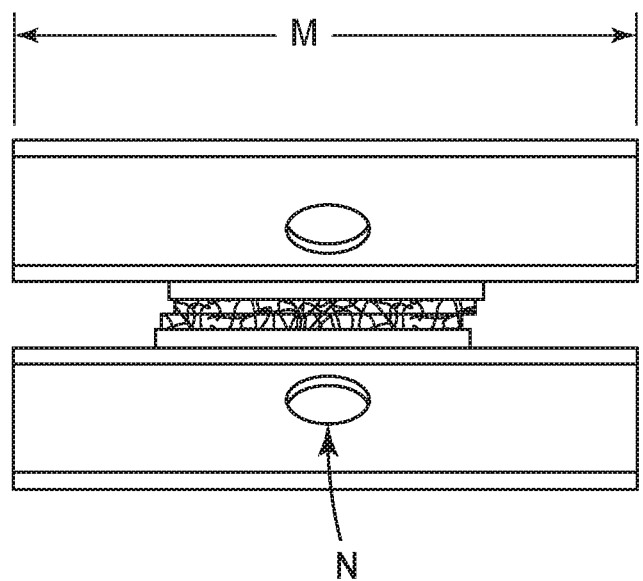
FIG. 34B is an end view of the test plate configuration of FIG. 34A.

This test determines the cleavage strength of a mating patch measuring 1 inch±1/16 (25.4 mm±1.6 mm)×2.25 inch±1/16 (57.2 mm±1.6 mm) to a dynamic cleavage force that is attached to a piece of mounting surface measuring 1 inch±1/16 (25.4 mm±1.6 mm)×2.25 inch±1/16 (57.2 mm±1.6 mm). Two clean, bare aluminum plates are required. For clarification purposes, FIGS. 34A and 34B are provided to illustrate the configuration of the aluminum test plates. Both plates shall be 2 inches (illustrated by reference letter M)×3 inches and have a single 1/4 inch diameter hole (illustrated by reference letter N) centered along the 2 inch width of the plate and located 3/8 inch from centerline (illustrated by reference letter O) to the plate's edge and a 45 degree bend (illustrated by reference letter P) located 9/16 inch from the end of the plate (illustrated by reference letter Q).

The mating patch is adhered to one aluminum test plate and the mounting surface sample is adhered to the other aluminum test plate. Both the mating patch and surface sample should be oriented with the end even with the unbent edge of the respective test plate and centered on the 2 inch width of the test late, extending forward towards the bent portion (illustrated by reference letter R). Each plate should be placed in a mirrored overlapping configuration such that the mounting surface sample is overlapped with the mating patch and such that the angled portion of the plates are disposed at the same end forming the test specimen. The mating patch and mounting surface sample are engaged by carefully aligning them on top of one another and using increasing finger pressure to press the mating patch against the mounting surface sample. When the mating patch consists of hooks substantially identical to the hooks of the mounting surface, an audible click may be heard. For all other hook and loop combinations: 1) First use finger pressure to lightly engage the samples, then twist the plate with the loop specimen approximately 20° in each direction to more fully engage the loops. 2) Set the sample onto the edge of a flat, rigid surface, allowing the angled end of the bottom plate to overhand and letting the remainder of the sample to lay flat. Place the 8 lb. steel bar onto the top plate such that it is balanced over the engaged portion of the samples. 3) Roll the 4.5 lb weight over a 2 inch span of the steel bar three times in each direction. One end of the bar is supported so that the weight of the roller does not wobble the plate and disengage the fasteners.

A hook is slid through the hole in one of the test plates and the hook clamped in the lower, fixed jaw of a tensile tester (such as an INSTRON™ Model 5544, manufactured by Instron Corporation, Canton, Mass.) with a 225$lb$ load cell. Enough clearance should be provided so that the test plate can freely rotate about the hook as the test is being conducted. Holding the test specimen approximately horizontal and perpendicular to the clamping plane of the jaws, another hook is looped through the hole in the remaining upper plate. The second hook is clamped in the movable jaw of the tensile tester. Enough pre-tension should be provided to the specimen to maintain it in a roughly horizontal position when external support is removed. The tensile tester is engaged at a crosshead speed of 12 inches (30.5 cm) per minute. The recorded cleavage strength is the maximum dynamic force applied to the sample when removing the mating patch from the piece of mounting surface.

Tensile Strength Test

Test room conditions: 73.4±3.6° F. (23±2° C.), 50%±5% R.H. All samples are allowed to condition in the test room a minimum of 24 hours before testing. T-blocks with surface area of 1 square inch are used. Hook and loop test samples are cut to one square inch and applied to two respective T-blocks via pressure sensitive adhesive. T-blocks with hook and loop attached via adhesive are lightly joined and twisted back and forth approximately 20 degrees in each direction. Blocks are then put under 1630 grams (3.6 lbs) for a period of five seconds. The respective handle portions of joined T-block samples are inserted into the upper and lower jaws of the Instron Model 5544 tensile tester with 225$lb$ load cell. Samples are pulled in tensile mode at a speed of 12 inches per minute. The recorded tensile strength is the maximum force applied to the sample as it is separated in tensile mode.

Dynamic Shear Strength Test

Test method utilized is ASTM D5169-98 (Reapproved 2010), "Standard Test Method for Shear Strength (Dynamic Method) of Hook and Loop Fasteners," except that a 101$b$ roller is substituted for the listed 111$b$ roller.

Peel Force Tests

Evaluation of peel force and peel removal is performed at 73.4±3.6° F. (23±2° C.) and 50%±5% relative humidity. Test samples are allowed to condition in the test room a minimum of 24 hours before testing. In accordance with the ASTM A-666, test samples are placed on a stainless steel panel (Type 302 or 304), with the panel first being cleaned with a solvent appropriate for the adhesive type being tested. Once the test sample is placed on the panel, a hand-operated 4.5 lb (2 kg) roller is rolled over the test sample once in each direction (2 passes total) at a rate of approximately 12 inches/min. The test sample is then immediately tested for peel adhesion using an Imass Model SP-2000 tester with a 25$lb$ load cell. The recorded peel force or peel removal strength is the average adhesion to the panel during a 5 second test duration.

The 180 Degree Peel Force test is performed at a peel rate of 12 inch/minute.

The 90 Degree Peel Force test is performed at a peel rate of 12 inch/minute.

The Peel Removal Strength test is performed at a peel angle of 180 degrees and at a peel rate of 90 inch/minute.

Static Shear Strength Test

Evaluation of static shear strength is performed at 73.4±3.6° F. (23±2° C.) and 50%±5% relative humidity. Test samples are allowed to condition in the test room a minimum of 24 hours before testing. The Static Shear Strength is evaluated using glass as the test panel. The test sample is applied to the glass panel using light thumb pressure, and is then rolled twice in each direction (four passes total) with a hand-operated, 4.5 lb roller. Following a one hour dwell time, the static shear strength of the test sample on glass is evaluated by hanging a 500 gram weight from the test sample. The recorded Static Shear Strength is the time in minutes to failure (i.e., the test sample falls from the glass panel).

Optional Alignment Clips

Figure 35:
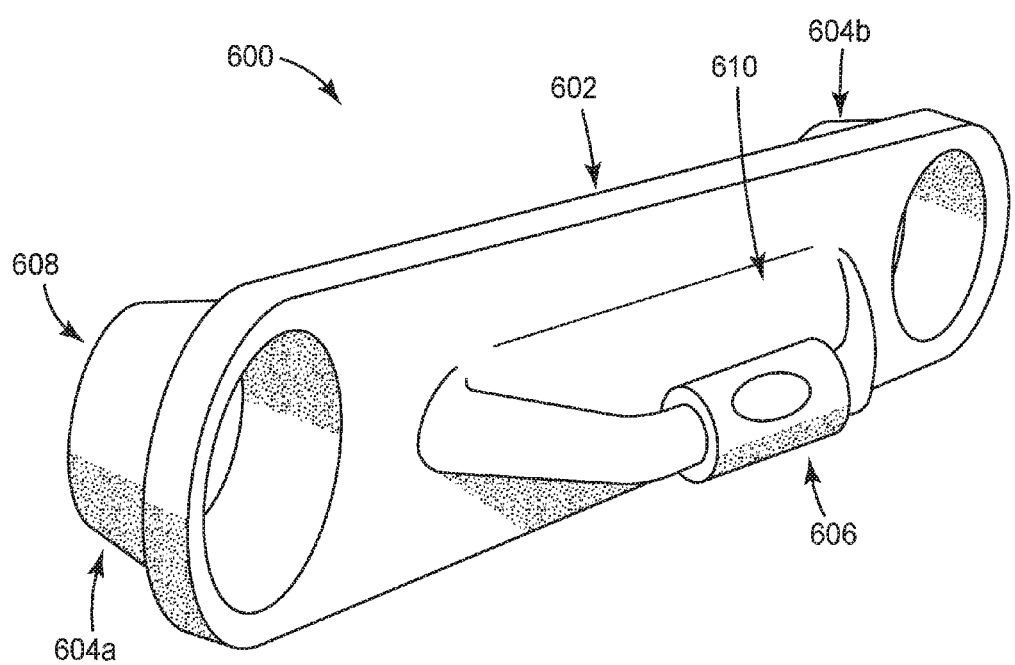
FIG. 35 is a perspective view of an alignment clip useful with the present disclosure.

To assist with user installation of the décor assemblies 32, some embodiments of the present disclosure include an optional alignment clip. One embodiment alignment clip 600 useful with the décor assembly 32B (FIG. 5) is shown in FIG. 35 and includes a head 602, opposing fingers 604a, 604b, and an optional spirit level 606. The head 602 is sized and shaped in accordance with a geometrical arrangement of the cavities 94 (FIG. 5) provided with the base 78 (FIG. 5) of the décor assembly 32B, with the fingers 604a, 604b, in turn, being configured to be selectively captured within respective ones of the cavities 94. In some embodiments, a magnetic structure (indicated generally at 608) can be associated with each of the fingers 604a, 604b, and is useful with embodiments of the base 78 that also include a magnetic structure with the cavities 94 as described above. The spirit level 606 can be of a type known in the art, and provides a visual indication of a spatial arrangement of the head 602 relative to horizontal. The spirit level 606 can be provided as part of a finger grip body 610.

Figure 36A:
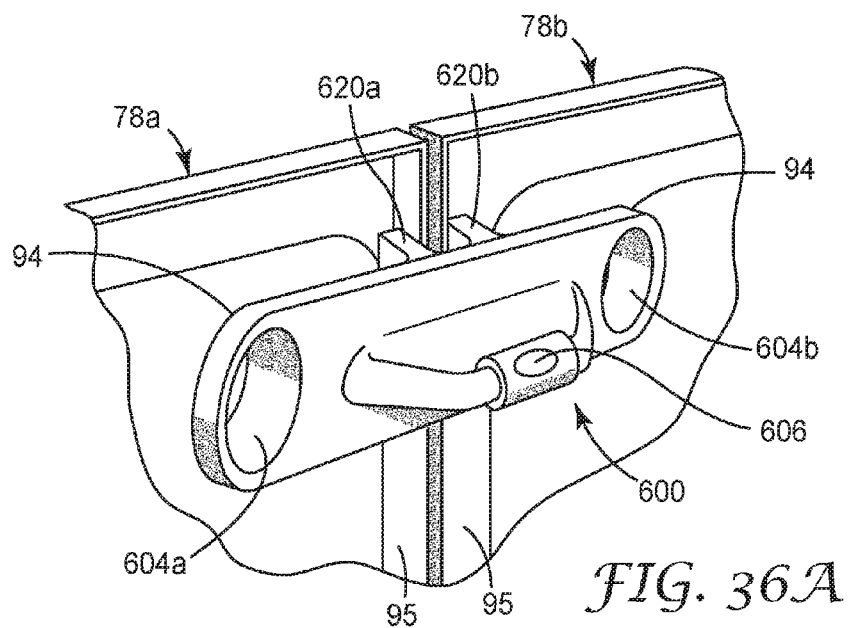
FIGS. 36A-36C illustrate use of the alignment clip of FIG. 35.
Figure 36B:
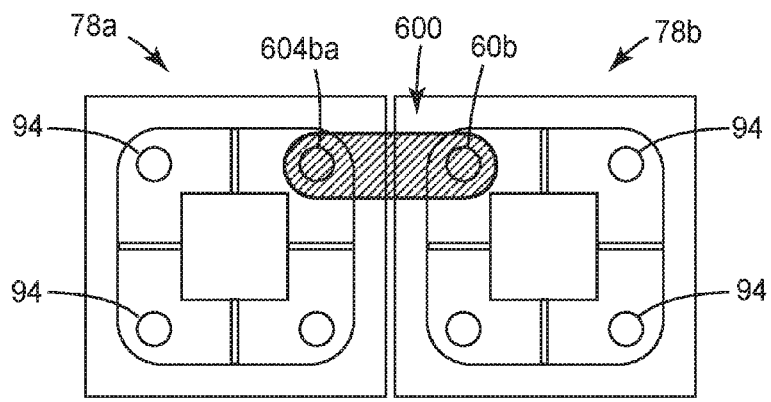

FIGS. 36A and 36B illustrate but one possible implementation of the alignment clip 600 in interconnecting two of the bases 78a, 78b in a uniform or aligned fashion. The first finger 604a is captured within the cavity 94 (referenced generally) of the first base 78a, and the second finger 604b is captured within the cavity 94 of the second base 78b. Where provided, the magnetic structure 608 (FIG. 35) assists in achieving a magnetic "lock" between the alignment clip 600 and the bases 78a, 78b. As best shown in FIG. 36A, the alignment clip 600 optionally includes opposing posts 620a, 620b that are sized and shaped in accordance with a known thickness of the perimeter wall 95 of the bases 78a, 78b, serving to capture the walls 95 between the posts 620a, 620b. Regardless, the alignment clip 600 aligns the bases 78a, 78b relative to one another. Further, when the interconnected bases 78*a*, 78*b* are collectively arranged relative to a wall surface, the spirit level 606 visually informs the user as to how level the assembly 78*a*, 78*b* is relative to horizontal.

Figure 36C:
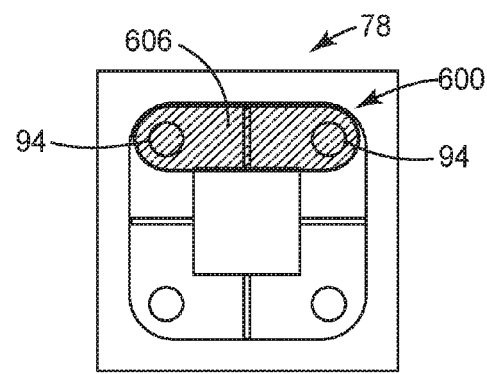

The alignment clip 600 can further be useful in assisting a user to desirably align a single base 78 relative to horizontal as reflected by FIG. 36C. As shown, the alignment clip 600 has been mounted to two of the cavities 94 (referenced generally). Upon generally locating the base 78 relative to a wall surface, the spirit level 606 (referenced generally) provides a visual indication as to how closely the shape of the base 78 is to being horizontally aligned.

Regardless of how the alignment clip 600 is utilized, once the user is satisfied with a spatial arrangement of the base(s) 78 relative to the wall surface, the base(s) 78 is mounted to the wall surface in this selected orientation via the corresponding complementary fastening structure(s) 36 (FIG. 1) as described above. Once mounted, the alignment clip 600 can be removed, with the base(s) 78 now being held in the selected orientation by the complementary fastening structure(s) 36.

Optional Lighting

Figure 37A:
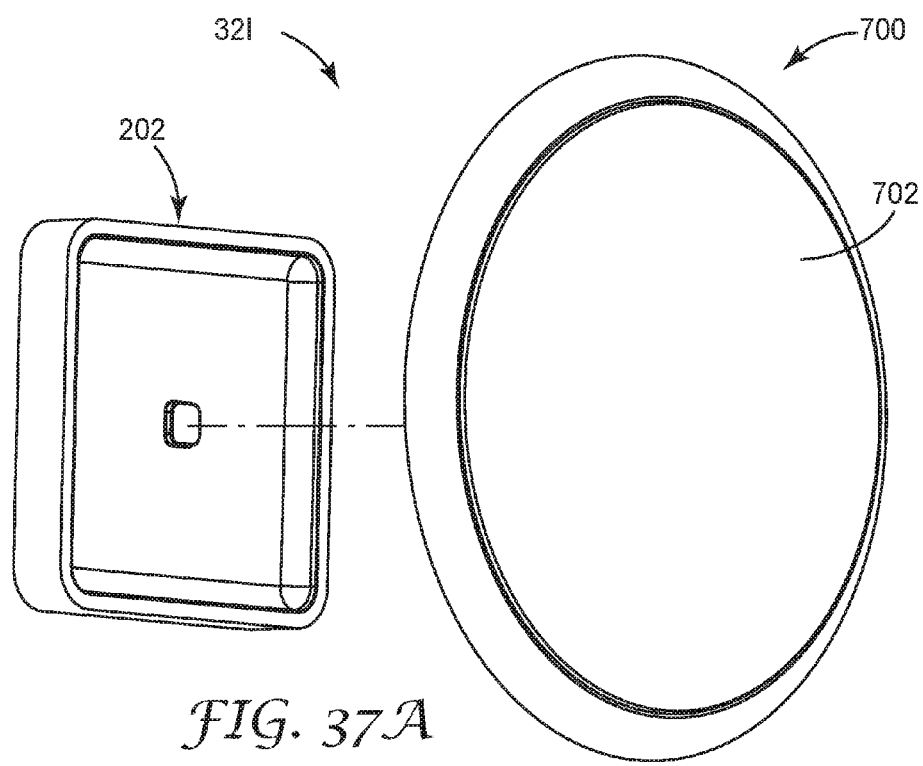
FIG. 37A is a front exploded perspective view of another décor assembly in accordance with principles of the present disclosure.
Figure 37B:
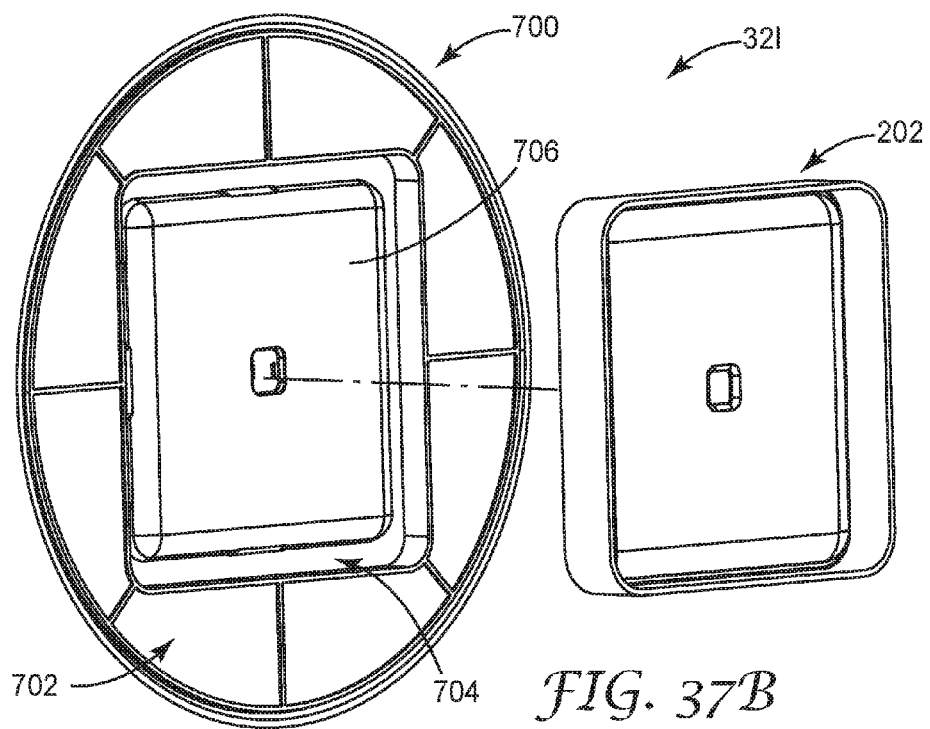
FIG. 37B is a rear exploded perspective view of the décor assembly of FIG. 37A.

As mentioned above, décor assemblies of the present disclosure optionally include additional components that augment an overall visual appearance, for example lighting. With this in mind, another embodiment décor assembly 32I in accordance with principles of the present disclosure is shown in FIGS. 37A and 37B, and includes a décor fixture 700 and a wall mounting component that can take the form of the mounting pod or base 202 described above (and that carries the releasable fastening structure 54 (not shown)). The décor fixture 700 can assume a variety of forms, and in some embodiments includes a battery powered light fixture 702 (referenced generally) and a backer 704 (best seen in FIG. 37B). The backer 704 can be integrally formed with or permanently assembled to the light fixture 702, and encloses or covers internal components of the light fixture 702 not otherwise visible in the views (e.g., a rechargeable battery, a lighting element (e.g., LEDs), electrical wiring, on/off switch, etc.). Further, the backer 704 includes a central portion 706 that can be highly akin to the backer central portion 212 (FIGS. 15A and 15B) described above. Thus, the central portion 706 is configured to nest within the mounting pod 202, and incorporates various features (e.g., a magnet (not shown)) configured to interface with corresponding components of the mounting pod 202 to effectuate releasable mounting of the décor fixture 700 with the mounting pod 202.

The light fixture 702 can incorporate various electronics that effectuate user control over an operational state of the lighting element (not shown). For example, the light fixture 702 can include remote control features allowing a user to turn the lighting element off or on from a remote location. The light fixture 702 optionally includes a capacitor that is periodically charged to power the lighting element. An on/off switch provided with the light fixture 702 can take various forms, and can include a "push" on or off configuration.

Figure 38A:
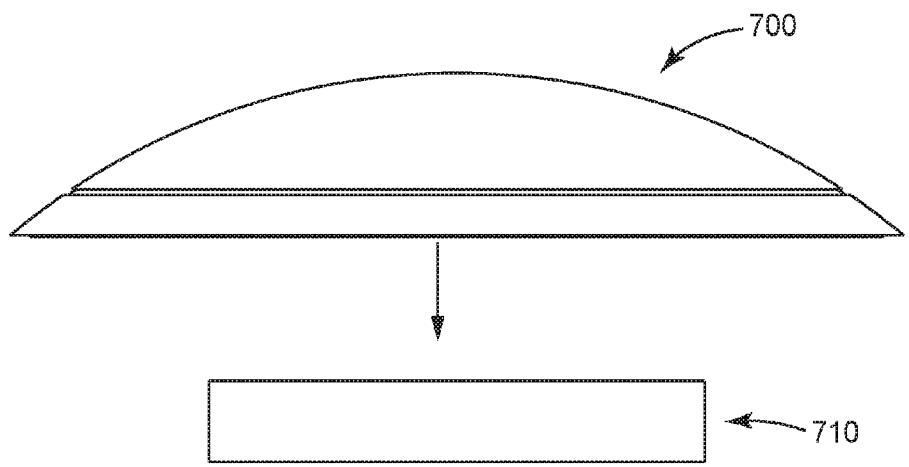
FIGS. 38A and 38B are simplified side views illustrating a décor fixture component of the décor assembly of FIG. 37A in combination with a charging dock.
Figure 38B:
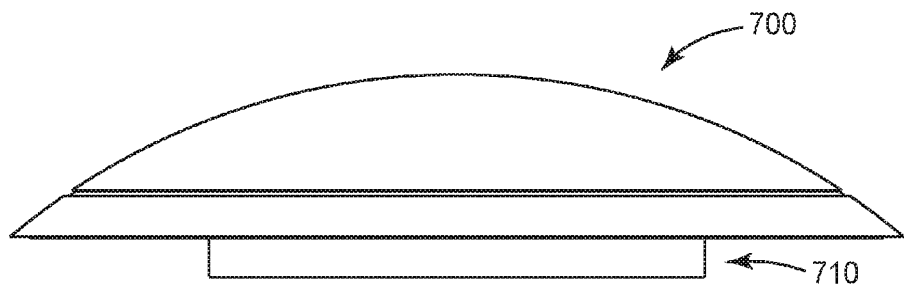

The décor fixture 700 can be removably mounted to the mounting pod 202 in any of the manners described above. In some embodiments, the décor assembly 32I is provided as part of a system that further includes a charging dock 710 as shown (in simplified form) in FIGS. 38A and 38B. The charging dock 710 has a size and shape akin to the mounting pod 202 (FIGS. 37A and 37B), and thus is configured to selective receive the light fixture central portion 706 (FIG. 37B). Further, the charging dock 710 is configured for electrical connection to a standard household electrical outlet and to re-charge the battery of the décor fixture 700. As is known in the art, then, the charging dock 710 includes requisite electrical connectors (not shown) such that when the décor fixture 700 is mounted to the charging dock 710 (as in FIG. 37B), the light fixture battery is re-charged.

Figure 39A:
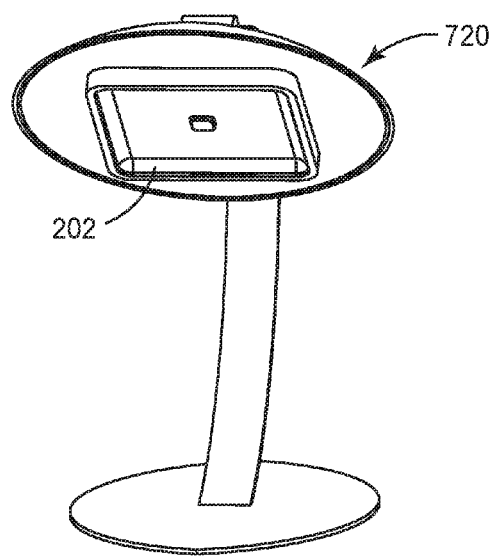
FIGS. 39A-39C illustrate a table light system in accordance with principles of the present disclosure and including a décor fixture component of the décor assembly of FIG. 37A.
Figure 39B:
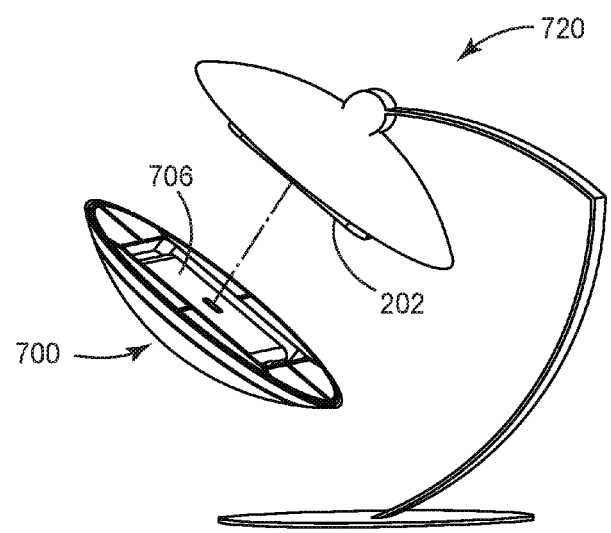
Figure 39C:
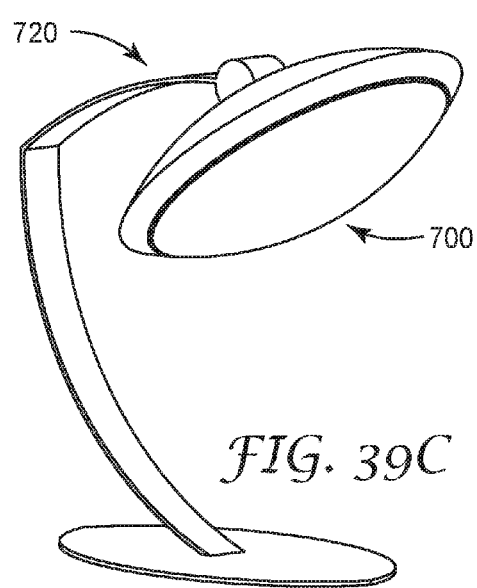

In addition to mounting the décor fixture 700 to the mounting pod 202 (FIG. 37A) that is otherwise mounted to a wall surface, other display formats for the light fixture 702 are envisioned by the present disclosure. For example, FIG. 39A illustrates the mounting pod 202 provided as part of a table light stand 720. The table light stand 720 can assume a wide variety of forms that may or may not be directly implicated by the views. The mounting pod 202 can be an integrally formed component of the table light stand 720, or can be separately formed and subsequently assembled thereto. Regardless, and as shown in FIGS. 39B and 39C, the décor fixture 700 can be removably coupled to the table light stand 720 via interface between the light fixture central portion 706 and the mounting pod 202 as described above.

FIG. 40A illustrates an upright light stand 730 envisioned by the present disclosure and including or forming the mounting pod 202. The upright light stand 730 can assume a variety of forms that may or may not be directly implicated by the views. The mounting pod 202 can be an integrally formed component of the upright light stand 730, or can be separately formed and subsequently assembled thereto. Regardless, and as shown in FIGS. 40B and 40C, the décor fixture 700 can be removably coupled to the upright light stand 730 via interface between the light fixture central portion (hidden) and the mounting pod 202 as described above.

As evidenced by the above descriptions, embodiments including the mounting pod 202 allow a user to implement a number of different decorative effects (including lighting) in a room of interest. FIG. 41 provides one example of how a room can be decorated in accordance with some embodiments of the present disclosure. Differing décor elements 50 are removably mounted to walls of the room using mounting pods (hidden), as are décor fixtures 700 that otherwise illuminate the room. Further illumination is provided by the décor fixtures 700 carried by the table light stand 720 and the upright light stand 730.

Wall decorating systems, kits and methods of the present disclosure provide a marked improvement over previous designs. A flexible attachment system is provided for mounting multiple decorative elements to a wall that is easy to apply, allows for easy movement and/or changing of multiple decorative elements and finally, easy removal from the wall with no damage to the wall at the end of its useful life. In some embodiments, the systems, kits and methods of the present disclosure also optionally allow for the decorative elements to be mounted at varying depths from the wall, creating a three-dimensional visual effect.

Although the present disclosure has been described with reference to preferred embodiments, workers skilled in the art will recognize that changes can be made in form and detail without departing from the spirit and scope of the present disclosure.

What is claimed is:
1. A system for decorating a wall surface, comprising:
 a décor assembly including a décor element opposite a releasable fastening structure, the releasable fastening structure providing a plurality of first fastening elements; and a peelable complementary fastening structure including a peelable pressure sensitive adhesive opposite a plurality of second fastening elements;

wherein the first fastening elements are releasably mateable with the second fastening elements to define a releasable fastening system;

and further wherein the system is configured such that a Cleavage Strength established by the adhesive against a wall surface is greater than a Cleavage Strength established by the releasable fastening system, and an omni-directional Dynamic Shear Strength of the releasable fastening system is at least 10 lbs;

wherein a Cleavage Strength of the releasable fastening system is not more than 6 lbs/inch width;

a Tensile Strength of the releasable fastening system is not more than 6.5 lbs/inch;

a 180 Degree Peel Force of the complementary fastening structure is at least 10 oz/inch;

a 90 Degree Peel Force of the complementary fastening structure is at least 12 oz/inch;

a Peel Removal Strength of the complementary fastening structure is not more than 30 oz/inch; and a Static Shear Strength of the complementary fastening structure is at least 20,000 minutes.

2. The system of claim 1, wherein the omni-directional Dynamic Shear Strength of the releasable fastening system is at least 15 lbs.

3. The system of claim 1, wherein the omni-directional Dynamic Shear Strength of the releasable fastening system is at least 25 lbs.

4. The system of claim 1, wherein the décor assembly further includes:
a backer maintaining the décor element; and
a base maintaining the releasable fastening structure;
wherein the backer is releasably mounted to the base.

5. The system of claim 4, wherein one of the backer and the base forms at least one foot and the other of the backer and the base forms at least one cavity configured to receive the foot.

6. The system of claim 4, wherein the décor assembly further includes a releasable connector assembly releasably connecting the backer to the base, and further wherein a Cleavage Strength of the releasable connector assembly is less than a Cleavage Strength of the releasable fastening system, and a Tensile Strength of the releasable connector assembly is less than a Tensile Strength of the releasable fastening system.

7. The system of claim 6, wherein the releasable connector assembly includes a magnet.

8. The system of claim 7, wherein one of the backer and the base forms at least one foot and the other of the backer and the base forms at least one cavity configured to receive the foot, and further the foot is magnetically attracted to the cavity.

9. The system of claim 8, wherein the releasable connector assembly includes a first magnet associated with the foot and a second, complementary magnet associated with the cavity.

10. The system of claim 4, wherein a footprint of the backer is less than a footprint of the base.

11. The system of claim 10, wherein the footprint of the backer is less than a footprint of the décor element.

12. The system of claim 10, wherein the base defines a front side, a rear side and a central mounting region formed as a depression relative to the front side, and further wherein the central mounting region is configured to receive an outer frame of the backer.

13. The system of claim 4, wherein the décor assembly further includes a spacer assembly, the spacer assembly configured to be releasably mounted to the base.

14. The system of claim 13, wherein the spacer assembly is further configured to be releasably mounted to the backer.

15. The system of claim 14, wherein the spacer assembly is further configured to be releasably mounted between the backer and the base.

16. The system of claim 13, wherein the spacer assembly includes a spacer and a releasable fastening structure located at a rear face of the spacer and providing a plurality of the first fastening elements.

17. The system of claim 13, wherein the system is configured such that a Cleavage Strength established between the spacer assembly and the backer is less than the Cleavage Strength established by the releasable fastening system.

18. The system of claim 4, wherein the décor element is separably connected with the backer.

19. The system of claim 1, wherein one of the first and second fastening elements is mushroom-shaped, including a stem projecting from a backing and a circular-shaped head at an end of the stem opposite the backing.

20. The system of claim 1, wherein the décor element includes a backing and a cover, the backing and the cover combining to form a pocket for selectively receiving a photograph.

* * * * *

UNITED STATES PATENT AND TRADEMARK OFFICE
CERTIFICATE OF CORRECTION

PATENT NO. : 9,668,595 B2
APPLICATION NO. : 14/293885
DATED : June 6, 2017
INVENTOR(S) : Floyd et al.

Page 1 of 1

It is certified that error appears in the above-identified patent and that said Letters Patent is hereby corrected as shown below:

In the Specification

Column 18
Line 46, delete "326,a," and insert -- 326a, --, therefor.

In the Claims

Column 37
Line 17, in Claim 1, delete "lbs/inch;" and insert -- lbs/inch$^2$; --, therefor.

Column 38
Line 6, in Claim 8, after "further" insert -- wherein --.

Signed and Sealed this
Thirtieth Day of October, 2018

Andrei Iancu
*Director of the United States Patent and Trademark Office*